US012641412B2

(12) United States Patent
Jung et al.

(10) Patent No.: US 12,641,412 B2
(45) Date of Patent: May 26, 2026

(54) METHOD AND DEVICE FOR SUPPORTING UE SUPPORTING MULTIPLE SIMS IN WIRELESS COMMUNICATION SYSTEM

(71) Applicant: Samsung Electronics Co., Ltd., Suwon-si (KR)

(72) Inventors: Sangyeob Jung, Suwon-si (KR); Soenghun Kim, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 467 days.

(21) Appl. No.: 18/029,822

(22) PCT Filed: Oct. 21, 2021

(86) PCT No.: PCT/KR2021/014823
§ 371 (c)(1),
(2) Date: Mar. 31, 2023

(87) PCT Pub. No.: WO2022/086227
PCT Pub. Date: Apr. 28, 2022

(65) Prior Publication Data
US 2025/0287195 A1     Sep. 11, 2025

(30) Foreign Application Priority Data

Oct. 21, 2020     (KR) ........................ 10-2020-0137136
Dec. 30, 2020     (KR) ........................ 10-2020-0188557

(51) Int. Cl.
H04W 72/04          (2023.01)
H04W 8/18           (2009.01)
H04W 76/27          (2018.01)
(52) U.S. Cl.
CPC ........... H04W 8/183 (2013.01); H04W 76/27 (2018.02)

(58) Field of Classification Search
None
See application file for complete search history.

(56) References Cited

U.S. PATENT DOCUMENTS 10,623,946 B1     4/2020   Kumar et al.
2017/0127217 A1   5/2017   Miao et al.
(Continued)

FOREIGN PATENT DOCUMENTS

KR     10-2019-0101811 A     9/2019
KR     10-2019-0131547 A     11/2019
(Continued)

OTHER PUBLICATIONS

Samsung; Summary of AI 8.3.3: UE notification on network switching for multi-SIM; 3GPP TSG-RAN WG2 Meeting #113bis-e; R2-2104319; Online, Apr. 20, 2021.
(Continued)

*Primary Examiner* — Willie J Daniel, Jr.
(74) *Attorney, Agent, or Firm* — Jefferson IP Law, LLP

(57)     ABSTRACT

The present disclosure relates to a 5G or pre-5G communication system to be provided for supporting a higher data transmission rate beyond a 4G communication system such as LTE. The present disclosure proposes a communication method of a UE supporting multiple subscriber identity modules (SIMs) (multi-SIM UE), the communication method comprising the steps of: a paging message from a second base station being received by a UE which is in a RRC connected state with a first base station associated with a first SIM of the UE, and which is in a RRC inactive state with the second base station associated with a second SIM of the UE; deciding not to respond to the paging message; and initiating a procedure of transmitting a busy indication to the second base station.

14 Claims, 20 Drawing Sheets

(56)  References Cited

U.S. PATENT DOCUMENTS

| | | |
|---|---|---|
| 2020/0037380 A1 | 1/2020 | Qiu et al. |
| 2020/0305118 A1 | 9/2020 | Ryu et al. |
| 2020/0396714 A1 | 12/2020 | Lee |

FOREIGN PATENT DOCUMENTS

| | | |
|---|---|---|
| KR | 10-2022-0006249 A | 1/2022 |
| WO | 2020-209620 A1 | 10/2020 |

OTHER PUBLICATIONS

Extended European Search Report dated Feb. 8, 2024, issued in European Patent Application No. 21883295.4.

METHOD AND DEVICE FOR SUPPORTING UE SUPPORTING MULTIPLE SIMS IN WIRELESS COMMUNICATION SYSTEM

CROSS-REFERENCE TO RELATED APPLICATION(S)

This application is a U.S. National Stage application under 35 U.S.C. § 371 of an International application number PCT/KR2021/014823, filed on Oct. 21, 2021, which is based on and claimed priority of a Korean patent application number 10-10-2020-0137136, filed on Oct. 21, 2020, in the Korean Intellectual Property Office, and of a Korean patent application number 10-2020-0188557, filed on Dec. 30, 2020, in the Korean Intellectual Property Office, the disclosure of which is incorporated by reference herein in its entirety.

TECHNICAL FIELD

The disclosure relates to a communication method and device for a UE using a SIM in a wireless communication system, and more particularly, to a communication method and device for a UE supporting a plurality of subscriber identity modules (SIMs).

BACKGROUND ART

In order to meet the demand for wireless data traffic soring since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

DETAILED DESCRIPTION OF THE INVENTION

Technical Problem

There is currently considered a scheme in which a UE supporting a plurality of subscriber identity modules (SIMs)

(multi-SIM UE) efficiently resumes an RRC connection assuming various cases in a wireless communication system.

The disclosure provides an efficient communication method and device for a UE supporting/using a plurality of SIMs in a wireless communication system.

Technical Solution

An aspect of various embodiments of the disclosure provides a communication method and device comprising a method for communication by a UE (multi-SIM UE) supporting a plurality of subscriber identity modules (SIMs) comprising receiving a paging message from a second base station in an RRC inactive mode with the second base station associated with a second SIM among the plurality of SIMs, identifying whether the paging message includes information about a paging cause, identifying a priority value of a second service mapped to the information about the paging cause, comparing a priority value for a first service that is in progress with a first base station related to a first SIM among the plurality of SIMs with the priority value of the second service, and when the priority value for the second service is larger than the priority value for the first service, transmitting a message to request the second base station to resume an RRC connection.

Another aspect of various embodiments of the disclosure proposes a method and device further comprising transmitting, to the second base station, an RRC connection resume request message including information indicating being unable to respond to the paging message to continue the first service when the priority value of the second service is smaller than the priority value of the first service.

Another aspect of various embodiments of the disclosure proposes a method and device comprising receiving an RRC connection resume complete message from the second base station and receiving an RRC connection release message from the second base station. The RRC connection resume complete message includes information indicating being unable to respond to the paging message to continue the first service.

Another aspect of various embodiments of the disclosure proposes a method and device further comprising, upon receiving a paging (core network-initiated paging) message including the UE's identity from a core network, identifying the first service related to the first SIM and transmitting a message to request RRC connection setup to the second base station.

Another aspect of various embodiments of the disclosure proposes a method and device comprising, when there is information about a paging cause, identifying the priority value of the first service, comparing the priority value of the second service mapped with the information about the paging cause with the priority value of the first service, and when the priority value of the second service is higher, transmitting a message to request RRC connection setup to the second base station.

Another aspect of various embodiments of the disclosure proposes a method and device comprising, when there is no information about a paging cause, identifying whether the first service is in progress based on an indicator indicating such absence, and when the first service is not in progress, transmitting a message to request RRC connection setup to the second base station.

Another aspect of various embodiments of the disclosure proposes a method and device comprising a method for communication by a UE (multi-SIM UE) supporting a plurality of subscriber identity modules (SIMs) comprising receiving an RRC connection message from a first base station associated with a first SIM among the plurality of SIMs, receiving measurement gap configuration information including a plurality of frequency ranges from the first base station by the UE in an RRC connected mode with the first base station, transmitting a message to request a gap for performing an operation on a second SIM to the first base station, receiving an RRC connection reconfiguration message to configure the requested gap from the first base station, and determining whether it is required to switch the gap to perform the operation on the second SIM.

Another aspect of various embodiments of the disclosure proposes a method and device in which the operation on the second SIM corresponds to an operation in an RRC idle mode or RRC inactive mode with a second base station associated with the second SIM, and while the second SIM performs a predetermined operation in the gap requested by the first SIM, the first SIM performs no separate operation with the first base station.

Another aspect of various embodiments of the disclosure proposes a communication method and method comprising a method by a base station communicating with a UE (multi-SIM UE) supporting a plurality of subscriber identity modules (SIMs) comprising transmitting a paging message including information about a paging cause to the UE by a second base station associated with a second SIM among the plurality of SIMs and, when a priority value of a second service mapped to the information about the paging cause is larger than a priority value for a first service related to a first SIM among the plurality of SIMs, receiving a message to request to resume an RRC connection from the UE by the second base station.

Another aspect of various embodiments of the disclosure proposes a method and device further comprising receiving, from the UE, an RRC connection resume request message including information indicating being unable to respond to the paging message from the UE when the priority value of the second service is smaller than the priority value of the first service.

Figure 8A:
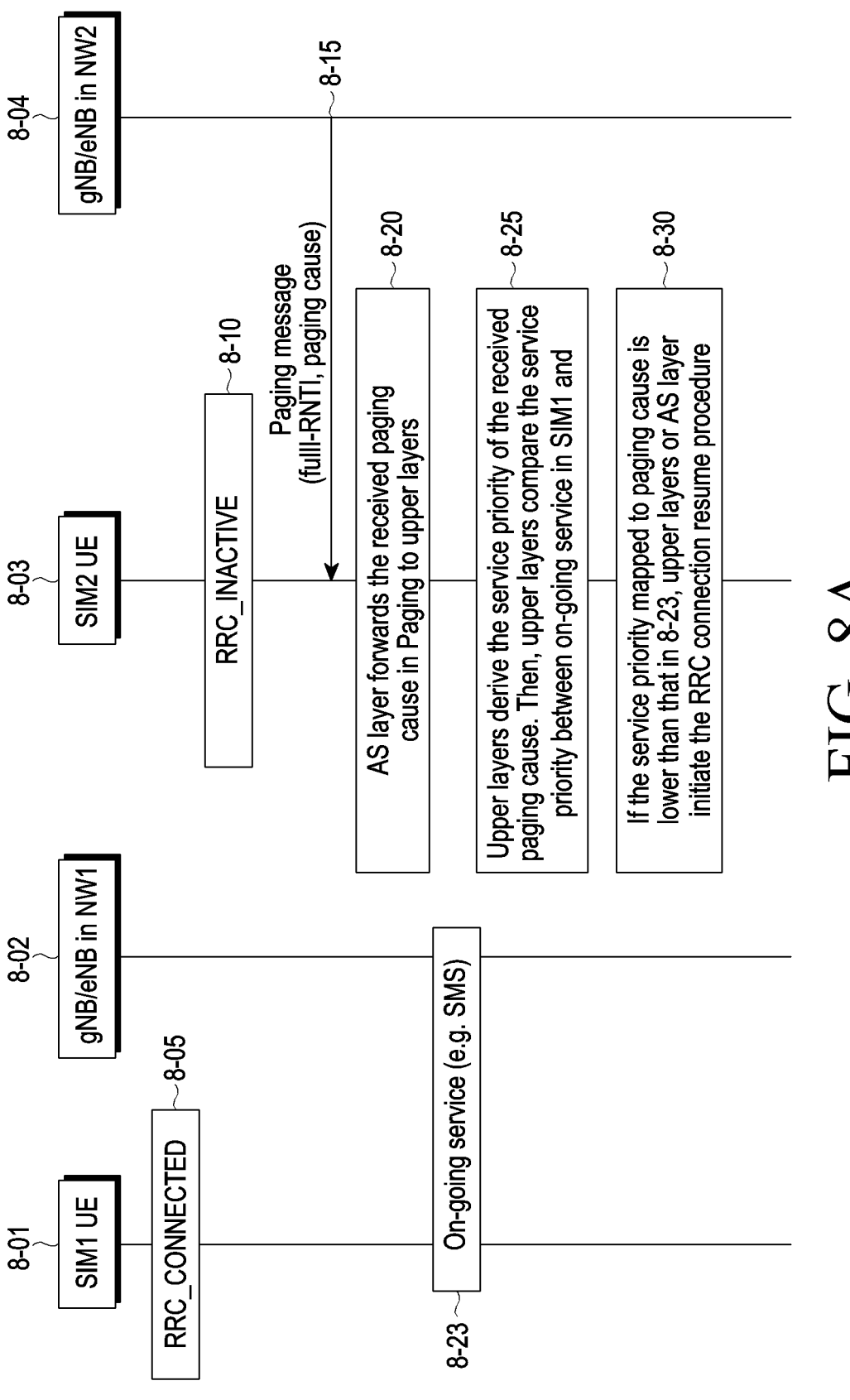
Figure 8B:
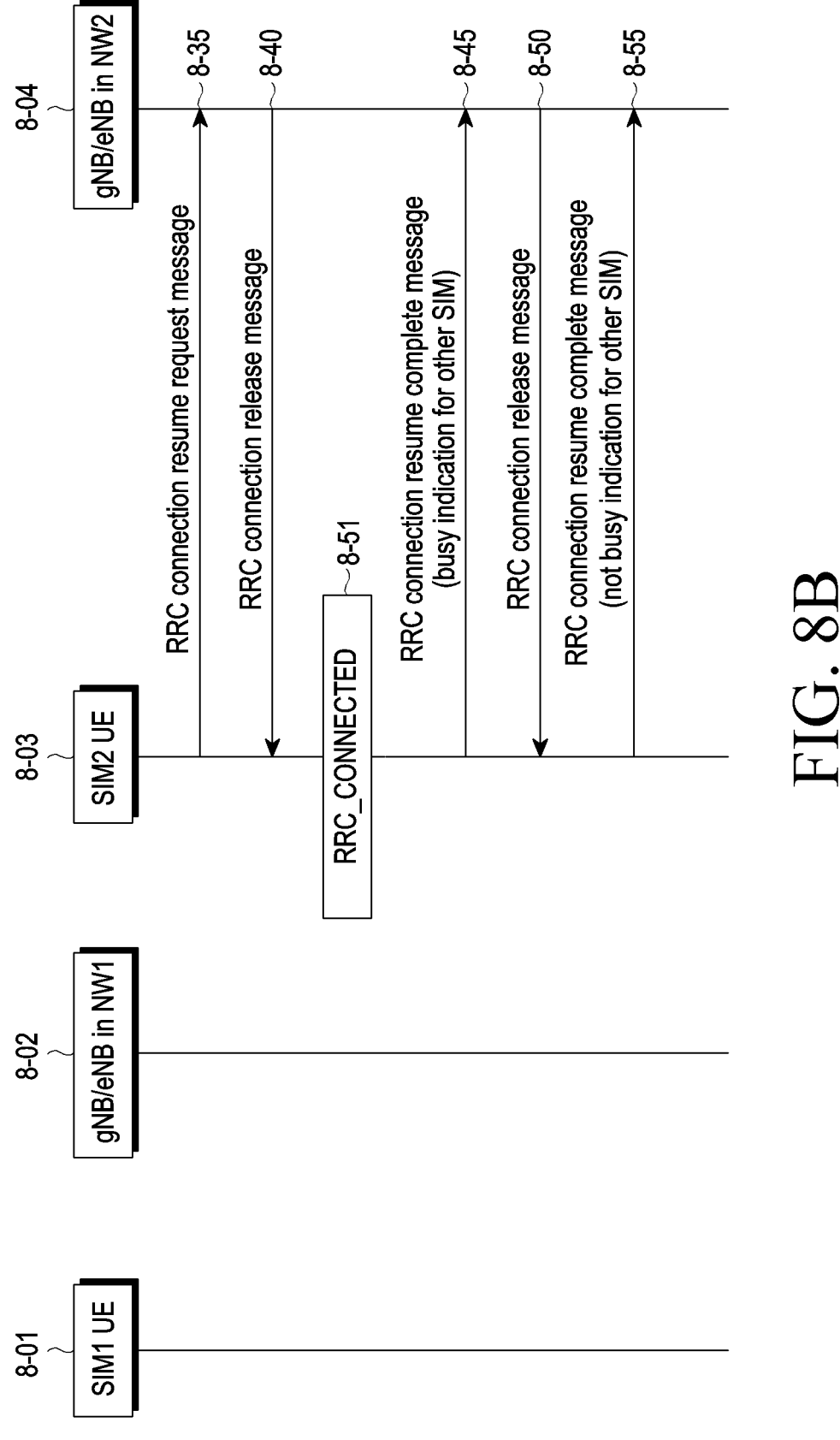
Figure 9:
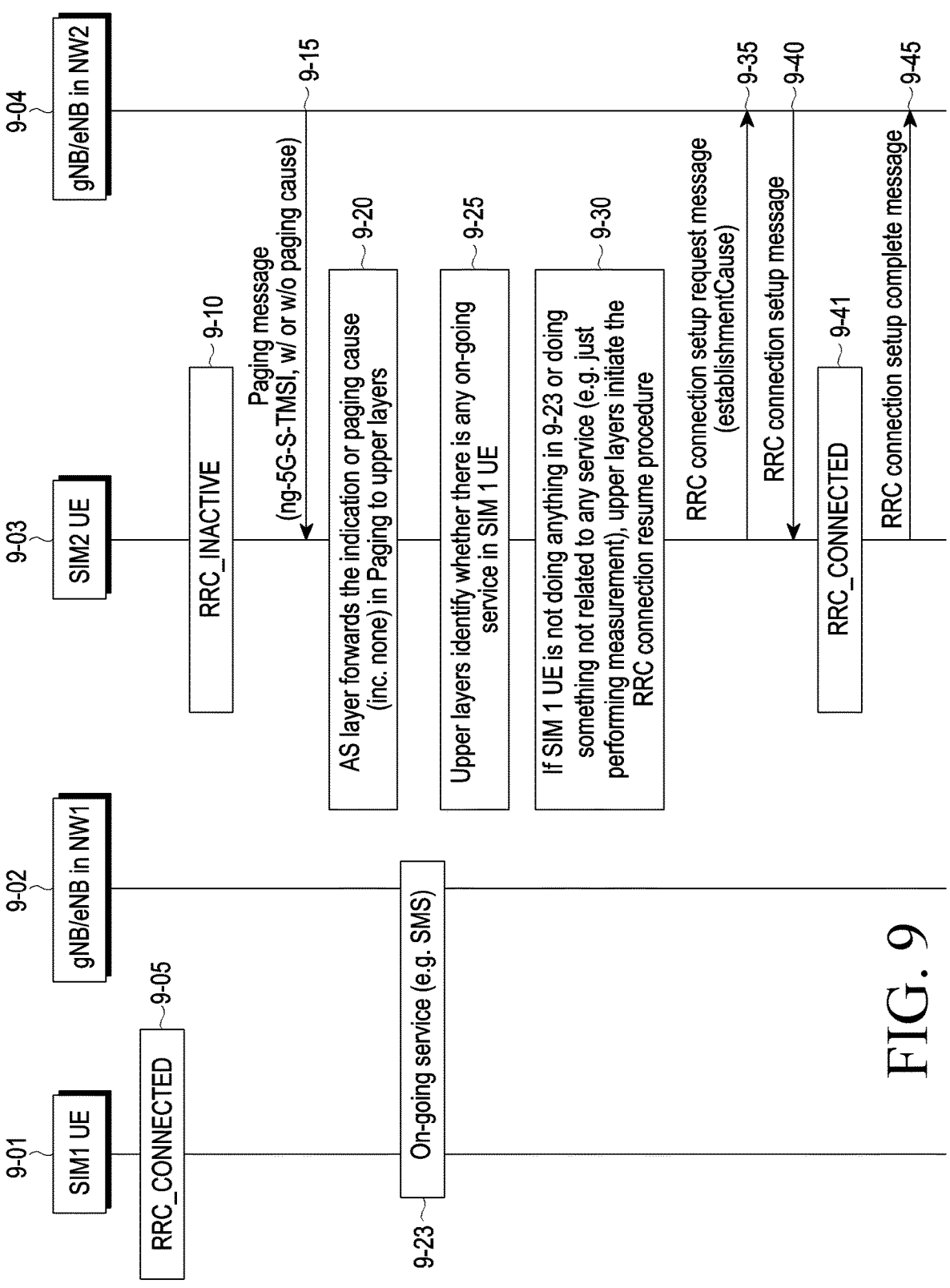
Figure 10:
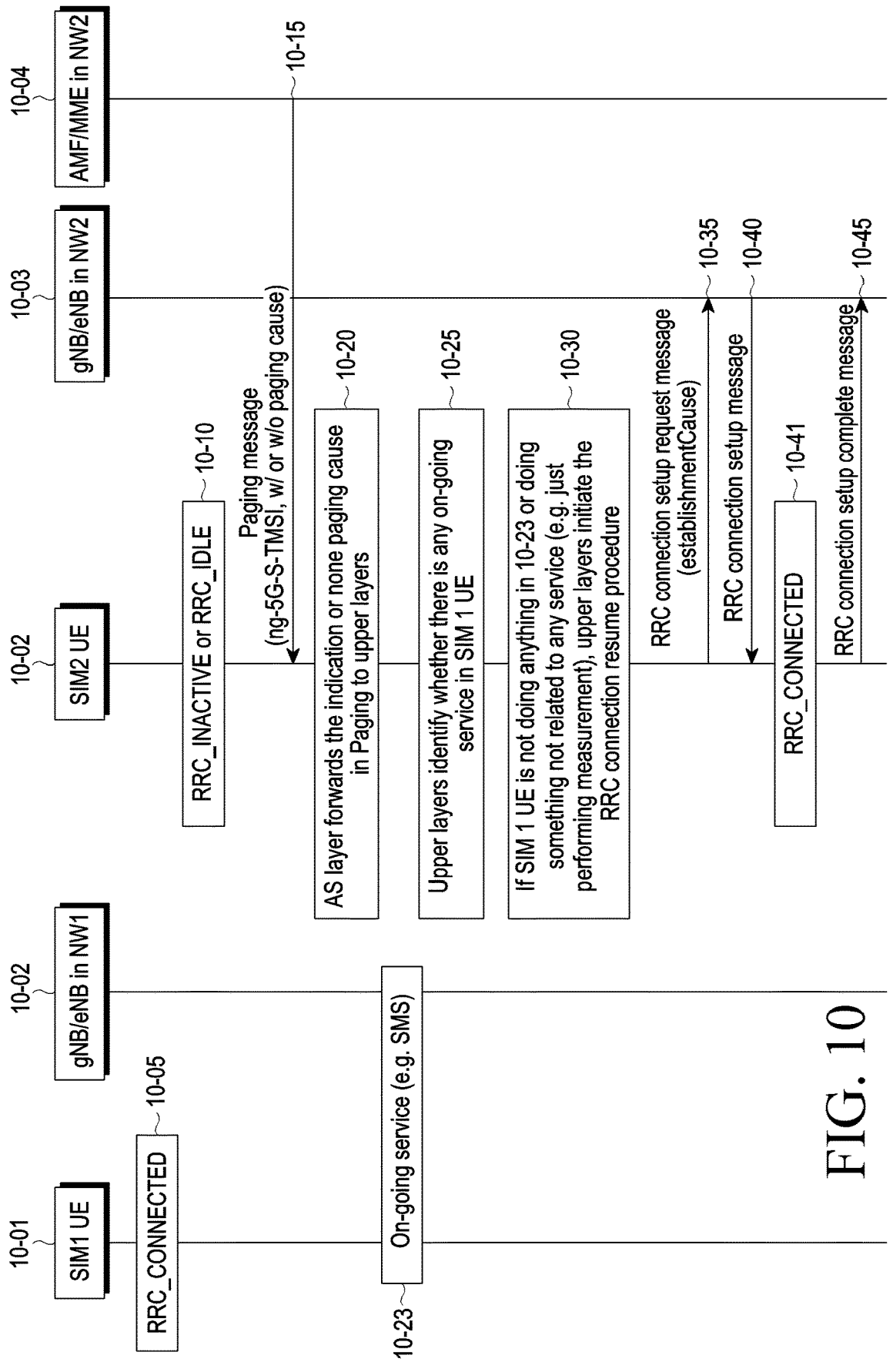
Figure 11:
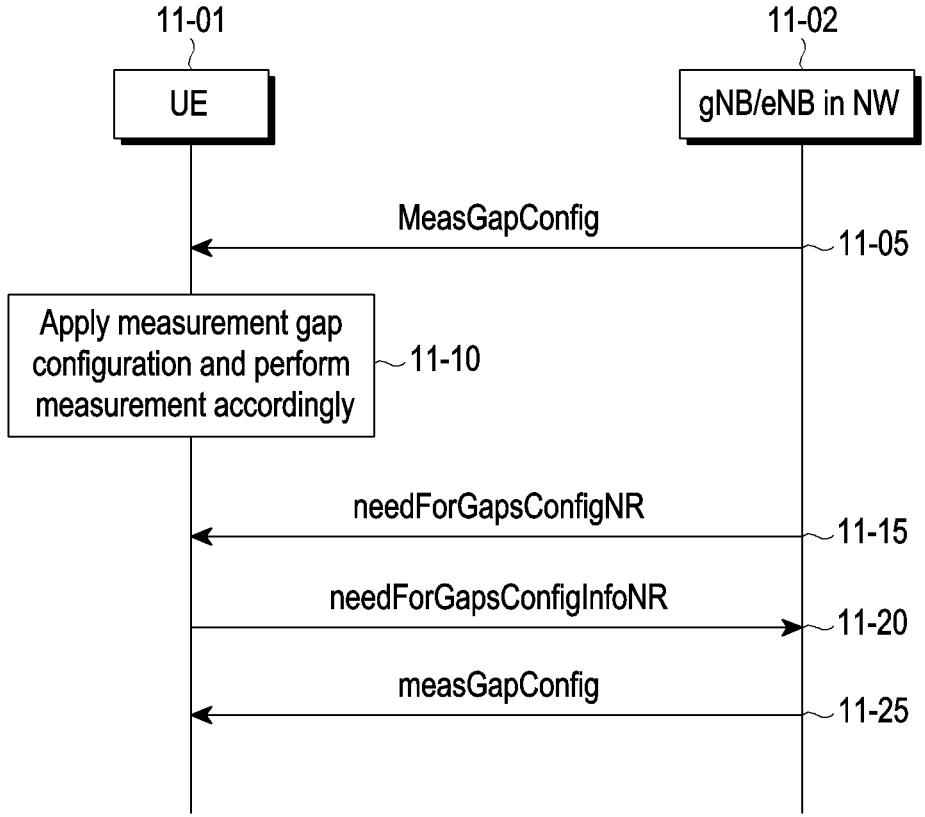
Figure 12A:
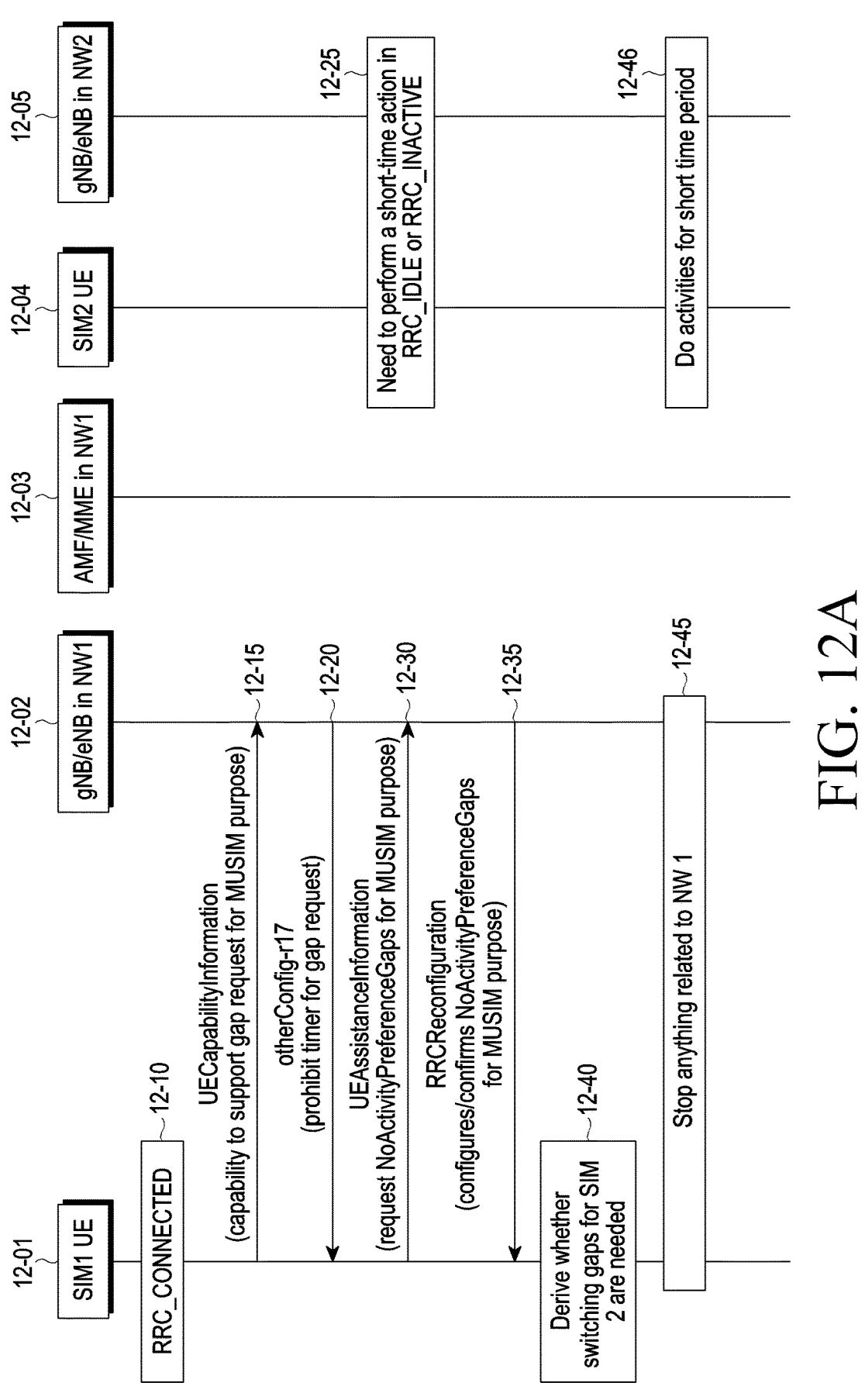
Figure 12B:
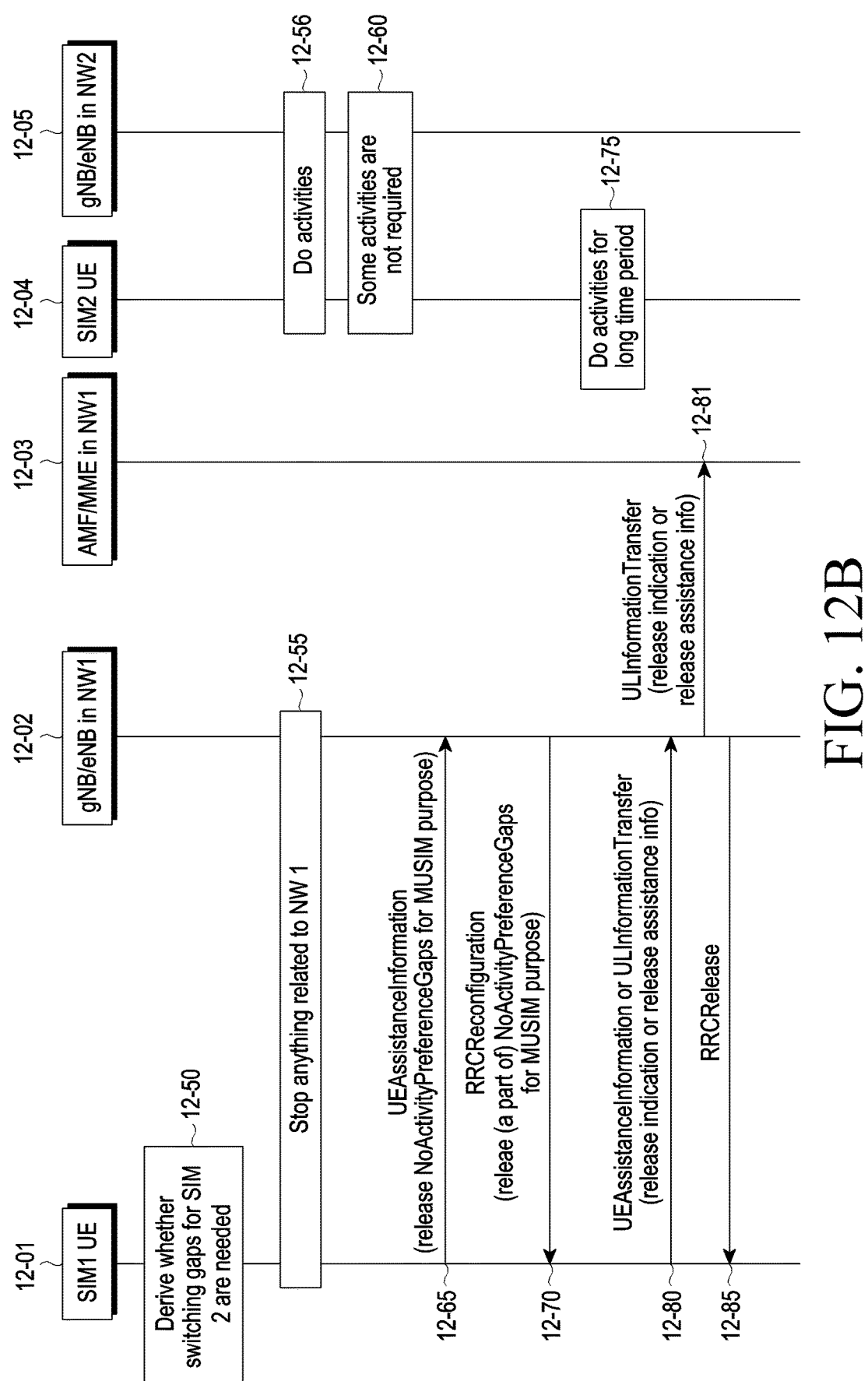
Figure 13:
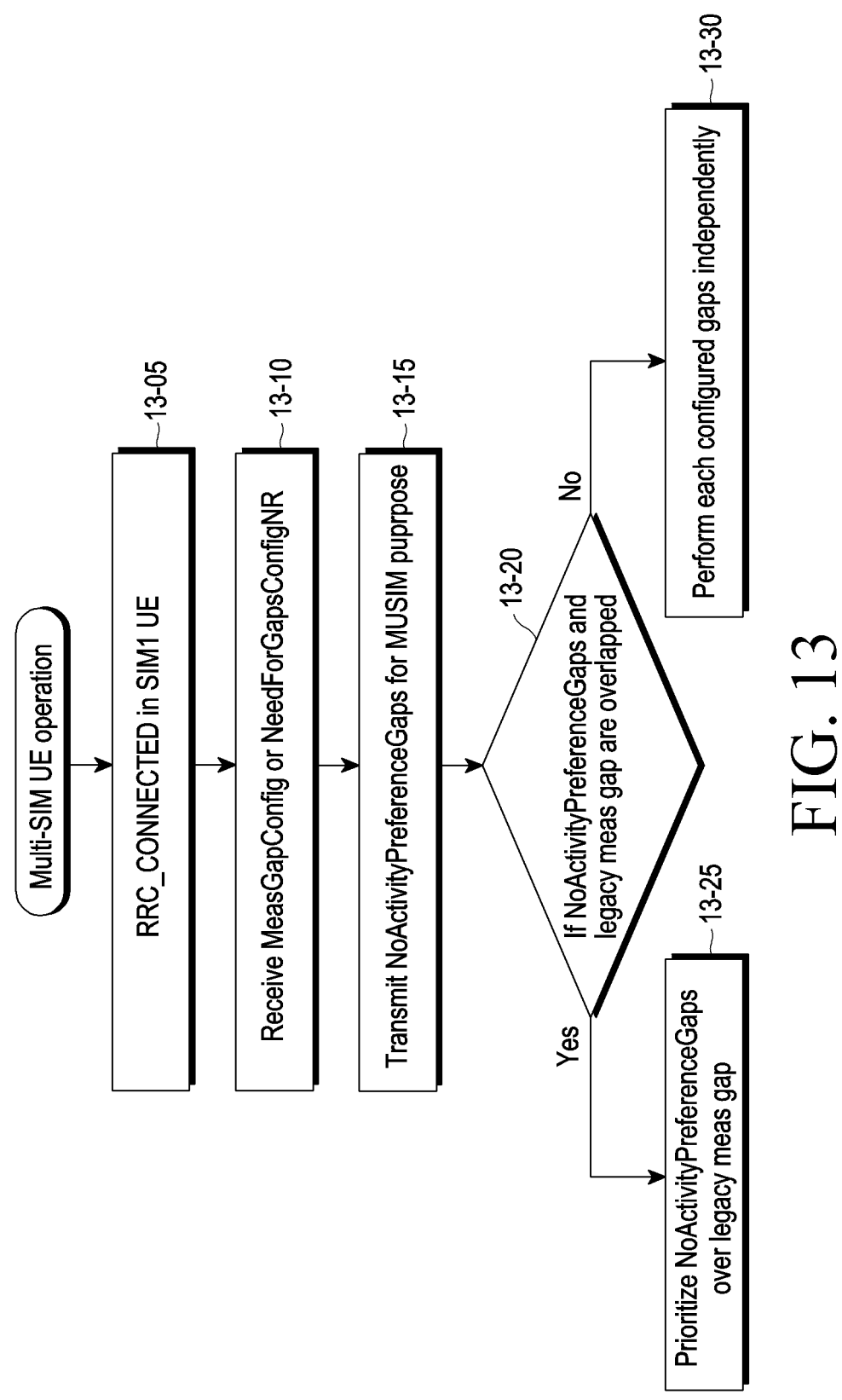
Figure 14:
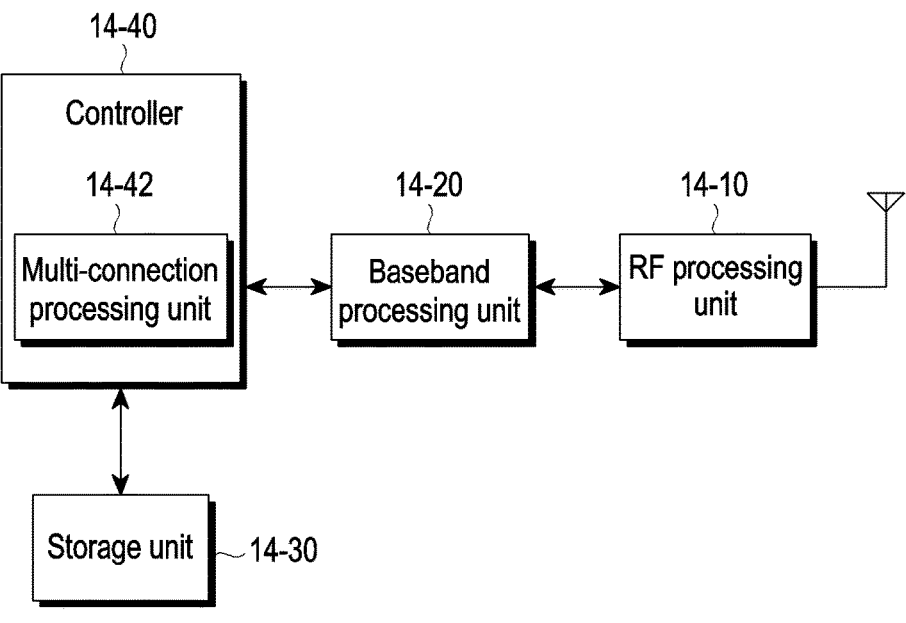
Figure 15:
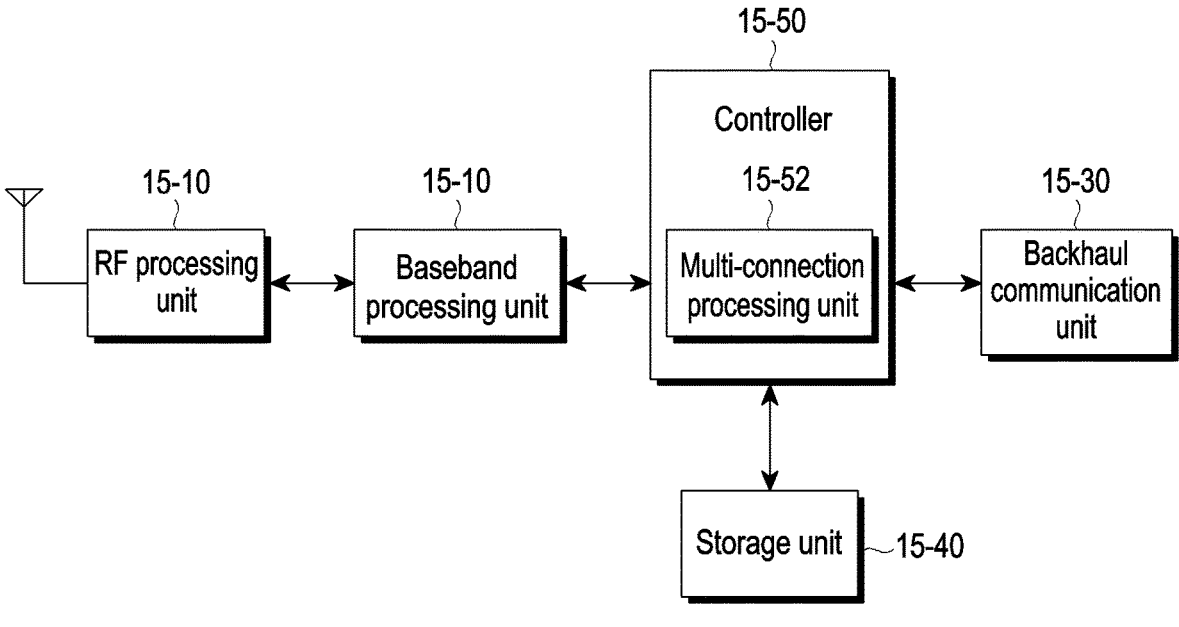
Figure 16:
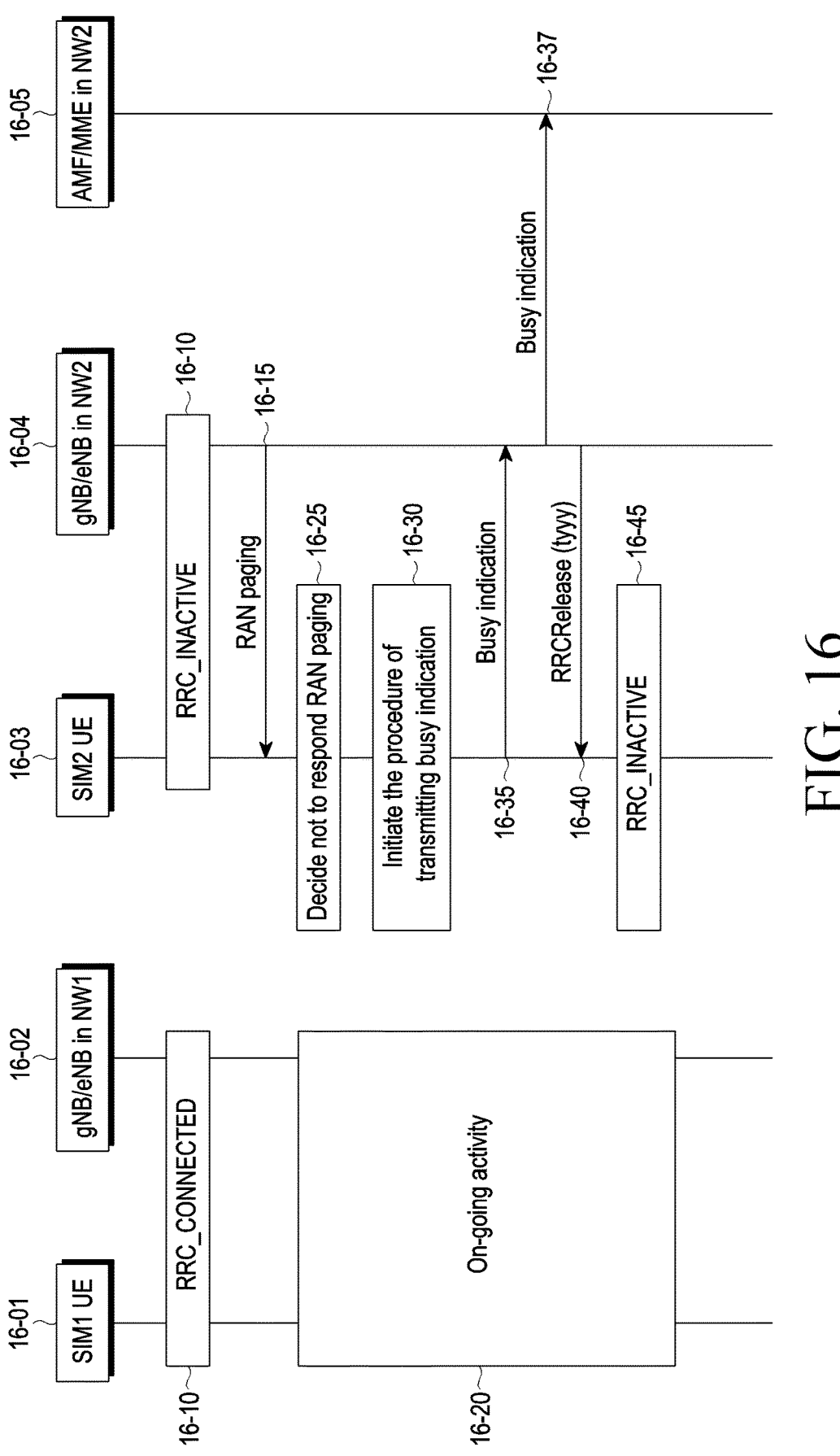
Figure 17:
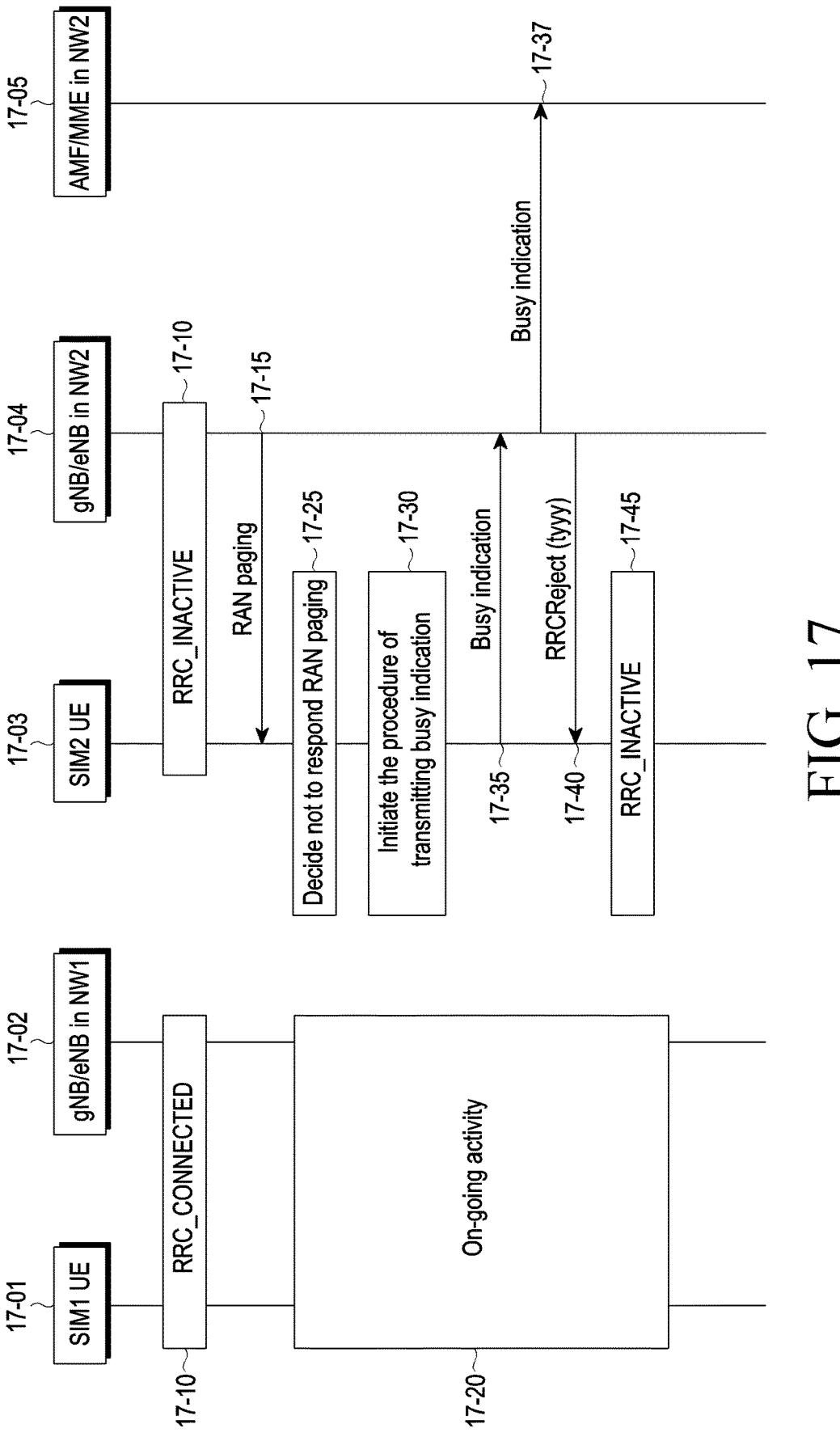
Figure 18:
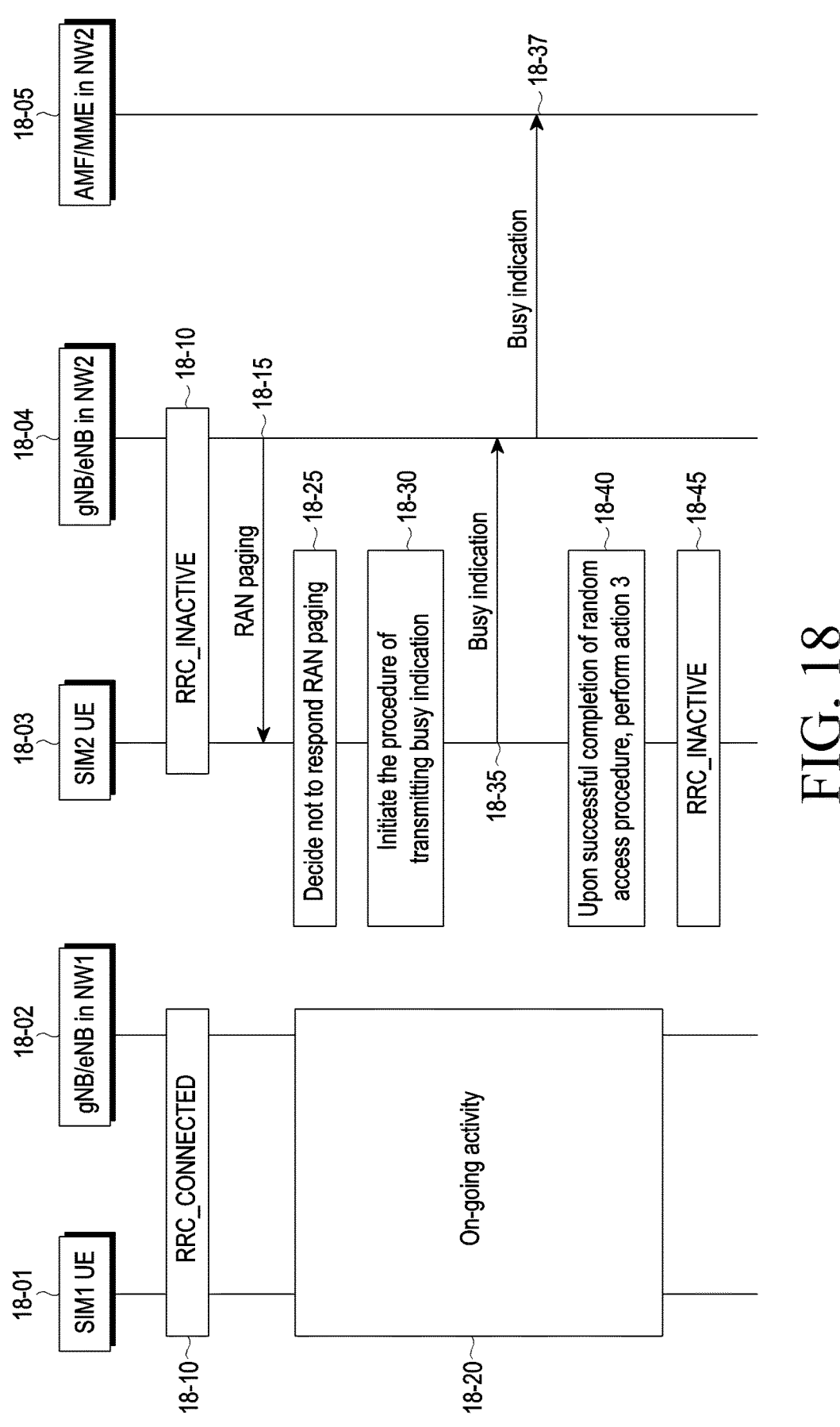
Figure 19:
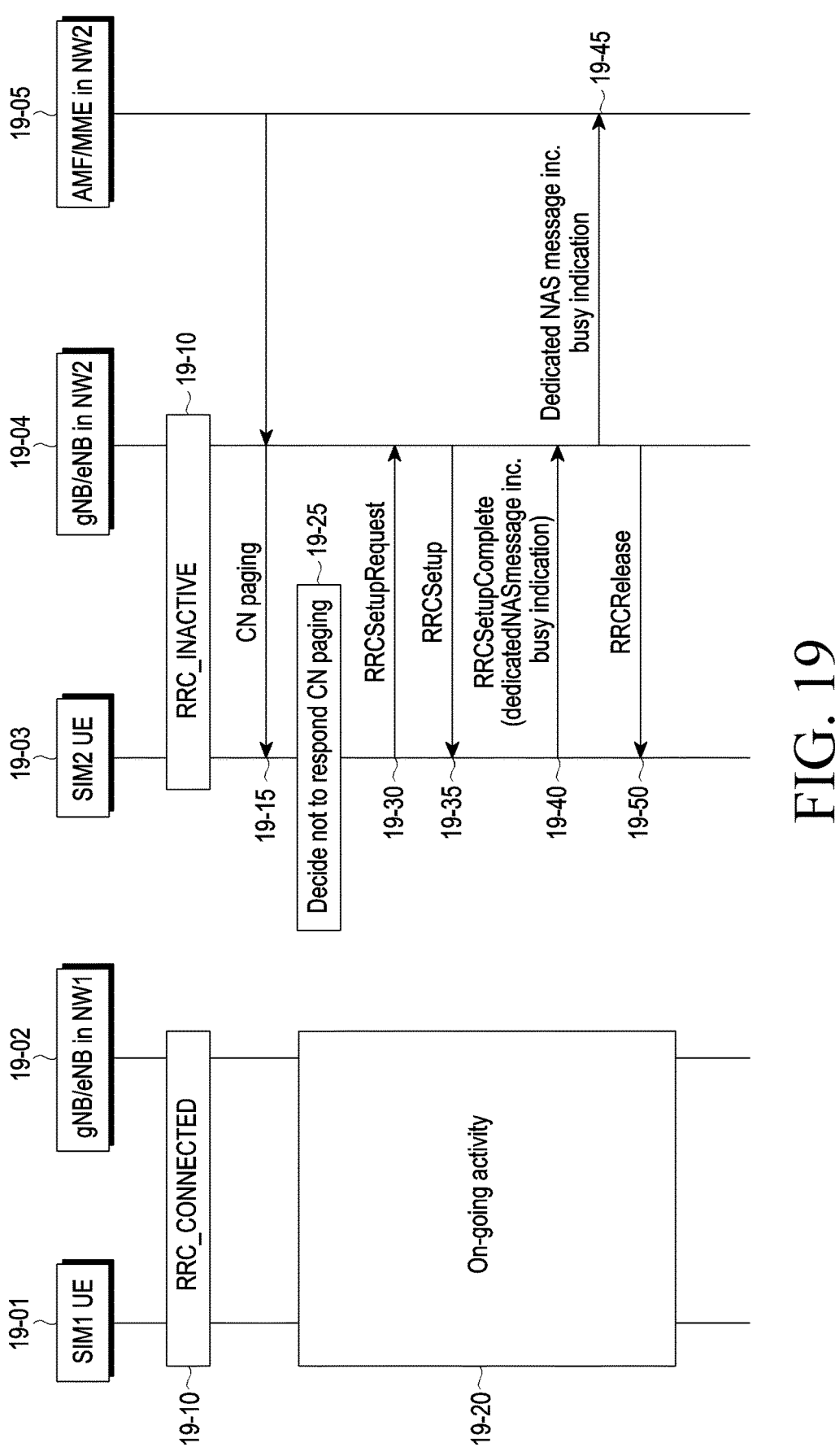

receives a RAN-initiated paging message of a base station associated with one SIM according to an embodiment of the disclosure;

FIGS. 8A and 8B are flowcharts illustrating operations of a UE and a base station when a UE supporting a plurality of subscriber identity modules (SIMs) (multi-SIM UE) receives a RAN-initiated paging message of a base station associated with one SIM according to an embodiment of the disclosure;

FIG. 9 is a flowchart illustrating operations of a UE and a base station when a UE supporting a plurality of subscriber identity modules (SIMs) (multi-SIM UE) receives a RAN-initiated paging message of a base station associated with one SIM according to an embodiment of the disclosure;

FIG. 10 is a flowchart illustrating operations of a UE and a base station when a UE supporting a plurality of subscriber identity modules (SIMs) (multi-SIM UE) receives a core network-initiated paging message of a core network associated with one SIM according to an embodiment of the disclosure;

FIG. 11 is a flowchart illustrating a process in which a UE in RRC_CONNECTED mode performs measurement based on measurement configuration information configured by a base station according to an embodiment of the disclosure;

FIGS. 12A and 12B are views illustrating an operation in which one SIM UE currently in in RRC_CONNECTED mode notifies a base station associated with a corresponding SIM for a UE supporting a plurality of subscriber identity modules (SIMs) (multi-SIM UE) switches from one SIM to another SIM to perform predetermined operations according to an embodiment of the disclosure;

FIG. 13 is a flowchart illustrating operations of a UE when a UE supporting a plurality of subscriber identity modules (SIMs) (multi-SIM UE) overlaps a legacy measurement gap and NoActivityPregerenceGaps for the MUSIM according to an embodiment of the disclosure;

FIG. 14 is a block diagram illustrating an inner structure of a terminal according to an embodiment of the disclosure;

FIG. 15 is a block diagram illustrating a configuration of an NR base station according to an embodiment of the disclosure;

FIG. 16 is a flowchart illustrating an example in which one SIM UE among UEs supporting a plurality of subscriber identity modules (SIMs) (multi-SIM UEs) performs a busy indication procedure according to an embodiment of the disclosure;

FIG. 17 is a flowchart illustrating an example in which one SIM UE among UEs supporting a plurality of subscriber identity modules (SIMs) (multi-SIM UEs) performs a busy indication procedure according to an embodiment of the disclosure;

FIG. 18 is a flowchart illustrating an example in which one SIM UE among UEs supporting a plurality of subscriber identity modules (SIMs) (multi-SIM UEs) performs a busy indication procedure according to an embodiment of the disclosure; and FIG. 19 is a flowchart illustrating an example in which one SIM UE among UEs supporting a plurality of subscriber identity modules (SIMs) (multi-SIM UEs) performs a busy indication procedure according to an embodiment of the disclosure.

MODE FOR CARRYING OUT THE INVENTION

Hereinafter, the operational principle of the disclosure is described below with reference to the accompanying drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure.

When determined to make the subject matter of the present disclosure unclear, the detailed of the known functions or configurations may be skipped. Hereinafter, the disclosure is described in detail with reference to the accompanying drawings.

As used herein, terms for identifying access nodes, terms denoting network entities, terms denoting messages, terms denoting inter-network entity interfaces, and terms denoting various pieces of identification information are provided as an example for ease of description. Thus, the disclosure is not limited to the terms, and the terms may be replaced with other terms denoting objects with equivalent technical meanings.

The description of embodiments of the disclosure targets the LTE system or 5G system (NR system) specified in the 3GPP, the standardization organization, but the disclosure may also be applicable to the 5G or next-generation systems or other communication systems having a similar technical background without significantly departing from the scope of the disclosure by making a slight change thereto, which is possible at the discretion of one of ordinary skill in the art.

Further, in various embodiments of the disclosure, the term "base station (BS)" may refer to any component (or a set of components) configured to provide wireless access, such as a transmission point (TP), a transmit-receive point (TRP), an enhanced node B (eNodeB or eNB), a 5G base station (gNB), a macrocell, a femtocell, Wi-Fi access point (AP), or other wireless-enabled devices, based on the type of the wireless communication system. The base station may be a network entity including at least one of an integrated access and backhaul-donor (IAB-donor), which is a gNB providing network access to UEs through a network of backhaul and access links in the NR system, and an IAB-node, which is a radio access network (RAN) node supporting NR backhaul links to the IAB-donor or another IAB-node and supporting NR access links to UEs. The UE is wirelessly connected through the IAB-node and may transmit/receive data to and from the IAB-donor connected with at least one IAB-node through the backhaul link. Base stations may provide wireless access according to one or more radio protocols, e.g., 5G 3GPP new radio interface/access (NR), long-term evolution (LTE), LTE advanced (LTE-A), high-speed packet access (HSPA), or Wi-Fi 802.11a/b/g/n/ac.

Further, in various embodiments of the disclosure, the term "UE" may refer to any component, such as "user equipment (UE)," "mobile station," "subscriber station," "remote terminal," "wireless terminal," "receive point," or "user device." For convenience, the term "UE" may be used to refer to a device that accesses a base station regardless of whether it needs to be considered as a mobile device (such as a mobile phone or a smart phone) or a stationary device (such as a desktop computer or vending machine).

For ease of description, hereinafter, some of the terms and names defined in the 3rd generation partnership project long term evolution (3GPP LTE) standards may be used in the disclosure. However, the disclosure is not limited by such terms and names and may be likewise applicable to systems conforming to other standards. In the disclosure, eNB may be used interchangeably with gNB for convenience of description. In other words, the base station described as an eNB may represent a gNB.

Figure 1:
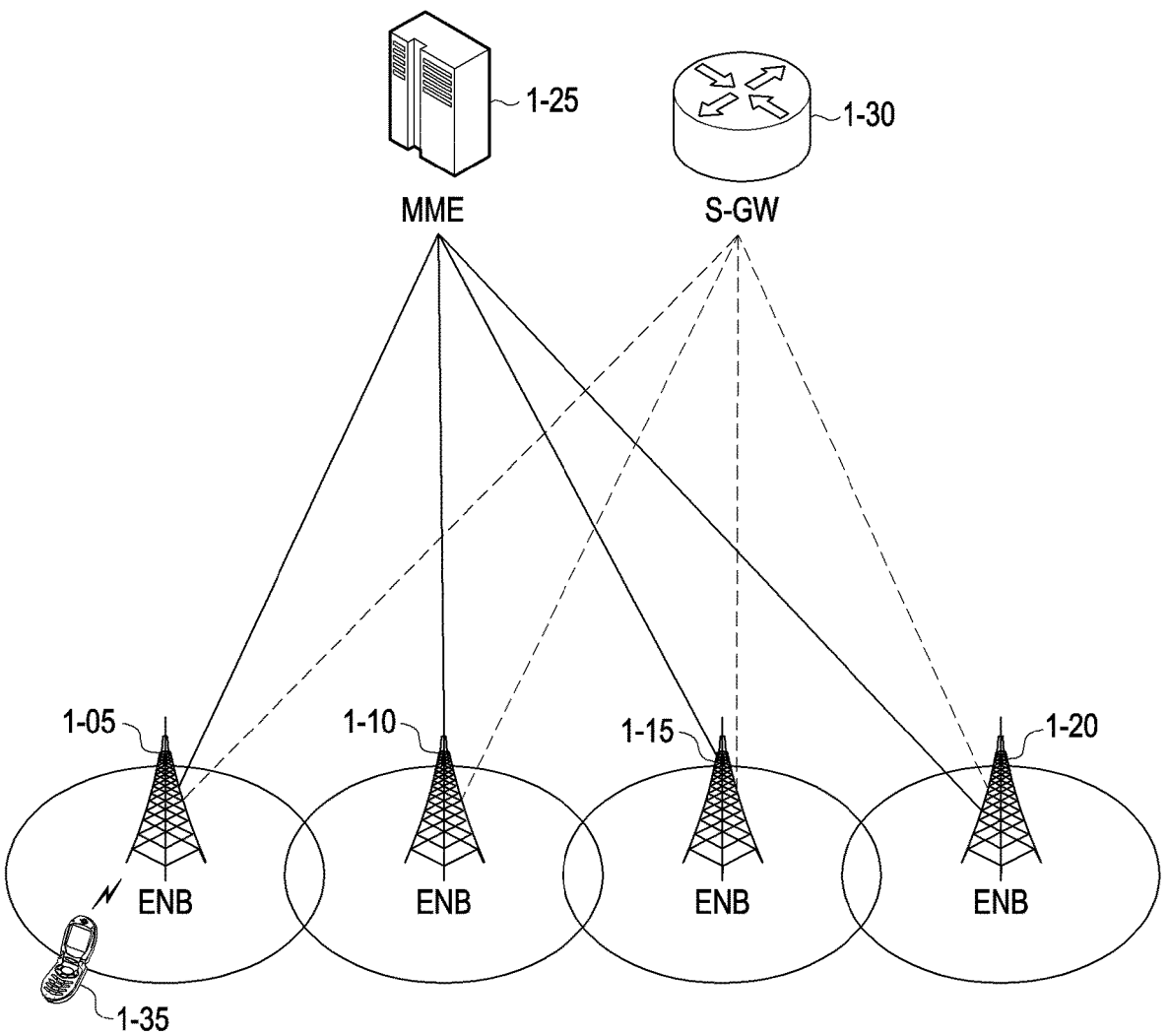
FIG. 1 is a view illustrating a structure of an LTE system according to an embodiment of the disclosure.

FIG. 1 is a view illustrating a structure of an LTE system according to an embodiment of the disclosure.

Referring to FIG. 1, a radio access network of the LTE system includes next-generation base stations (evolved node B—hereinafter, "ENB" or "base station") 1-05, 1-10, 1-15, and 1-20, a mobility management entity (MME) 1-25, and a serving gateway (S-GW) 1-30. A user equipment (hereinafter, "UE" or "terminal") 1-35 accesses an external network through the ENB 1-05 to 1-20 and the S-GW 1-30.

The ENBs 1-05 to 1-20 of FIG. 1 correspond to node Bs in the legacy universal mobile telecommunication system (UMTS) system. The ENB is connected with the UE 1-35 through a wireless channel and plays a more complicated role than the legacy node B. Since in the LTE system all user traffic as well as real-time services, such as voice over Internet protocol (VoIP) service through an Internet protocol is serviced through a shared channel, there is needed an apparatus that performs scheduling by compiling state information, such as UEs' buffer states, available transmit power states, or channel states, and the ENBs 1-05 to 1-20 are in charge of the same. One ENB typically controls multiple cells. For example, the LTE system adopts, as a radio access technology, orthogonal frequency division multiplexing (hereinafter, "OFDM") on a 20 MHz bandwidth in order to implement a transmission speed of 100 Mbps. Further, the system applies adaptive modulation & coding (AMC) that determines a modulation scheme and a channel coding rate in compliance with the channel state of the UE. The S-GW 1-30 is a device providing a data bearer, and the serving gateway 130 generates or removes a data bearer under the control of the MME 1-25. The MME is an apparatus that is in charge of various control functions as well as mobility management functions for the UE and is connected with multiple base stations.

Figure 2:
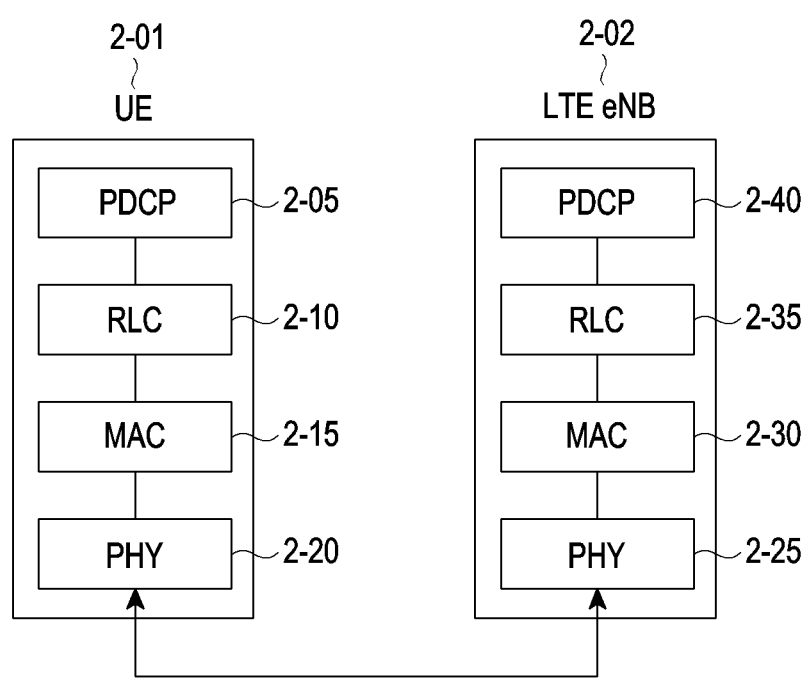
FIG. 2 is a view illustrating a structure of a radio protocol in an LTE system according to an embodiment of the disclosure.

FIG. 2 is a view illustrating a structure of a radio protocol in an LTE system according to an embodiment of the disclosure.

Referring to FIG. 2, LTE system radio protocols include packet data convergence protocols (PDCPs) 2-05 and 2-40, radio link controls (RLCs) 2-10 and 2-35, and medium access controls (MACs) 2-15 and 2-30 for a UE and a base station, respectively. The packet data convergence protocols (PDCPs) 2-05 and 2-40 are in charge of IP header compression/reconstruction. The major functions of the PDCP may be summarized as follows.

Header compression and decompression (ROHC only)

Transfer of user data

In-sequence delivery of upper layer PDUs at PDCP re-establishment procedure for RLC AM For split bearers in DC (only support for RLC AM), PDCP PDU routing for transmission and PDCP PDU reordering for reception Duplicate detection of lower layer SDUs at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink The RLCs 2-10 and 2-35 reconfigure packet data units (PDUs) into a proper size and perform ARQ operations.

The major functions of the RLC may be summarized as follows.

Transfer of upper layer PDUs

Error correction through ARQ (only for AM data transfer)

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MACs 2-15 and 2-30 are connected with several RLC layer devices configured in one UE, multiplex the RLC PDUs into a MAC PDU and demultiplex the MAC PDU into RLC PDUs. The major functions of the MAC may be summarized as follows.

Mapping between logical channels and transport channels

Multiplexing/demultiplexing of MAC SDUs belonging to one or different logical channels into/from transport blocks (TB) delivered to/from the physical layer on transport channels Scheduling information reporting Error correction through HARQ Priority handling between logical channels of one UE Priority handling between UEs by means of dynamic scheduling MBMS service identification Transport format selection Padding The physical layers 2-20 and 2-25 channel-code and modulate upper layer data into OFDM symbols, transmit the OFDM symbols through a wireless channel or demodulates OFDM symbols received through a wireless channel, channel-decodes and transfers the same to an upper layer.

Figure 3:
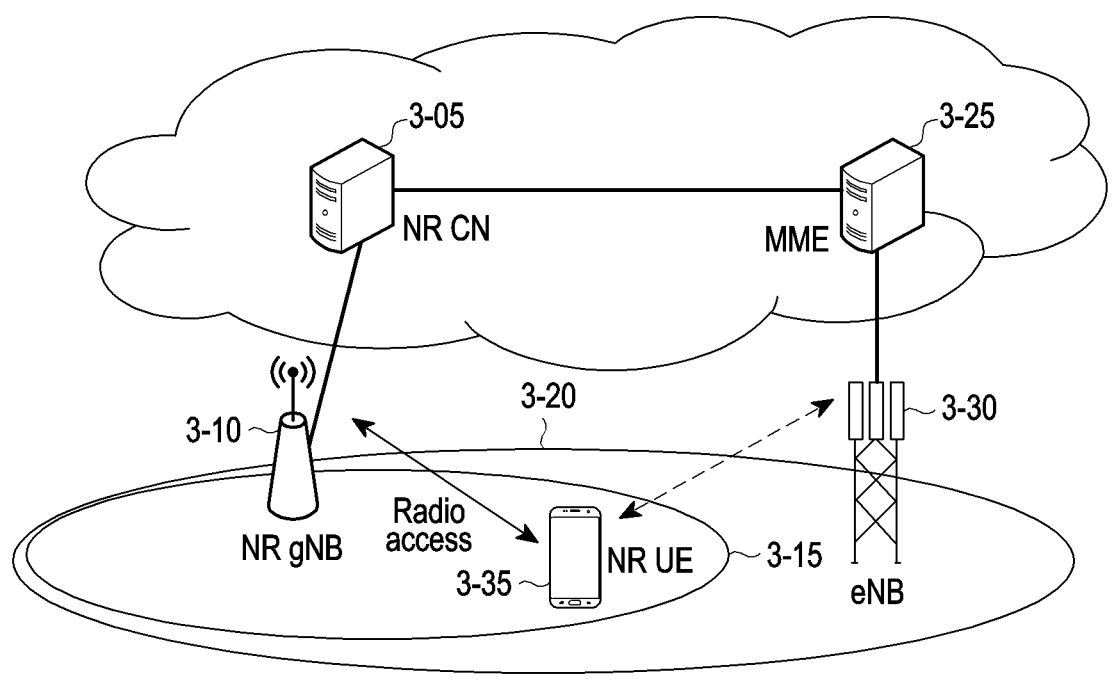
FIG. 3 is a view illustrating a structure of a next-generation mobile communication system according to an embodiment of the disclosure.

FIG. 3 is a view illustrating a structure of a next-generation mobile communication system according to an embodiment of the disclosure.

Referring to FIG. 3, as shown, a radio access network of a next-generation mobile communication system (hereinafter, NR or 2g) includes a next-generation base station (new radio node B, hereinafter NR gNB or NR base station) 3-10 and a new radio core network (NR CN) 3-05. A new radio user equipment (hereinafter, NR UE or terminal) 3-15 accesses an external network through the NR gNB 3-10 and the NR CN 3-05.

In FIG. 3, the NR gNB 3-10 corresponds to the evolved node B (eNB) of the legacy LTE system. The NR gNB is connected with the NR UE 3-15 via a radio channel and may provide a superior service to that of the legacy node B. Since in the next-generation mobile communication system, all user traffic is serviced through a shared channel, there is needed an apparatus that performs scheduling by compiling state information, such as UEs' buffer states, available transmit power states, or channel states, and the NR NB 3-10 is in charge of the same. One NR gNB typically controls multiple cells. To implement ultra-high data rate transmission as compared with the current LTE, a bandwidth higher than the existing maximum bandwidth may be provided, and the orthogonal frequency division multiplexing (hereinafter, OFDM) may be used as the radio access technology, and beamforming technology may be additionally combined. Further, the system applies adaptive modulation & coding (AMC) that determines a modulation scheme and a channel coding rate in compliance with the channel state of the UE.

The NR CN 3-05 performs functions, such as mobility support, bearer setup, and QoS setup. The NR CN is an apparatus that is in charge of various control functions as well as mobility management functions for the UE and is connected with multiple base stations. Further, the next-generation mobile communication system may be linked with the legacy LTE system. The NR CN is connected to the MME 3-25 through a network interface. The MME is connected to the eNB 3-30, which is a legacy base station.

Figure 4:
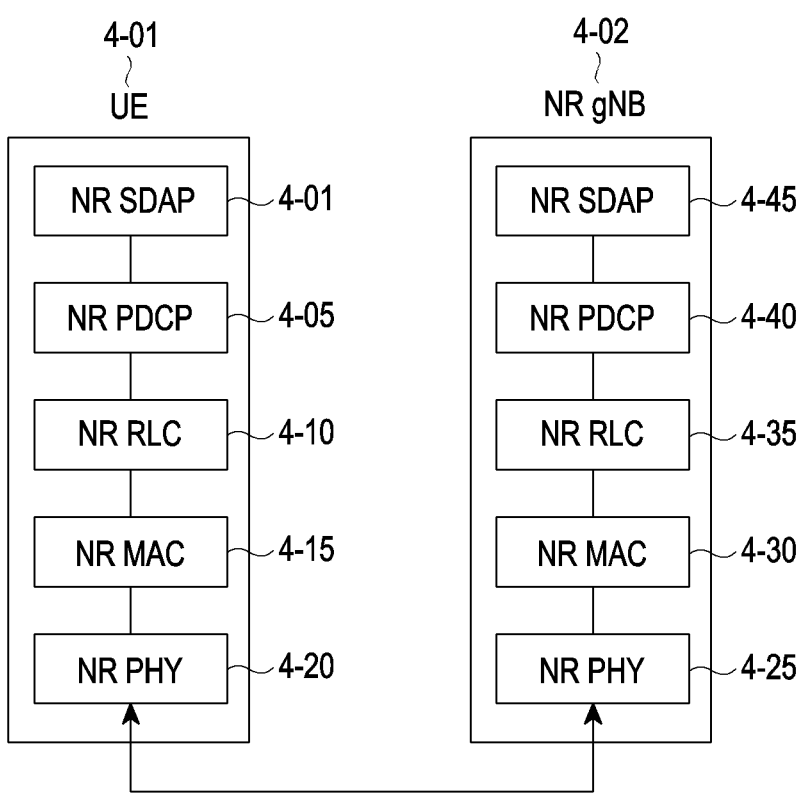
FIG. 4 is a view illustrating a structure of a radio protocol of a next-generation mobile communication system according to an embodiment of the disclosure.

FIG. 4 is a view illustrating a structure of a radio protocol of a next-generation mobile communication system according to an embodiment of the disclosure.

FIG. 4 is a view illustrating a structure of a radio protocol of a next-generation mobile communication system to which the disclosure is applicable.

Referring to FIG. 4, the radio protocols for the next-generation mobile communication system include NR SDAPs 4-01 and 4-45, NR PDCPs 4-05 and 4-40, NR RLCs 4-10 and 4-35, and NR MACs 4-15 and 4-30, in the NR and the base station, respectively.

The main functions of the NR SDAPs 4-01 and 4-45 may include some of the following functions.

Transfer of user plane data

Mapping between a QoS flow and a DRB for both DL and UL

Marking QoS flow ID in both DL and UL packets

Reflective QoS flow to DRB mapping for the UL SDAP PDUs.

For the SDAP layer device, the UE may be set, via an RRC message, for whether to use the functions of the SDAP layer or the header of the SDAP layer device per PDCP layer device, per bearer, or per logical channel. If an SDAP header has been set, the UE may be instructed to update or reset mapping information for the data bearer and QoS flow of uplink and downlink, by a one-bit NAS reflective QoS indicator and a one-bit AS reflective QoS indicator. The SDAP header may include QoS flow ID information indicating QoS. The QoS information may be used as data priority handling or scheduling information for seamlessly supporting a service.

The main functions of the NR PDCPs 4-05 and 4-40 may include some of the following functions.

Header Compression and Decompression (ROHC Only)

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

The reordering by the NR PDCP refers to reordering PDCP PDUs received by the lower layer based on the PDCP sequence numbers (SNs) and may include transferring the data to the upper layer in the reordered sequence or immediately without considering order, recording PDCP PDUs missed by reordering, reporting the state of the missing PDCP PDUs to the transmit part, and requesting to retransmit the missing PDCP PDUs.

The main functions of the NR RLCs 4-10 and 4-35 may include some of the following functions.

Transfer of upper layer PDUs

In-sequence delivery of upper layer PDUs

Out-of-sequence delivery of upper layer PDUs

Error correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

The in-sequence delivery by the NR RLC device refers to transferring the RLC SDUs received from the lower layer to the upper layer in order and, if one original RLC SDU is split into several RLC SDUs that are then received, the in-sequence delivery may include reassembling and transferring them, reordering the received RLC PDUs based on the RLC SNs or PDCP SNs, recording the RLC PDUs missed by reordering, reporting the state of the missing RLC PDUs to the transmit part, and requesting to retransmit the missing RLC PDUs and, if there are missing RLC SDUs, the in-sequence delivery may include transferring only RLC SDUs before the missing RLC SDUs to the upper layer in order. Although there are missing RLC SDUs, if a predetermined timer has expired, the in-sequence delivery may include transferring all of the RLC SDUs received before the timer starts to the upper layer in order. Or, although there are missing RLC SDUs, if the predetermined timer has expired, the in-sequence delivery may include transferring all of the RLC SDUs received thus far to the upper layer in order. Further, the RLC PDUs may be processed in order of reception (in order of arrival regardless of the sequence number order) and delivered to the PDCP device regardless of order (out-of-sequence delivery). For segments, segments which are stored in a buffer or are to be received later may be received and reconstructed into a single whole RLC PDU, and then, the whole RLC PDU is processed and transferred to the PDCP device. The NR RLC layer may not include the concatenation function, and the function may be performed by the NR MAC layer or replaced with a multiplexing function of the NR MAC layer.

The out-of-sequence delivery by the NR RLC device refers to immediately transferring the RLC SDUs received from the lower layer to the upper layer regardless of order and, if one original RLC SDU is spitted into several RLC SDUs that are then received, the out-of-sequence delivery may include reassembling and transferring them and storing the RLC SNs or PDCP SNs of the received RLC PDUs, ordering them, and recording missing RLC PDUs.

The NR MACs 4-15 and 4-30 may be connected to several NR RLC layer devices configured in one UE, and the major functions of the NR MAC may include some of the following functions.

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS service identification

Transport format selection

Padding

The NR PHY layers 4-20 and 4-25 channel-code and modulate upper layer data into OFDM symbols, transmit the OFDM symbols through a wireless channel or demodulates OFDM symbols received through a wireless channel, channel-decodes and transfers the same to an upper layer.

Hereinafter, the disclosure is described in detail with reference to the accompanying drawings.

Figure 5:
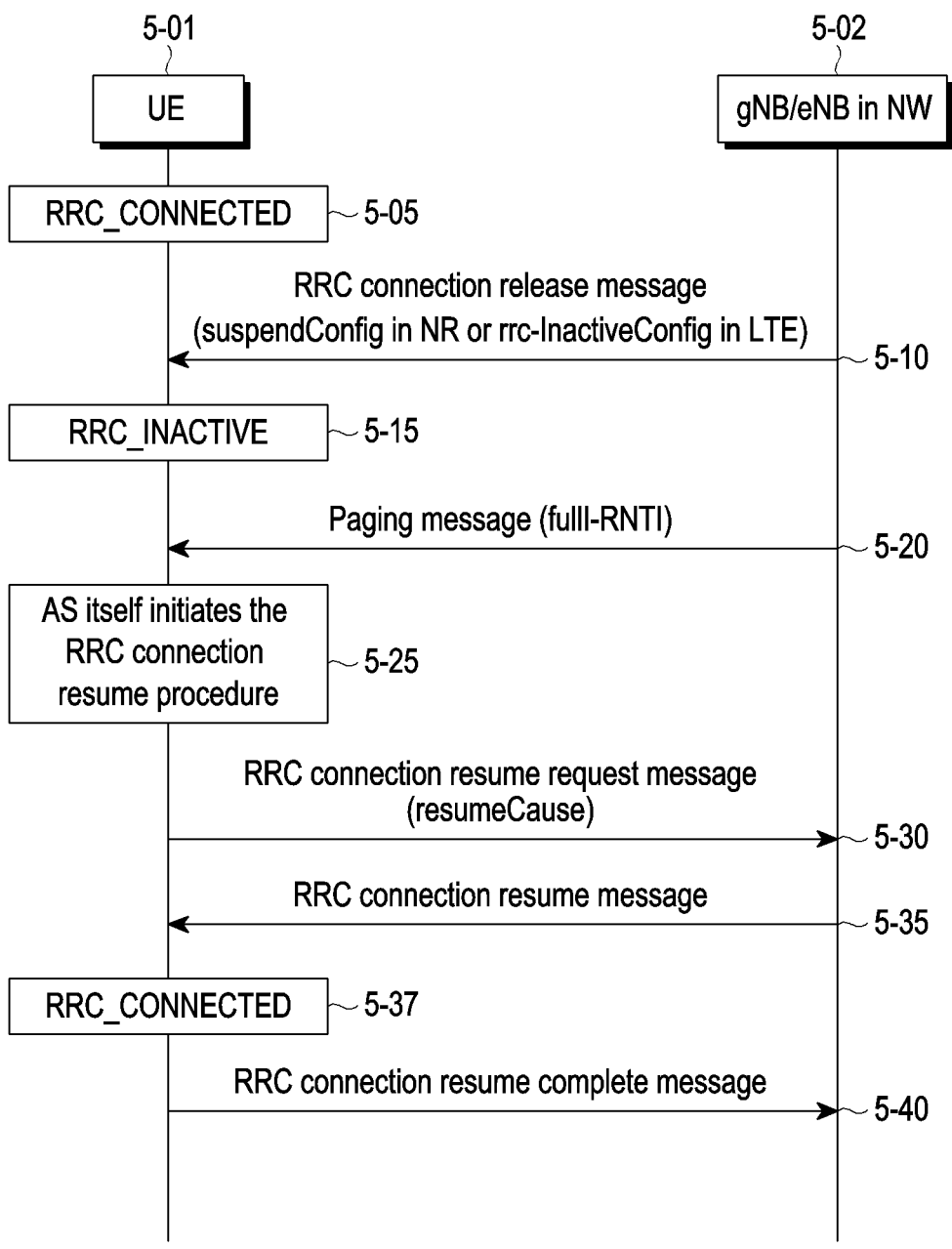
FIG. 5 is a flowchart illustrating a process in which a UE in an RRC_INACTIVE mode performs an RRC connection resume procedure with a base station according to reception of an RAN-initiated paging message according to an embodiment of the disclosure.

FIG. 5 is a flowchart illustrating a process in which a UE in an RRC_INACTIVE mode performs an RRC connection resume procedure with a base station according to reception of an RAN-initiated paging message according to an embodiment of the disclosure.

Referring to FIG. 5, the UE 5-01 may establish an RRC connection with the base station 5-02 and be in an RRC_CONNECTED mode (5-05).

In step 5-10, when there is no data transmission/reception with the in RRC_CONNECTED mode UE 5-01 for a predetermined time, the base station 5-02 may transmit an RRC connection release message (RRCRelease in NR or RRCConnectionRelease in LTE) to switch the UE into an RRC inactive mode. The message may include configuration information (suspendConfig in NR or rrc-InactiveConfig in LTE) required for the RRC inactive mode. For example, identifier values (full I-RNTI, short I-RNTI) for identifying the UE may be contained in the configuration information required for the RRC inactivation mode. The I-RNTI may be used to identify the UE context in the RRC inactive mode. The full I-RNTI is information that has a length of 40 bits, and the short I-RNTI is information that has a length of 24 bits.

In step 5-15, the UE 5-01 may apply the RRC connection release message to switch to the RRC inactive mode.

In step 5-20, the base station 5-02 may transmit a paging message to provide a Mobile Terminated Service (MT service) to the RRC inactive mode UE 5-01. The paging message is initiated by the base station (RAN-initiated), and the base station may set the paging UE identifier (PagingUE-Identity) received in the paging record to the fullI-RNTI and transmit the paging message to indicate transmission of the paging message for the UE. The fullI-RNTI value is the same as the value contained in the RRC connection release message in step 5-15.

In step 5-25, the RRC inactive mode UE 5-01 may determine whether the fullI-RNTI value stored, in step 5-15, in the paging message received in step 5-20 matches the UE identity (ue-Identity→PagingUE-Identity) contained in the paging record. When the fullI-RNTI value matches the UE identity, the UE 5-01 may initiate an RRC connection resume procedure in the AS layer device. In other words, the AS layer device of the UE may initiate an RRC connection resume procedure without separate interaction with the upper layer device of the UE.

In step 5-30, the RRC inactive mode UE 5-01 may transmit an RRC connection resume request message (RRCResumeRequest in NR or RRCConnectionResumeRequest in LTE) to the base station 5-02. The message may include a cause for resuming the RRC connection (resumeCause). The UE may set the resumeCause as follows, according to the access identity type set from the upper layer device.

If access identity 1 is set from the upper layer device of the UE, the AS layer device of the UE may set the resumeCause to mps-PriorityAccess and include it in the RRC connection request message.

Otherwise, if access identity 2 is set from the upper layer device of the UE, the AS layer device of the UE may set the resumeCause to mcs-PriorityAccess and include it in the RRC connection request message.

Otherwise, if at least one access identity among 11, 12, 13, 14, and 15 is set from the upper layer device of the UE, the AS layer device of the UE sets the resumeCause to highpriorityAccess and may include it in the RRC connection request message.

Otherwise, the AS layer device of the UE may set the resumeCause to mt-Access and include it in the RRC connection request message.

In step 5-35, the base station 5-01 may transmit an RRC connection resume message (RRCResume in NR or RRC-ConnectionResume in LTE) to the UE 5-01 in response to the RRC connection resume request message received in step 5-30. Upon receiving the RRC connection resume message, the UE 5-01 may apply it and switch to the RRC connected mode (5-37).

In step 5-40, the UE 5-01 that has switched to the RRC connection mode may transmit an RRC connection resume complete message (RRCResumeComplete in NR or RRC-ConnectionResumeComplete in LTE) to the base station 5-02. The UE may transmit/receive data to/from the base station.

The inactive mode UE according to an embodiment of the disclosure is characterized in that, upon reception of RAN-initiated paging, the UE sets the resumeCause in the AS layer device of the UE to perform an RRC connection resume procedure with the base station. It is also characterized that when receiving RAN-initiated paging, the inactive mode UE always initiates an RRC connection resume procedure.

Figure 6:
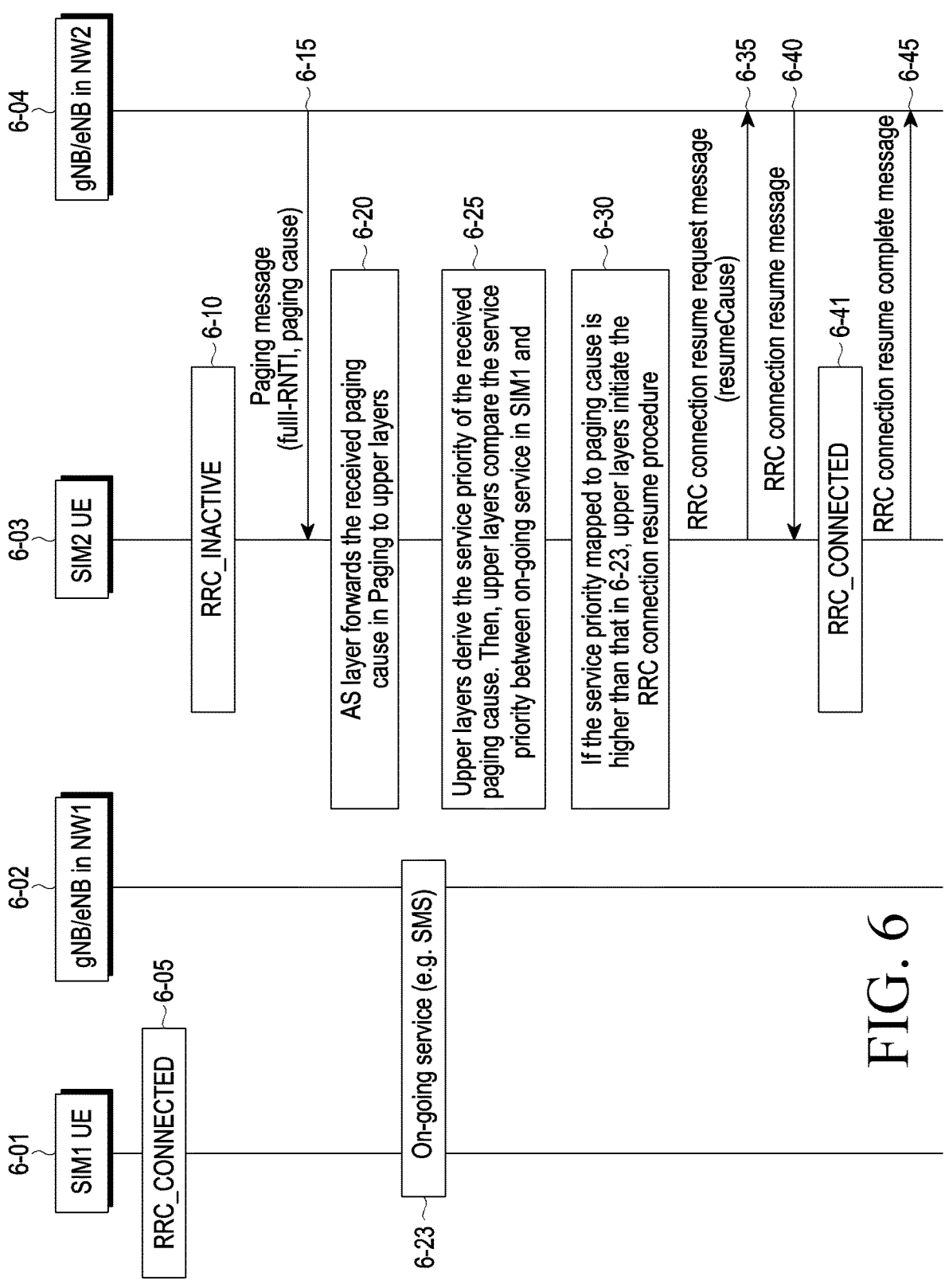
FIG. 6 is a flowchart illustrating operations of a UE and a base station when a UE supporting a plurality of subscriber identity modules (SIMs) (multi-SIM UE) receives a RAN-initiated paging message of a base station associated with one SIM according to an embodiment of the disclosure.

FIG. 6 is a flowchart illustrating operations of a UE and a base station when a UE supporting a plurality of subscriber identity modules (SIMs) (multi-SIM UE) receives a RAN-initiated paging message of a base station associated with one SIM according to an embodiment of the disclosure.

According to an embodiment of the disclosure, a multi-SIM UE may be a UE supporting two or more SIMs. In the disclosure, for convenience of description, a dual-SIM UE is considered. At a given time, the dual-SIM UE is characterized to be able to transmit to only one base station and receive from one or two base stations simultaneously.

Referring to FIG. 6, the multi-SIM UE may mean that one device supports a plurality of SIMs. For example, the multi-SIM UE may mean a SIM1 UE 6-01 when operating on SIM1, and a SIM2 UE 6-03 when operating on SIM2. The base station does not recognize the multi-SIM UE as one UE, but may recognize each SIM UE as one UE. For example, base station 1 6-02 may recognize the SIM1 UE 6-01 as one UE, and base station 2 6-04 may recognize the SIM2 UE 6-03 as one UE. In the following embodiments of the disclosure, for convenience of description, when the multi-SIM UE communicates on SIM1, the multi-SIM UE is referred to as a SIM1 UE and, when the multi-SIM UE communicates on SIM2, the multi-SIM UE is referred to as a SIM2 UE. The multi-SIM UE may be the SIM1 UE or SIM2 UE depending on which one of SIM1 and SIM2 is used.

In step 6-05, the SIM1 UE 6-01 of the multi-SIM UE may be in the in RRC_CONNECTED mode with base station 1 6-02.

In step 6-10, the SIM2 UE 6-03 of the multi-SIM UE may be in the in RRC_INACTIVE mode with base station 2 6-04. According to the above-described embodiment (FIG. 5), the RRC inactive mode UE stores configuration information necessary for the RRC inactive mode.

In step 6-15, the SIM2 UE 6-03 of the multi-SIM UE may receive a RAN-initiated paging message from base station 2 6-04. A paging message according to an embodiment of the disclosure may include a value of a paging cause for sending a paging for each paging record. For example, the paging cause may include at least one of the following.

Voice: A value indicating the cause for transmitting a paging for VoLTE or VoNR

SMS: A value indicating the cause for transmitting a paging for the SMS service

IMS Signaling: A value indicating the cause for transmitting a paging for IMS signaling CP Signaling: A value indicating the cause for transmitting a paging for CP signaling Critical services: A value indicating the cause for transmitting a paging for a critical service other data: A value indicating the cause for transmitting a paging for data services other than those mentioned above In step 6-20, the SIM2 UE 6-03 of the multi-SIM UE may determine whether the fullI-RNTI value stored in the paging message received in step 6-15 when switching to the RRC inactive mode matches the UE identity (ue-Identity→PagingUE-Identity) contained in the paging record. When the fullI-RNTI value matches the UE identity, it is suggested to transfer the paging cause mapped to the UE identity to the upper layer rather than initiating the RRC connection resume procedure in the AS layer of the UE 6-03. The cause for transferring the paging cause to the upper layer is for the multi-SIM UE to determine what service it is to prioritize, and information about the service priority is internal information that is not known to the AS layer device but may be known to the upper layer device in the UE.

In step 6-25, the upper layer device of the SIM2 UE 6-03 of the multi-SIM UE may grasp (6-23) what service the SIM1 UE 6-01 of the multi-SIM UE transmits/receives data to/from base station 1 6-02 for and may grasp the priority value for the service. The upper layer device of the SIM2 UE 6-03 of the multi-SIM UE may derive the service priority value mapped to the paging cause received in step 6-15. Accordingly, the multi-SIM UE may compare the service priority value that is in progress in the SIM1 UE with the service priority value mapped to the paging cause in the SIM2 UE. Of course, in step 6-23, the SIM1 UE 6-01 of the multi-SIM UE along with base station 1 6-02 may provide no service. When the AS layer device of the SIM2 UE of the multi-SIM UE may determine that the SIM1 UE 6-01 of the multi-SIM UE along with base station 1 6-02 provides no service, the AS layer device of the SIM2 UE of the multi-SIM UE may initiate an RRC connection resume procedure like in the above-described embodiment, in step 6-20.

In step 6-30, when the service priority mapped to the paging cause received in step 6-15 is higher than the service priority that is in progress in the SIM1 UE 6-01 (higher service priority may mean that the corresponding service is more critical, and if the service is not in progress, the service is determined to have the lowest service priority), the upper layer device of the SIM2 UE 6-03 of the multi-SIM UE may initiate an RRC connection resume procedure to resume the RRC connection with base station 2 6-04.

In step 6-35, the upper layer device of the SIM2 UE 6-03 of the multi-SIM UE may set the resumeCause according to the access identity type set by the upper layer device, like in the above-described embodiment (FIG. 5), or may set the resumeCause according to the paging cause and transmit an RRC connection resume request message including the set resumeCause to base station 2 6-04.

In step 6-40, base station 2 6-04 may transmit an RRC connection resume message (RRCResume in NR or RRC-ConnectionResume in LTE) to the SIM2 UE 6-03 in response to the RRC connection resume request message received in step 6-35. Upon receiving the RRC connection resume message, the SIM2 UE 6-03 may apply it and switch to the RRC connected mode (6-41).

In step 6-45, the SIM2 UE 6-03 that has switched to the RRC connection mode may transmit an RRC connection resume complete message (RRCResumeComplete in NR or RRCConnectionResumeComplete in LTE) to base station 2 6-04.

Figure 7A:
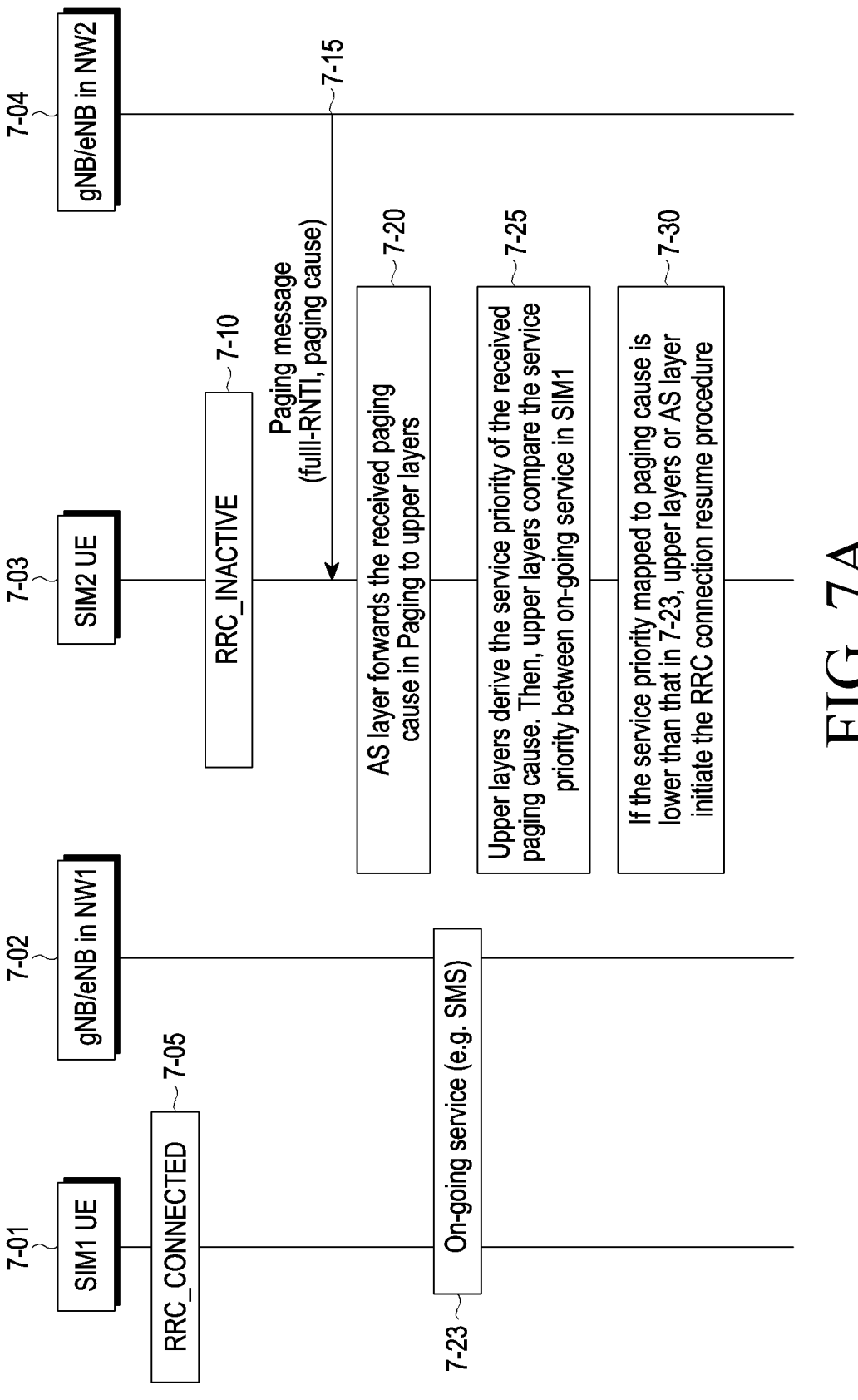
FIGS. 7A and 7B are flowcharts illustrating operations of a UE and a base station when a UE supporting a plurality of subscriber identity modules (SIMs) (multi-SIM UE)
Figure 7B:
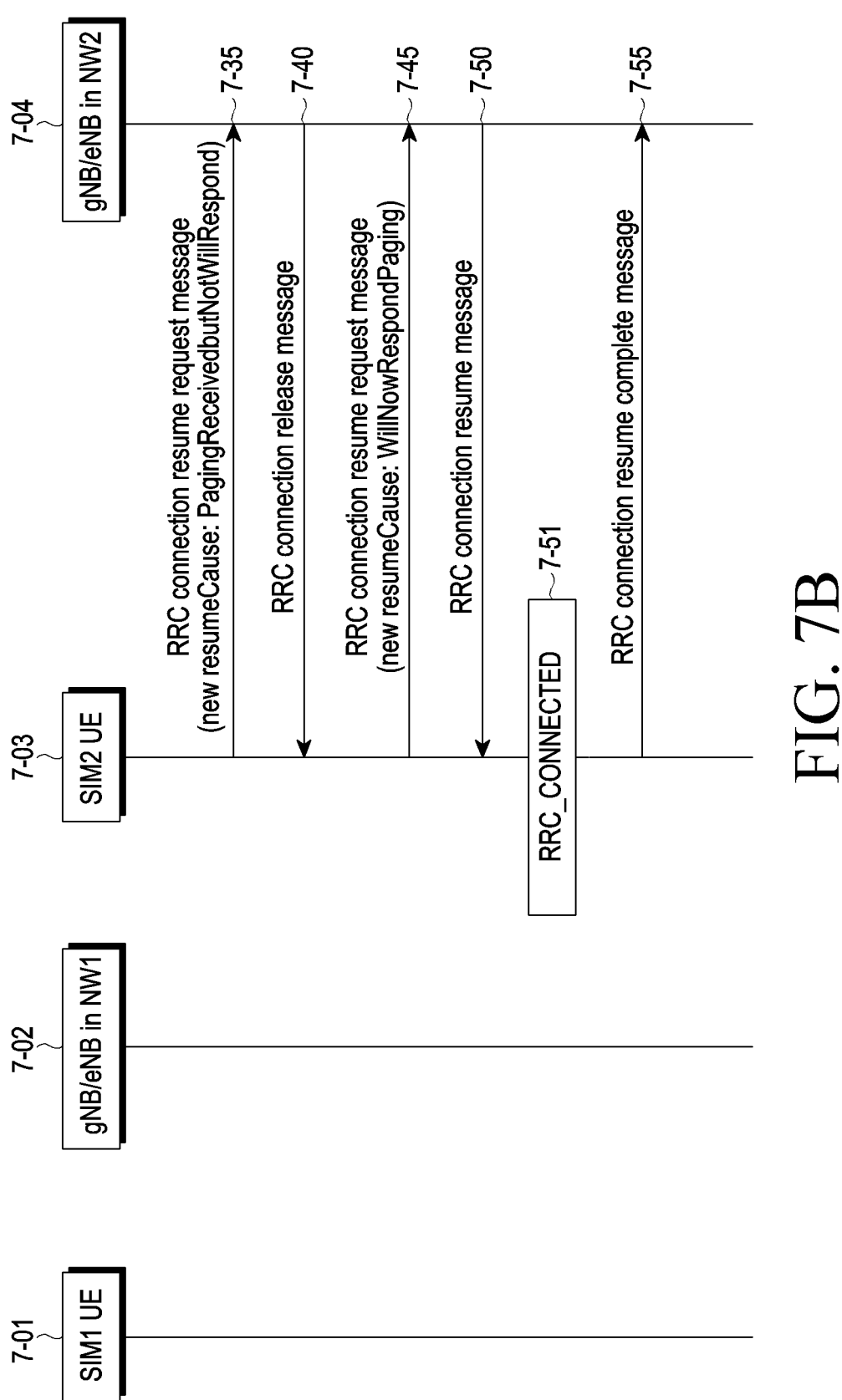

FIGS. 7A and 7B are flowcharts illustrating operations of a UE and a base station when a UE supporting a plurality of subscriber identity modules (SIMs) (multi-SIM UE) receives a RAN-initiated paging message of a base station associated with one SIM according to an embodiment of the disclosure.

In step 7-05, the SIM1 UE 7-01 of the multi-SIM UE may be in the in RRC_CONNECTED mode with base station 1 7-02.

In step 7-10, the SIM2 UE 7-03 of the multi-SIM UE may be in the in RRC_INACTIVE mode with base station 2 7-04. According to the above-described embodiment, the RRC inactive mode UE stores configuration information necessary for the RRC inactive mode.

In step 7-15, the SIM2 UE 7-03 of the multi-SIM UE may receive a RAN-initiated paging message from base station 2 7-04. A paging message according to an embodiment of the disclosure may include a value of a paging cause for sending a paging for each paging record. For example, the paging cause may include at least one of the following.

Voice: A value indicating the cause for transmitting a paging for VoLTE or VoNR

SMS: A value indicating the cause for transmitting a paging for the SMS service

IMS Signaling: A value indicating the cause for transmitting a paging for IMS signaling CP Signaling: A value indicating the cause for transmitting a paging for CP signaling Critical services: A value indicating the cause for transmitting a paging for a critical service other data: A value indicating the cause for transmitting a paging for data services other than those mentioned above In step 7-20, the SIM2 UE 7-03 of the multi-SIM UE may determine whether the fullI-RNTI value stored in the paging message received in step 7-15 when switching to the RRC inactive mode matches the UE identity (ue-Identity→PagingUE-Identity) contained in the paging record. When the fullI-RNTI value matches the UE identity, it is suggested to transfer the paging cause mapped to the UE identity to the upper layer device rather than initiating the RRC connection resume procedure in the AS layer device of the UE 7-03. The cause for transferring the paging cause to the upper layer device is for the multi-SIM UE to determine what service it is to prioritize, and information about the service priority is not known to the AS layer device but may be known only to the upper layer device in the UE.

In step 7-25, the upper layer device of the SIM2 UE 7-03 of the multi-SIM UE may grasp (7-23) what service the SIM1 UE 7-01 of the multi-SIM UE transmits/receives data to/from base station 1 7-02 for and may grasp the priority value for the service. The upper layer device of the SIM2 UE 7-03 of the multi-SIM UE may derive the service priority value mapped to the paging cause received in step 7-15. Accordingly, the multi-SIM UE may compare the service priority value that is in progress in the SIM1 UE with the service priority value mapped to the paging cause in the SIM2 UE.

In step 7-30, when the service priority mapped to the received paging cause is lower than the service priority that is in progress in the SIM1 UE 7-01, the SIM2 UE 7-03 of the multi-SIM UE may initiate the RRC connection resume procedure. The cause for initiating the RRC connection resume procedure is to indicate that although the SIM2 UE of the multi-SIM UE properly receives the paging message initiated by base station 2 7-04, it cannot correspond to the paging message for continuing the service that is in progress in the SIM1 UE. This is intended for base station 2 7-04 to indicate whether the SIM2 UE of the multi-SIM UE has properly received the paging message (when the paging message is received, and contains the fullI-RNTI for identifying the SIM2 UE of the multi-SIM UE), but does not correspond to (or respond to) it or it has received the paging message itself (for continuing the service of the SIM1 UE, i.e., for the multi-SIM purposes) or for a predetermined cause (e.g., due to poor channel).

In step 7-35, the upper layer device of the SIM2 UE 7-03 of the multi-SIM UE properly receives the paging message to continue the service that is in progress in the SIM1 UE 7-01 but transfers a new resumeCause (e.g., PagingReceivedbutWillNotRespond) that may not correspond to the paging message to the AS layer device, and the new resumeCause received from the upper layer device by the AS layer device may be included in the RRC connection resume request message, and the SIM2 UE 7-03 of the multi-SIM UE may transmit the RRC connection resume request message to base station 2 7-04. Or, upon failing to receive separate information from the upper layer device in step 7-35, the AS layer device of the SIM2 UE 7-03 of the multi-SIM UE may set the new resumeCause and include it in the RRC connection resume request message, and the SIM2 UE 7-03 of the multi-SIM UE may transmit the RRC connection resume request message to base station 2 7-03.

In step 7-40, the base station 7-04 may transmit an RRC connection release message to the SIM2 UE 7-03 of the multi-SIM UE. Base station 2 7-04 may delete the paging-related information created in step 7-15 and may not transmit the paging message any longer. Of course, base station 2 7-04 may maintain the paging-related information created in step 7-15 and provide the SIM2 UE 7-03 of the multi-SIM UE with the MT service (e.g., voice, critical services, short message service (SMS), IP multimedia subsystem (IMS) signaling, control plane (CP) signaling and/or other data) created/generated in step 7-15 to the SIM2 UE 7-03 of the multi-SIM UE according to a subsequent operation of the SIM2 UE 7-03 of the multi-SIM UE.

In step 7-45, it is suggested that the SIM2 UE 7-03 of the multi-SIM UE initiates an RRC connection resume procedure to indicate that the paging message received in step 7-15 is now correspondable. As an example, when the service priority mapped to the paging cause received in step 7-15 is higher than the service priority that is in progress in the SIM1 UE 7-01 or when there is no service that is in progress in the SIM1 UE 7-01, the upper layer device of the SIM2 UE 7-03 of the multi-SIM UE may initiate an RRC connection resume procedure. In other words, in step 7-45, the upper layer device of the SIM2 UE 7-03 of the multi-SIM UE may transfer the new resumeCause (e.g., WillNowRespondPaging) to the AS layer device, and the AS layer device may include the new resumeCause received from the upper layer device in the RRC connection resume request message, and the SIM2 UE 7-03 of the multi-SIM UE may transmit the RRC connection resume request message to the base station 7-04. Or, upon failing to receive separate information from the upper layer device, the AS layer device of the SIM2 UE 7-03 of the multi-SIM UE may set the new resumeCause and include it in the RRC connection resume request message, and the SIM2 UE 7-03 of the multi-SIM UE may transmit the RRC connection resume request message to the base station 7-04.

In step 7-50, base station 2 7-04 may transmit an RRC connection resume message (RRCResume in NR or RRC-ConnectionResume in LTE) to the SIM2 UE 7-03 in response to the RRC connection resume request message received in step 7-35. Upon receiving the RRC connection resume message, the UE 7-03 may apply it and switch to the RRC connected mode (7-51).

In step 7-55, the UE 7-03 that has switched to the RRC connection mode may transmit an RRC connection resume complete message (RRCResumeComplete in NR or RRC-ConnectionResumeComplete in LTE) to the base station 2 7-04. The message may also include a time stamp about the paging message received in step 7-15 (e.g., information about what time the paging message was received, and/or how long time has elapsed after reception of the paging message, or what cell the paging message has been received from). The UE 7-03 which has switched to the RRC connected mode and base station 2 7-04 may perform the MT service generated in step 7-15.

FIGS. 8A and 8B are flowcharts illustrating operations of a UE and a base station when a UE supporting a plurality of subscriber identity modules (SIMs) (multi-SIM UE) receives a RAN-initiated paging message of a base station associated with one SIM according to an embodiment of the disclosure.

In step 8-05, the SIM1 UE 8-01 of the multi-SIM UE may be in the in RRC_CONNECTED mode with base station 1 8-02.

In step 8-10, the SIM2 UE 8-03 of the multi-SIM UE may be in the in RRC_INACTIVE mode with base station 2 8-04. According to the above-described embodiment, the RRC inactive mode UE 8-03 stores configuration information necessary for the RRC inactive mode.

In step 8-15, the SIM2 UE 8-03 of the multi-SIM UE may receive a RAN-initiated paging message from base station 2 8-04. A paging message according to an embodiment of the disclosure may include a value of a paging cause for sending a paging for each paging record. For example, the paging cause may include at least one of the following.

Voice: A value indicating the cause for transmitting a paging for VoLTE or VoNR

SMS: A value indicating the cause for transmitting a paging for the SMS service

IMS Signaling: A value indicating the cause for transmitting a paging for IMS signaling CP Signaling: A value indicating the cause for transmitting a paging for CP signaling Critical services: A value indicating the cause for transmitting a paging for a critical service other data: A value indicating the cause for transmitting a paging for data services other than those mentioned above In step 8-20, the SIM2 UE 8-03 of the multi-SIM UE may determine whether the fullI-RNTI value stored in the paging message received in step 8-15 when switching to the RRC inactive mode is identical to the UE identity (ue-Identity→PagingUE-Identity) contained in the paging record. When the fullI-RNTI value matches the UE identity, it is suggested to transfer the paging cause mapped to the UE identity to the upper layer device rather than initiating the RRC connection resume procedure in the AS layer device of the UE 8-03. The cause for transferring the paging cause to the upper layer device is for the multi-SIM UE to determine what service it is to prioritize, and information about the service priority is not known to the AS layer device but may be known only to the upper layer device in the UE.

In step 8-25, the upper layer device of the SIM2 UE 8-03 of the multi-SIM UE may grasp (8-23) what service the SIM1 UE 8-01 of the multi-SIM UE transmits/receives data to/from base station 1 8-02 for and may grasp the priority value for the service. The upper layer device of the SIM2 UE 8-03 of the multi-SIM UE may derive the service priority value mapped to the paging cause received in step 8-15. Accordingly, the multi-SIM UE may compare the service priority value that is in progress in the SIM1 UE with the service priority value mapped to the paging cause in the SIM2 UE.

In step 8-30, when the service priority mapped to the received paging cause is lower than the service priority that is in progress in the SIM1 UE 8-01 (higher service priority may mean that the corresponding service is more critical), the SIM2 UE 8-03 of the multi-SIM UE may initiate the RRC connection resume procedure. The cause for initiating the RRC connection resume procedure is to indicate that although the SIM2 UE of the multi-SIM UE properly receives the paging message initiated by base station 2 8-04, it cannot correspond to the paging message for continuing the service that is in progress in the SIM1 UE. This is intended for base station 2 8-04 to indicate whether the SIM2 UE of the multi-SIM UE has properly received the paging message (when it receives the paging message, and the message includes the fullI-RNTI for identifying the SIM2 UE of the multi-SIM UE), but does not correspond to it or it has received the paging message itself (to continue the service of the SIM1 UE, i.e., for multi-SIM purposes) or a predetermined cause (e.g., due to poor channel).

In step 8-35, the SIM2 UE 8-03 of the multi-SIM UE may transmit an RRC connection resume request message to the base station 8-04. The message may include the above-described new resumeCause or the existing resumeCause defined.

In step 8-40, base station 2 8-04 may transmit an RRC connection resume message (RRCResume in NR or RRC-ConnectionResume in LTE) to the SIM2 UE 8-03 in response to the RRC connection resume request message received in step 8-35. Upon receiving the RRC connection resume message, the UE 8-03 may apply it and switch to the RRC connected mode (8-41).

In step 8-45, the UE 8-03 that has switched to the RRC connection mode may transmit an RRC connection resume complete message (RRCResumeComplete in NR or RRC-ConnectionResumeComplete in LTE) to the base station 2 8-04. The RRC connection resume complete message may include information (e.g., busy indication for other SIM) for indicating that it cannot correspond (or respond) to the paging message to continue the service that is in progress in the SIM1 UE although the paging message has properly been received from the base station 8-04 in step 8-15. Further, the message may include information about whether to switch to the RRC inactive mode or RRC idle mode or time information (e.g., information requesting to stop data transmission/reception for a predetermined time. Base station 2 cannot transmit or receive data for the time). The information may also be included in the dedicated NAS message contained in the RRC connection resume complete message.

In step 8-50, the base station 2 8-04 may transmit an RRC connection release message to the SIM2 UE 8-03 of the multi-SIM UE.

Then, in step 8-55, if the SIM2 UE of the multi-SIM UE may correspond (or respond) to the paging message received in step 7-15, it may resume the RRC connection with base station 2 8-04 to transmit an RRC connection resume complete message. The message may include information for corresponding to the paging message received in step 8-15. As an example, the information may mean not busy indication for other SIM or time stamp information (e.g., when the paging message received in step 8-15 was received, or how long time has elapsed). The information may also be included in the dedicated NAS message contained in the RRC connection resume complete message.

FIG. 9 is a flowchart illustrating operations of a UE and a base station when a UE supporting a plurality of subscriber identity modules (SIMs) (multi-SIM UE) receives a RAN-initiated paging message of a base station associated with one SIM according to an embodiment of the disclosure.

In step 9-05, the SIM1 UE 9-01 of the multi-SIM UE may be in the in RRC_CONNECTED mode with base station 1 9-02.

In step 9-10, the SIM2 UE 9-03 of the multi-SIM UE may be in the in RRC_INACTIVE mode with base station 2 9-04. According to the above-described embodiment, the RRC inactive mode UE stores configuration information necessary for the RRC inactive mode.

In step 9-15, the SIM2 UE 9-03 of the multi-SIM UE may receive a RAN-initiated paging message from base station 2 9-04. It may be characterized that a paging message according to an embodiment of the disclosure does not include a value of a paging cause for sending a paging for each paging record.

In step 9-20, the SIM2 UE 9-03 of the multi-SIM UE may determine whether the fullI-RNTI value stored in the paging message received in step 9-15 when switching to the RRC inactive mode matches the UE identity (ue-Identity→PagingUE-Identity) contained in the paging record. When the fullI-RNTI value matches the UE identity, it is suggested to transfer an indicator or information (paging cause: 'None') indicating that there is no paging cause mapped to the UE identity to the upper layer device rather than initiating the RRC connection resume procedure in the AS layer device of the UE 9-03. This is why the AS layer device of the SIM2 UE 9-03 of the multi-SIM UE cannot know whether the SIM1 UE 9-01 of the multi-SIM UE receives a service from base station 1 9-02. Of course, if the AS layer device of the SIM2 UE 9-03 of the multi-SIM UE is able to know whether the SIM1 UE 9-01 of the multi-SIM UE receives a service from base station 1 9-02, it may follow the above-described embodiments without initiating an RRC connection resume procedure.

In step 9-25, the upper layer device of the SIM2 UE 9-03 of the multi-SIM UE may identify that the SIM1 UE 9-01 of the multi-SIM UE does not proceed with a service with base station 1 9-02 (9-23). As an example, no service being in progress may mean that the SIM1 UE 9-01 is unable to transmit/receive data to/from base station 1 9-02. As an example, the SIM1 UE 9-01 of the multi-SIM UE may perform measurement according to the measurement configuration information configured by base station 1 9-02.

In step 9-30, if the SIM1 UE 9-01 of the multi-SIM UE does not proceed with a service with base station 1 9-02 (9-23), or the SIM1 UE 9-01 proceeds with something irrelevant to any service, such as perform measurement, the SIM2 UE 7-03 of the multi-SIM UE may initiate an RRC connection resume procedure in the upper layer device.

In step 9-35, the upper layer device of the SIM2 UE 9-03 of the multi-SIM UE may transmit an RRC connection resume request message to base station 2 9-04. The message may include the above-described new resumeCause or the existing resumeCause defined.

In step 9-40, base station 2 9-04 may transmit an RRC connection resume message (RRCResume in NR or RRC-ConnectionResume in LTE) to the SIM2 UE 9-03 in response to the RRC connection resume request message received in step 9-35. Upon receiving the RRC connection resume message, the UE 9-03 may apply it and switch to the RRC connected mode (9-41).

In step 9-45, the UE 9-03 that has switched to the RRC connection mode may transmit an RRC connection resume complete message (RRCResumeComplete in NR or RRC-ConnectionResumeComplete in LTE) to the base station 2 9-04.

FIG. 10 is a flowchart illustrating operations of a UE and a base station when a UE supporting a plurality of subscriber identity modules (STMs) (multi-SIM UE) receives a core network-initiated paging message of a core network associated with one SIM according to an embodiment of the disclosure.

In step 10-06, the SIM1 UE 10-01 of the multi-SIM UE may be in the in RRC_CONNECTED mode with base station 1 10-02.

In step 10-10, the SIM2 UE 10-03 of the multi-SIM UE may be in an RRC inactive mode (RRC_INACTIVE) or RRC idle mode (RRC_IDLE) with base station 2 10-04.

In step 10-15, the SIM2 UE 10-03 of the multi-SIM UE may receive a core network 2-initiated (CN-initiated) paging message from base station 2 10-05. The paging message according to an embodiment of the disclosure may include the UE identity (ng-5G-S-TMSI) contained in the paging record and a value of a paging cause for sending a paging for each paging record. The paging cause value may be included in the paging message or be omitted. For example, the paging cause may include at least one of the following.

Voice: A value indicating the cause for transmitting a paging for VoLTE or VoNR

SMS: A value indicating the cause for transmitting a paging for the SMS service

IMS Signaling: A value indicating the cause for transmitting a paging for IMS signaling CP Signaling: A value indicating the cause for transmitting a paging for CP signaling Critical services: A value indicating the cause for transmitting a paging for a critical service other data: A value indicating the cause for transmitting a paging for data services other than those mentioned above In step 10-20, the SIM2 UE 10-03 of the multi-SIM UE may determine whether the UE identity allocated from the upper layer device matches the UE identity (ue-Identity→PagingUE-Identity→ng-5G-S-TMSI) contained in the paging record included in the paging message received in step 10-15. If not matching, the UE 10-03 may switch from the RRC inactive mode to the RRC idle mode (if in the RRC idle mode, the RRC idle mode is maintained). It is suggested that the AS layer device of the SIM2 UE of the multi-SIM UE transfers the paging cause mapped to the UE identity (if the paging cause is absent, 'none' or an indicator therefor) to the upper layer device.

In step 10-25, the upper layer device of the SIM2 UE 10-03 of the multi-SIM UE may grasp (10-23) what service the SIM1 UE 10-01 of the multi-SIM UE transmits/receives data to/from base station 1 10-02 for and may grasp the priority value for the service. The upper layer device of the SIM2 UE 10-03 of the multi-SIM UE may derive the service priority value mapped to the paging cause received in step 10-15. Accordingly, the multi-SIM UE may compare the service priority value that is in progress in the SIM1 UE with the service priority value mapped to the paging cause in the SIM2 UE. In step 10-25, the upper layer device of the SIM2 UE 10-03 of the multi-SIM UE may grasp (10-23) whether there is a service that the SIM1 UE 9-01 of the multi-SIM UE performs with base station 1 10-02.

In step 10-30, when the service priority mapped to the received paging cause is lower than the service priority that is in progress in the SIM1 UE 10-01 (higher service priority may mean that the corresponding service is more critical), the SIM2 UE 10-03 of the multi-SIM UE may initiate the RRC connection setup procedure. The reason for initiating the RRC connection setup procedure may follow the above-described embodiments. In step 10-30, if the SIM1 UE 9-01 of the multi-SIM UE does not proceed with a service with base station 1 9-02 (9-23), or the SIM1 UE 9-01 proceeds with something irrelevant to any service, such as perform measurement, the SIM2 UE 7-03 of the multi-SIM UE may initiate an RRC connection resume procedure in the upper layer device.

In step 10-35, the SIM2 UE 10-03 of the multi-SIM UE may transmit an RRC connection setup request message to the base station 10-04. The message may include a new establishmentCause (the same value as the above-described new resumeCause) or the existing resumeCause defined.

In step 10-40, base station 2 10-04 may transmit an RRC connection setup message (RRCSetup in NR or RRCConnectionSetup in LTE) to the SIM2 UE 10-03 in response to the RRC connection setup request message received in step

10-35. Upon receiving the RRC connection setup message, the UE 10-03 may apply it and switch to the RRC connected mode (10-41).

In step 10-45, the UE 10-03 that has switched to the RRC connection mode may transmit an RRC connection setup complete message (RRCSetupComplete in NR or RRCConnectionSetupComplete in LTE) to base station 2 10-04. The RRC connection setup complete message may include the information in the above-described embodiments.

FIG. 11 is a flowchart illustrating a process in which a UE in RRC_CONNECTED mode performs measurement based on measurement configuration information configured by a base station according to an embodiment of the disclosure.

Referring to FIG. 11, the UE 11-01 may receive a predetermined RRC message (e.g., RRC connection release message (RRCResume) or RRC connection reconfiguration message (RRCReconfiguration)) containing measurement configuration information (measConfig) from the base station 11-02. The measurement configuration information may refer to configuration information applied by the UE in the RRC connected mode (RRC_CONNECTED). The measurement configuration information may include measurement gap configuration information (MeasGapConfig). In the MeasGapConfig, gap configuration information (GapConfig) may be configured for each FR (e.g., gapFR1 or gapFR2), or gap configuration information may be configured regardless of the FR (gapUE). The MeasGapConfig may include at least one of the following parameters. The definition of each parameter is shown in Table 1 and Table 2 below.

TABLE 1

| MeasGapConfig ::= | SEQUENCE { |
| --- | --- |
| gapFR2 | SetupRelease { GapConfig } |
| Optional,   -- Need M | |
| ... | |
| [[ | |
| gapFR1 | SetupRelease { GapConfig } |
| Optional,   -- Need M | |
| gapUE1 | SetupRelease { GapConfig } |
| Optional,   -- Need M | |
| ]] | |
| } | |
| GapConfig ::= | SEQUENCE { |
| gapOffset | INTEGER (0..159), |
| mgl | ENUMERATED {msldot5, ms3, ms3dot5, ms4, |
| ms5dot5, ms6}, | |
| mgrp | ENUMERATED {ms20, ms40, ms80, ms160}, |
| mgta | ENMUERATED {ms0, ms0dot25, ms0dot5}, |
| ..., | |
| [[ | |
| refServCellIndicator | ENUMERATED {pCell, pSCell, mcg-FR2} |
| OPTIONAL   -- Cond NEDCorNRDC | |
| ]], | |
| [[ | |
| refFR2ServCellAsyncCA-r16 | ServCellIndex |
| OPTIONAL,   -- Cond AsyncCA | |
| mgl-r16 | ENUMERATED {ms10, ms20} |
| OPTIONAL   -- Cond PRS | |
| ]] | |
| } | |

TABLE 2 gapFR1

Indicates measurement gap configuration that applies to FR1 only. In (NG)EN-DC, gapFR1 cannot be set up by NR RRC (i.e. only LTE RRC can configure FR1 measurement gap). In NE-DC, gapFR1 can only be set up by NR RRC (i.e. LTE RRC cannot configure FR1 gap). In NR-DC, gapFR1 can only be set up in the measConfig associated with MCG. gapFR1 can not be configured together with gapUE. The applicability of the FR1 measurement gap is according to Table 9.1.2-2 and Table 9.1.2-3 in TS 38.133 [14].

TABLE 2-continued gapFR2
Indicates measurement gap configuration applies to FR2 only. In (NG)EN-DC or NE-DC, gapFR2 can only be
set up by NR RRC (i.e. LTE RRC cannot configure FR2 gap). In NR-DC, gapFR2 can only be set up in the
measConfig associated with MCG. gapFR2 cannot be configured together with gapUE. The applicability of the
FR2 measurement gap is according to Table 9.1.2-2 and Table 9.1.2-3 in TS 38.133 [14].
gapUE
Indicates measurement gap configuration that applies to all frequencies (FR1 and FR2). In (NG)EN-DC,
gapUE cannot be set up by NR RRC (i.e. only LTE RRC can configure per UE measurement gap). In NE-DC,
gapUE can only be set up by NR RRC (i.e. LTE RRC cannot configure per UE gap). In NR-DC, gapUE can
only be set up in the measConfig associated with MCG. If gapUE is configured, then neither gapFR1 nor
gapFR2 can be configured. The applicability of the per UE measurement gap is according to Table 9.1.2-2
and Table 9.1.2-3 in TS 38.133 [14].
gapOffset
Value gapOffset is the gap offset of the gap pattern with MGRP indicated in the field mgrp. The value
range is from 0 to mgrp-1.
mgl
Value mgl is the measurement gap length in ms of the measurement gap. The measurement gap length is
according to in Table 9.1.2-1 in TS 38.133 [14]. Value ms1dot5 corresponds to 1.5 ms, ms3 corresponds to 3
ms and so on. If mgl-r16 is signalled, UE shall use mgl-r16 (with suffix) and ignore the mgl (without suffix).
mgrp
Value mgrp is measurement gap repetition period in (ms) of the measurement gap. The measurement gap
repetition period is according to Table 9.1.2-1 in TS 38.133 [14].
mgta
Value mgta is the measurement gap timing advance in ms. The applicability of the measurement gap timing
advance is according to clause 9.1.2 of TS 38.133 [14]. Value ms0 corresponds to 0 ms, ms0dot25
corresponds to 0.25 ms and ms0dot5 corresponds to 0.5 ms. For FR2, the network only configures 0 ms
and 0.25 ms.
refFR2ServCelllAsyncCA
Indicates the FR2 serving cell identifier whose SFN and subframe is used for FR2 gap calculation for
this gap pattern with asynchronous CA involving FR2 carrier(s).
refServCellIndicator
Indicates the serving cell whose SFN and subframe are used for gap calculation for this gap pattern. Value
pCell corresponds to the PCell, pSCell corresponds to the PSCell, and mcg-FR2 corresponds to a serving cell
on FR2 frequency in MCG.

The MeasGapConfig may have the following character-
istics.

This is configuration information configured by the base
station 11-02 to the UE 11-01, and may determine
whether the base station configures or releases the
GapConFIG. In other words, the LUE cannot request
the base station to set up or release the GapConFIG.

When the base station 11-02 configures the GapConfig for
FR1 to the UE 11-01, two or more may be configured
for each of the parameters included in the GapConFIG.
In other words, gapOffset, mgl, or mgta may be set to
only one value. Although the base station configures
the GapConfig to the UE for FR2 or regardless of FR1,
two or more may be configured for each parameter
included in the GapConFIG.

In step 11-10, the RRC connected mode UE 11-01 may
apply the MeasGapConfig to perform measurement. The
timing of performing the measurement may be determined
as follows.

if gapFR1 is set to setup:
  if an FR1 measurement gap configuration is already
  setup, release the FR1 measurement gap configura-
  tion;
  setup the FR1 measurement gap configuration indi-
  cated by the measGapConfig in accordance with the
  received gapOffset, i.e., the first subframe of each
  gap occurs at an SFN and subframe meeting the
  following condition 1:

SFN mod $T$=FLOOR(gapOffset/10);

subframe=gapOffset mod 10;               <Condition 1> with T=MGRP/10 as defined in TS 38.133;
  apply the specified timing advance mgta to the gap
  occurrences calculated above (i.e. the UE starts the
  measurement mgta ms before the gap subframe
  occurrences);

else if gapFR1 is set to release:
  release the FR1 measurement gap configuration;
if gapFR2 is set to setup:
  if an FR2 measurement gap configuration is already
  setup, release the FR2 measurement gap configura-
  tion;
  setup the FR2 measurement gap configuration indi-
  cated by the measGapConfig in accordance with the
  received gapOffset, i.e., the first subframe of each
  gap occurs at an SFN and subframe meeting the
  above condition 1: <Condition 1>)
  apply the specified timing advance mgta to the gap
  occurrences calculated above (i.e. the UE starts the
  measurement mgta ms before the gap subframe
  occurrences);
else if gapFR2 is set to release:
  release the FR2 measurement gap configuration;
if gapUE is set to setup:
  if a per UE measurement gap configuration is already
  setup, release the per UE measurement gap configu-
  ration;
  setup the per UE measurement gap configuration indi-
  cated by the measGapConfig in accordance with the
  received gapOffset, i.e., the first subframe of each
  gap occurs at an SFN and subframe meeting the
  above condition 1: <Condition 1>)
  apply the specified timing advance mgta to the gap
  occurrences calculated above (i.e. the UE starts the
  measurement mgta ms before the gap subframe
  occurrences);
else if gapUE is set to release:
  release the per UE measurement gap configuration;
In step 11-15, the base station 11-02 may transmit, to the
UE 11-01, a predetermined RRC message (e.g., RRC con-
nection resume message (RRCResume) or RRC connection reconfiguration message (RRCReconfiguration)) containing needForGapsConfigNR (which is configuration information for reporting measurement gap requirements for the NR target bands. The requestedTargetBandFilterNR contained in the needForGapsConfigNR includes one or more NR frequency band values (FreqBandIndicatorNR)). When the needForGapsConfigNR is included in the predetermined RRC message, the UE may perform the following procedure.

if needForGapsConfigNR is set to setup:
consider itself to be configured to provide the measurement gap requirement information of NR target bands;
else,
consider itself not to be configured to provide the measurement gap requirement information of NR target bands;

In step 11-20, when the UE 11-01 is configured to provide measurement gap requirement information about the NR target bands to the base station 11-02, the UE may transmit, to the base station, a predetermined RRC message (e.g., the RRC connection resume complete message (RRCResume-Complete) or RR connection reconfiguration complete message (RRCReconfigurationComplete) as a response message to the RRC message received in step 11-15) containing needForGapsConfigInfoNR (information indicating the measurement gap requirement information about the NR target bands). The UE may include the following information in the needForGapsConfigInfoNR.

include intraFreq-needForGap and set the gap requirement information of intra-frequency measurement for each NR serving cell. Specifically, the intraFreq-needForGap may include the identifier (servCellId) for each NR serving cell and the indicator (gapIndicationIntra) indicating whether a gap is required for the NR serving cell.
if requestedTargetBandFilterNR is configured, for each supported NR band that is also included in requestedTargetBandFilterNR, include an entry in interFreq-needForGap and set the gap requirement information for that band; otherwise, include an entry in interFreq-needForGap and set the corresponding gap requirement information for each supported NR band.

The needForGapsConfigInfoNR may have the following characteristics.

The UE 11-01 informs the base station 11-02 only whether a measurement gap is required for each frequency band or each cell.

In step 11-25, the base station 11-02 may receive a predetermined RRC message (e.g., RRC connection release message (RRCResume) or RRC connection reconfiguration message (RRCReconfiguration)) containing measurement configuration information (measGapConfig) from the UE 11-01. Subsequent operations may be the same as the above-described steps.

FIGS. 12A and 12B are views illustrating an operation in which one SIM UE currently in in RRC_CONNECTED mode notifies a base station associated with a corresponding SIM for a UE supporting a plurality of subscriber identity modules (SIMs) (multi-SIM UE) switches from one SIM to another SIM to perform predetermined operations according to an embodiment of the disclosure.

Referring to FIGS. 12A and 12B, the SIM1 UE 12-01 of the multi-SIM UE may be in an RRC connected mode (RRC_CONNECTED) with base station 1 12-02 (12-10). In step 12-15, the SIM1 UE 12-01 of the multi-SIM UE may transmit a UE capability information message (UECapabilityInformation) to base station 1 12-02. The message may include an indicator or information element capable of requesting a gap for performing an operation on the other SIM.

In step 12-20, base station 1 12-02 may transmit the otherConfig-r17 contained in a predetermined RRC message to the SIM1 UE 12-01 of the multi-SIM UE. As an example, the predetermined RRC message may mean an RRC connection reconfiguration message (RRCReconfiguration) or an RRC connection resume message (RRCResume). The otherConfig-r17 may include information (MUSIM-Switch-ingGapPreferenceConfig) indicating that the SIM1 UE 12-01 of the multi-SIM UE is able to request a gap from base station 1 12-02 to perform operations on another SIM. As an example, the information may include an indicator or a prohibit timer value. The prohibit timer value may be set to one of a plurality of values, and the unit of the prohibit timer value may be seconds(s) or milliseconds (ms). When the MUSIM-SwitchingGapPreferenceConfig in the otherCon-fig-r17 is set to setup, the SIM1 UE 12-01 of the multi-SIM UE may be regarded as configured to request a gap from base station 1 12-02 to perform operations on the other SIM, otherwise as configured not to request a gap, and this may be stopped if the prohibit timer is running.

In step 12-25, the SIM2 UE 12-04 of the multi-SIM UE may identify that it should perform a predetermined operation in the RRC idle mode (RRC_IDLE) or RRC inactive mode (RRC_INACTIVE). The predetermined operation may be characterized in that the SIM1 UE 12-01 of the multi-SIM UE performs no separate operation with base station 1 12-02 in the RRC connected mode, and the SIM2 UE 12-04 of the multi-SIM UE may perform an operation for a short time. As an example, the predetermined operation may mean at least one of the following.

Operation in which the SIM2 UE 12-04 of the multi-SIM UE monitors a paging channel or short message generated from base station 2 12-05
Operation in which the SIM2 UE 12-04 of the multi-SIM UE obtains system information broadcast from base station 2 12-05 or updates changed system information
Operation in which the SIM2 UE 12-04 of the multi-SIM UE performs measurement required for a cell (re)-selection evaluation procedure that may occur in base station 2 12-05
Operation in which the SIM2 UE 12-04 of the multi-SIM UE selects a public land mobile network (PLMN) that may occur in base station 2 12-05
Operation in which the SIM2 UE 12-04 of the multi-SIM UE performs a registration update procedure or RAN notification area update procedure in base station 2 12-05
Operation in which the SIM2 UE 12-04 of the multi-SIM UE transmits/receives a short message service (SMS) to/from base station 2 12-05

The SIM2 UE 12-04 of the multi-SIM UE may notify the SIM1 UE 12-01 of the multi-SIM UE of it to perform the predetermined operation.

In step 12-30, a predetermined RRC message may be transmitted to base station 1 12-02 to request a gap where the SIM1 UE 12-01 of the multi-SIM UE performs no separate operation with base station 1 12-02 for a short time, and the SIM2 UE 12-04 of the multi-SIM UE performs the above-described predetermined operation. As an example, the predetermined message may mean UEAssistanceInforma-tion. In an embodiment of the disclosure, the gap may be referred to as NoActivityPreferenceGaps for convenience of description. In other words, NoActivityPreferenceGaps may mean a gap required for the SIM1 UE 12-01 of the multi-SIM UE to perform no separate operation with base station 1 12-02 for a short time, and for the SIM2 UE 12-04 of the multi-SIM UE to perform the above-described predetermined operation and this may mean a gap for a multi-SIM operation. Specifically, NoActivityPreferenceGaps is configuration information that may be received from the SIM2 UE 12-04 of the multi-SIM UE. In an embodiment of the disclosure, the NoActivityPreferenceGaps may differ from the MeasGapConfig in the above-described embodiment as follows.

NoActivityPreferenceGaps is configuration information that the SIM1 UE 12-01 of the multi-SIM UE transmits to base station 1 12-02.

NoActivityPreferenceGaps may include one or more no activity gap patterns. As an example, a plurality of gap offsets may be included in one long period (mgrp), and the switching gap length or switching gap timing advance mapped to each gap offset may be included. Or, the gap offset, switching gap duration, and switching gap timing advance for each period may be included. Or, a specific no activity gap pattern among a plurality of no activity gap patterns may include an indicator indicating that it occurs one-shot rather than periodically.

The NoActivityPreferenceGaps may also apply per FR or per UE like the MeasGapConfig in the above-described embodiment.

The NoActivityPreferenceGaps may apply per band like the needForGapsConfigInfoNR in the above-described embodiment, but may differ in that it may include one or more no activity gap patterns per band.

In step 12-30, the SIM1 UE 12-01 of the multi-SIM UE may drive the above-described prohibit timer in step 12-20, upon transmitting a predetermined RRC message including the NoActivityPreferenceGaps to base station 1 12-02. The prohibit timer may mean a timer different from the legacy T346f. When the prohibit timer is driven, the SIM1 UE 12-01 of the multi-SIM UE may not retransmit a predetermined RRC message including the NoActivityPreferenceGaps to base station 1 12-02.

In step 12-35, base station 1 12-02 may transmit a predetermined RRC message to the SIM1 UE 12-01 of the multi-SIM UE to configure/confirm a gap for the SIM2 UE 12-04 to perform the above-described predetermined operation based on the NoActivityPreferenceGaps received in step 12-30. The predetermined RRC message may include information about confirming/not confirming one configurable among the NoActivityPreferenceGaps received in step 12-30, and a delta configuration may be configured based on the NoActivityPreferenceGaps received in step 12-30. The delta configuration may mean that partial information may be changed. The predetermined RRC message may mean an RRC connection reconfiguration message.

In step 12-40, the SIM1 UE 12-01 of the multi-SIM UE may determine whether the operation of switching the gap for SIM2 is needed based on the NoActivityPreferenceGaps of step 12-30 or 12-35. The timing of performing the switching operation may be the same as that in the above-described embodiment. In other words, it may mean applying the configuration information of the NoActivityPreferenceGaps per FR, per UE, or per band based on condition 1. For reference, when an actual gap is required based on the configured NoActivityPreferenceGaps, the SIM1 UE 12-01 of the multi-SIM UE may transmit whether to activate/deactivate the corresponding gap to base station 1 12-02 through the MAC CE. This is for the SIM1 UE 12-01 of the multi-SIM UE to inform base station 1 12-02 whether the actually configured gap is activated or deactivated by transmitting the MAC CE in an on-demand manner as whether the actual gap is required may not be reflected in real-time although the NoActivityPreferenceGaps is configured in steps 12-30 and 12-34. The MAC CE may be transmitted regardless of the running prohibit timer.

In step 12-45, the SIM1 UE 12-01 of the multi-SIM UE may not perform operations related to base station 1 12-02. In this step, the SIM1 UE 12-01 of the multi-SIM UE may maintain the RRC connected mode with base station 1 12-02. The SIM2 UE 12-04 of the multi-SIM UE may perform the operation related to base station 2 12-05 during the gap derived in step 12-40 (12-46).

The SIM1 UE 12-01 and SIM2 UE 12-04 of the multi-SIM UE may periodically perform steps 12-40, 12-45, and 12-46 (12-50, 12-55, and 12-56).

In step 12-60, the SIM2 UE 12-04 of the multi-SIM UE may not need some of the predetermined operations required in step 12-25 any longer. Accordingly, the corresponding information may be provided to the SIM1 UE 12-01 of the multi-SIM UE.

In step 12-65, the SIM1 UE 12-01 of the multi-SIM UE may transmit a predetermined RRC message to base station 1 12-02 to release at least some of the preconfigured NoActivityPreferenceGaps. The predetermined RRC message may mean UEAssistanceInformation. In response thereto, base station 1 12-02 may transmit a predetermined RRC message to the SIM1 UE 12-01 of the multi-SIM UE to release at least some of the preconfigured NoActivityPreferenceGaps (12-70). The predetermined RRC message may mean an RRC connection reconfiguration message (RRCReconfiguration).

In step 12-65, the SIM1 UE 12-01 of the multi-SIM UE may transmit a predetermined RRC message to release at least some of the preconfigured NoActivityPreferenceGaps although the prohibit timer is running. As an example, when sending a predetermined RRC message to escape from the RRC connected mode with base station 1 12-02, the SIM1 UE 12-01 of the multi-SIM UE may need quickly inform base station 1 12-02 of it.

In step 12-75, the SIM2 UE 12-04 of the multi-SIM UE may determine that it needs to perform data transmission/reception operation with base station 2 12-05 for a long time (from a hundred of milliseconds to more than a few seconds). As an example, it may determine that a voice service needs to be performed. The SIM2 UE 12-04 of the multi-SIM UE may inform the SIM1 UE 12-01 of the multi-SIM UE of it.

In step 12-80, the SIM1 UE 12-01 of the multi-SIM UE may transmit a predetermined RRC message to base station 1 12-02 to release the RRC connection with base station 1 12-02. The predetermined RRC message may mean UEAssistanceInformation or ULInformationTransfer. As an example, the UEAssistanceInformation may include an infinity switching gap period or an indicator for the SIM1 UE 12-01 of the multi-SIM UE to release the RRC connection with base station 1 12-02 for the SIM2 UE 12-04 of the multi-SIM UE. Further, the UEAssistanceInformation may include, e.g., the RRC mode (RRC_IDLE, RRC_INACTIVE) preferred by the SIM1 UE 12-01 of the multi-SIM UE. The UEAssistanceInformation may be transmitted regardless of whether the above-described prohibit timer runs (of course, it may not be transmitted while the prohibit timer is running). Further, the ULInformationTransfer may include assistance information to assist to release the RRC connection or an indicator for the SIM1 UE 12-01 of the multi-SIM UE to release the RRC connection with base station 1 12-02 for the SIM2 UE 12-04 of the multi-SIM UE. Upon receiving the corresponding message, base station 1 12-02 may forward the ULInformationTransfer, as a dedicated NAS message, to core network 1 12-03 (12-81).

In step 12-85, base station 1 12-02 may transmit an RRC connection release message (RRCRelease) to release the RRC connection to the SIM1 UE 12-01 of the multi-SIM UE.

FIG. 13 is a flowchart illustrating operations of a UE when a UE supporting a plurality of subscriber identity modules (SIMs) (multi-SIM UE) overlaps a legacy measurement gap and NoActivityPregerenceGaps for the MUSIM according to an embodiment of the disclosure.

In step 13-05, the SIM1 UE of the multi-SIM UE may be in the RRC connected mode. The SIM2 UE of the multi-SIM UE may be in the RRC idle mode or RRC inactive mode.

In step 13-10, the SIM1 UE of the multi-SIM UE may receive a MeasGapConfig and/or NeedForGapsConfigNR from the base station. The MeasGapConfig according to an embodiment of the disclosure may be referred to as a legacy measurement gap (meas gap). The SIM1 UE of the multi-SIM UE may transmit a NeedForGapsConfigInfoNR to the base station in response to the NeedForGapsConfigNR received from the base station.

In step 13-15, the SIM1 UE of the multi-SIM UE may transmit a NoActivityGapsPreferences for performing no operation with the base station associated with the SIM1 UE and allowing the SIM2 UE of the multi-SIM UE to perform a predetermined operation to the base station associated with the SIM1 UE. The base station may configure or confirm the NoActivityGapsPreferences in response thereto.

In step 13-20, the SIM1 UE of the multi-SIM UE may identify whether the legacy measurement gap overlaps the NoActivityGapsPreferences. of course, the base station associated with the SIM1 UE of the multi-SIM UE may configure the legacy measurement gap and the NoActivityGapsPreferences not to overlap each other.

In step 13-25, when the legacy measurement gap overlaps the NoActivityGapsPreferences, the SIM1 UE of the multi-SIM UE may prioritize the NoActivityGapsPreferences to perform no operation with the base station associated with the SIM1 UE and allow the SIM2 UE of the multi-SIM UE to perform a predetermined operation. Or, the SIM1 UE of the multi-SIM UE may prioritize only a specific operation over the legacy measurement gap for the above-described predetermined operation in association with the NoActivityGapsPreferences to perform no operation with the base station associated with the SIM1 UE and allow the SIM2 UE of the multi-SIM UE to perform a predetermined operation. As an example, when paging monitoring is needed, the SIM2 UE of the multi-SIM UE may perform paging monitoring while prioritizing over the legacy measurement gap. Prioritizing may mean that the SIM2 UE of the multi-SIM UE performs a predetermined operation without performing the legacy measurement gap.

In step 13-30, when the legacy measurement gap does not overlap the NoActivityGapsPreferences, the SIM1 UE of the multi-SIM UE may perform an operation at each of the timings occurring according to the legacy measurement gap and the NoActivityGapsPreferences.

FIG. 16 is a flowchart illustrating an example in which one SIM UE among UEs supporting a plurality of subscriber identity modules (SIMs) (multi-SIM UEs) performs a busy indication procedure according to an embodiment of the disclosure.

In step 16-10, the SIM1 UE 16-01 of the multi-SIM UE may be in the RRC connected mode (RRC_CONNECTED) with base station 1 (gNB/eNB in NW1) 16-02. At this time, the SIM2 UE 16-01 of the multi-SIM UE may be in the RRC inactive mode (RRC_INACTIVE) with base station 2 16-04.

In step 16-15, the SIM2 UE 16-03 of the multi-SIM UE may receive a paging message (RAN paging) initiated (RAN-initiated) by base station 2 16-04. The paging message may include a value of a paging cause for sending a paging per paging record as described above in 6-15 of FIG. 6.

In step 16-20, the SIM1 UE 16-01 of the multi-SIM UE may be transmitting/receiving data of the ongoing service with base station 1 16-02.

In step 16-25, to continuously transmit/receive the data of the ongoing service of the SIM1 UE 16-01 of the multi-SIM UE, the SIM2 UE 16-03 of the multi-SIM UE may determine not to respond to the RAN-initiated paging message of base station 2 16-04.

In other words, the above-described operation may be caused by the multiple SIMs included in the UE. For the UE to continue the data service with base station 1 related to SIM1, the UE maintain the RRC inactive state with base station 2 related to SIM2 which is the other SIM, and the UE which is in the RRC idle state with base station 2 may receive the paging message from base station 2. However, if the UE does not respond to the paging message, base station 2 is unable to know whether the UE misses or intentionally disregards the paging message.

In step 16-30, the SIM2 UE 16-03 of the multi-SIM UE may initiate a procedure for transmitting a busy indication to base station 2 16-04. When initiating the busy indication transmission procedure, the SIM2 UE 16-03 of the multi-SIM UE may transmit the busy indication using a legacy RRC message (RRCResumeRequest or RRCResumeRequest1) or transmit the busy indication using a new RRC message. Here, the RRCResumeRequest or RRCResumeRequest1 is an RRC message used to request to resume the stopped RRC connection. The messages specified in TS38.331 may be used.

If the procedure for transmitting the busy indication using a new RRC message is initiated, the SIM2 UE 16-03 of the multi-SIM UE may perform following operation 1-1 in step 16-30.

Operation 1-1 is shown in Table 3 below.

TABLE 3 select access category '0';
apply the default L1 parameter values as specified in corresponding physical layer specifications, except for the parameters for which values are provided in SIB1;
apply the default SRB1 configuration;
apply the CCCH configuration;
apply the timeAlignmentTimerCommon included in SIB1;
start timer TXXX;
initiate transmission of busy indication The signaling radio bearer (SRB1) may mean one type of radio bearer carrying the signaling message in the RRC and/or NAS message. The system information block (SIB1) is one type of common control information as system information in 3GPP LTE/NR. The common control channel (CCCH) is one logical control channel that may be used to transfer the RRC message. timeAlignmentTimerCommon may be provided as a cell uplink parameter. timer TXXX may mean a new timer proposed in an embodiment of the disclosure. A cause value may not be included when initiating a procedure for transmitting a busy indication by a new RRC message. Of course, when performing operation 1-1, a cause value for transmitting a busy indication may be included. For example, since various causes may be introduced later, a cause value for transmitting the busy indication may be included to distinguish from other causes later.

If the procedure for transmitting the busy indication using the legacy RRC message (RRCResumeRequest or RRCResumeRequest1) is initiated, the SIM2 UE 16-03 of the multi-SIM UE may perform following operation 1-2 in step 16-30.

Operation 1-2 is shown in Table 4 below.

TABLE 4

| |
| --- |
| select access category '0';<br>set the resumeCause for busy indication (i.e. new resume cause)<br>apply the default L1(layer 1) parameter values as specified in<br>corresponding physical layer specifications, except for the parameters<br>for which values are provided in SIB1;<br>apply the default SRB1 configuration;<br>apply the CCCH configuration;<br>apply the timeAlignmentTimerCommon included in SIB1;<br>start timer T319;<br>initiate transmission of busy indication |

T319 is a kind of timer driven by the RRCResumeRequest.

The reason for proposing operation 1-1 or operation 1-2 in an embodiment of the disclosure is to perform only operations necessary when the SIM2 UE 16-03 of the multi-SIM UE initiates a busy indication transmission procedure. According to the conventional art, the operation performed when the UE in the RRC inactive mode initiates the RRC resume procedure is specified in TS 38.331 standard, section 5.3.13.2, as shown in Table 5 below, and it may be identified that operation 1-1 and operation 1-2 proposed in an embodiment of the disclosure are operations simplified as compared thereto. For reference, the other operations than including the cause value for transmitting the busy indication upon initiating the busy indication using the legacy RRC message (RRCResumeRequest or RRCResumeRequest1) may follow the conventional art.

The UE operation in TS 38.331 standard, section 5.3.13.2 is shown in Table 5.

In step 16-35, when the SIM2 UE 16-03 of the multi-SIM UE performs operation 1-1 in step 16-30, the SIM2 UE 16-03 of the multi-SIM UE may transmit the busy indication to base station 2 16-04 using the new RRC message through operation 2-1 as follows.

Operation 2-1 is as shown in Table 6 below.

TABLE 6

| |
| --- |
| set the UE identity to the stored ShortI-RNTI(Inactive-radio network<br>temporary identifier) value or FullI-RNTI value. Or set the UE identity<br>to the stored FullI-RNTI value if the field useFullResumeID is signalled<br>in SIB1; otherwise, set the UE identity to the stored ShortI-RNTI value<br>set the Short MAC-I to the 16 least significant bits of the MAC-<br>I(Message Authentication Code - Integrity) calculated:<br>  over the ASN.1(abstract syntax notation one) encoded as per<br>  clause 8 (i.e., a multiple of 8 bits) VarResumeMAC-Input;<br>  with the KRRCint key in the UE Inactive AS(Access Stratum)<br>  Context and the previously configured integrity protection<br>  algorithm; and<br>  with all input bits for COUNT, BEARER and DIRECTION set to<br>  binary ones;<br>derive the KRRCenc key, the KRRCint key, the KUPint key and the<br>KUPenc key<br>configure lower layers to apply integrity protection for all radio<br>bearers except SRB0 using the configured algorithm and the KRRCint<br>key and KUPint key derived in this subclause immediately, i.e.,<br>integrity protection shall be applied to all subsequent messages<br>received and sent by the UE;<br>re-establish PDCP(packet data convergence protocol) entities for<br>SRB1;<br>resume SRB1;<br>submit the new RRC message on CCCH; |

The terms are briefly described below. useFullResumeID indicates a resume identifier and a resume request message to be used, and may mean using fullI-RNTI when there is a field and shortI-RNTI when there is no field. shortMAC-I

TABLE 5

| |
| --- |
| physical layer specifications, except for the parameters for which values<br>are provided in SIB1;<br>1>           apply the default SRB1 configuration as specified in 9.2.1;<br>1>           apply the default MAC Cell Group configuration as specified in 9.2.2;<br>1>           release delayBudgetReportingConfig from the UE Inactive AS context,<br>  if stored;<br>1>           stop timer T342, if running;<br>1>           release overheatingAssistanceConfig from the UE Inactive AS context,<br>  if stored;<br>1>           stop timer T345, if running;<br>1>           release idc-AssistanceConfig from the UE Inactive AS context, if<br>  stored;<br>1>           release drx-PreferenceConfig for all configured cell groups from the<br>  UE Inactive AS context, if stored;<br>1>           stop all instances of timer T346a, if running;<br>1>           release maxBW-PreferenceConfig for all configured cell groups from<br>  the UE Inactive AS context, if stored;<br>1>           stop all instances of timer T346b, if running;<br>1>           release maxCC-PreferenceConfig for all configured cell groups from<br>  the UE Inactive AS context, if stored;<br>1>           stop all instances of timer T346c, if running;<br>1>           release maxMIMO-LayerPreferenceConfig for all configured cell<br>  groups from the UE Inactive AS context, if stored;<br>1>           stop all instances of timer T346d, if running;<br>1>           release minSchedulingOffsetPreferenceConfig for all configured cell<br>  groups from the UE Inactive AS context, if stored;<br>1>           stop all instances of timer T346e, if running;<br>1>           release releasePreferenceConfig from the UE Inactive AS context, if<br>  stored;<br>1>           stop timer T346f, if running;<br>1>           apply the CCCH configuration as specified in 9.1.1.2;<br>1>           apply the timeAlignmentTimerCommon included in SIBI;<br>1>           start timer T319;<br>1>           set the variable pendingRNA-Update to false;<br>1>           initiate transmission of the RRCResumeRequest message or<br>RRCResumeRequest1 | may be used to identify the UE when resuming an RRC connection and re-establishing an RRC connection. VarResumeMAC-Input is input-related information used to generate resumeMAC-I in the RRC connection resume procedure. resumeMAC-I may be an authentication token calculated in association with a security configuration that facilitates authentication of the UE.

The KRRCenc key, the KRRCint key, the KUPint key, and the KUPenc key are a type of security keys included in the RRC resume request message, and may be described as integrity protection of RRC signaling ($K_{RRCint}$), ciphering of RRC signaling ($K_{RRCenc}$), integrity protection of user data ($K_{UPint}$) and ciphering of user data ($K_{UPenc}$).

The description of the above terms targets the LTE system or 5G system (NR system) specified in the 3GPP, the standardization organization, but the disclosure may also be applicable to the 5G or next-generation systems or other communication systems having a similar technical background without significantly departing from the scope of the disclosure by making a slight change thereto, which is possible at the discretion of one of ordinary skill in the art.

It is proposed that the SIM2 UE 16-03 of the multi-SIM UE according to an embodiment of the disclosure continuously performs cell reselection-related measurement and cell reselection evaluation process when performing operation 2-1 in step 16-35. It is proposed that if at least one of the following conditions occurs when performing operation 2-1 in step 16-35, the SIM2 UE 16-03 of the multi-SIM UE switches to the RRC idle mode (RRC_IDLE).

When integrity check failure occurs while the new timer TXXX is running

When cell selection or cell reselection occurs while the new timer TXXX is running When the new timer TXXX expires Of course, the SIM2 UE 16-03 of the multi-SIM UE according to an embodiment of the disclosure may not perform cell reselection-related measurement and cell reselection evaluation process when performing operation 2-1 in step 16-35. This is why, when cell selection or cell reselection occurs, it may switch to the RRC idle mode and thus fail to send a busy indication.

In step 16-35, when the SIM2 UE 16-03 of the multi-SIM UE performs operation 1-2 in step 16-30, the SIM2 UE 16-03 of the multi-SIM UE may transmit the busy indication to base station 2 16-04 using the legacy RRC message (RRCResumeRequest or RRCResumeRequest1) through operation 2-2 as follows.

Operation 2-2 is as shown in Table 7 below.

TABLE 7

If the field useFullResumeID is signaled in SIB1:
    select the RRCResumeRequest1 as the message to use
    set the resumeidentity to the stored FullI-RNTI value TABLE 7-continued else:
    select the RRCResumeRequest as the message to use
    set the resumeidentity to the stored ShortI-RNTI value
set the resumeMAC-I to the 16 least significant bits of the MAC-I
calculated:
    over the ASN.1 encoded as per clause 8 (i.e., a multiple of 8 bits)
    VarResumeMAC-Input;
    with the KRRCint key in the UE Inactive AS Context and the
    previously configured integrity protection algorithm; and
    with all input bits for COUNT, BEARER and DIRECTION set to
    binary ones;
derive the KRRCenc key, the KRRCint key, the KUPint key and the
KUPenc key
configure lower layers to apply integrity protection for all radio
bearers except SRB0 using the configured algorithm and the KRRCint
key and KUPint key derived in this subclause immediately, i.e.,
integrity protection shall be applied to all subsequent messages
received and sent by the UE;
re-establish PDCP entities for SRB1;
resume SRB1;
submit selected message RRCResumeRequest or RRCResumeRequest1
for transmission to lower layers The terms used in Table 7 are briefly described as follows. useFullResumeID is information related to the resume identifier and resume request message to be used, resumeidentity is a type of ID that facilitates UE context search, and COUNT, BEARER, and DIRECTION are information related to initiating a specific procedure when each value reaches a specific value.

The reason for proposing operation 2-1 or operation 2-2 in an embodiment of the disclosure is why the SIM2 UE 16-03 of the multi-SIM UE performs only operations necessary to transmit the busy indication. According to the conventional art, the operation performed when the UE in the RRC inactive mode transmits the RRCResumeRequest or RRCResumeRequest1 is specified in TS 38.331 standard, section 5.3.13.3, as shown in Table 8 below, and it may be identified that operation 2-1 and operation 2-2 proposed in an embodiment of the disclosure are operations simplified as compared to the conventional operations. For reference, the operations performed when transmitting the busy indication upon initiating the procedure for transmitting the busy indication using the legacy RRC message (RRCResumeRequest or RRCResumeRequest1) may follow the conventional art.

The UE operation in TS 38.331 standard, section 5.3.13.3 is shown in Table 8.

TABLE 8

The UE shall set the contents of RRCResumeRequest or RRCResumeRequest1
message as follows:
  1>     if field useFullResumeID is signalled in SIB1:
      2>     select RRCResumeRequest1 as the message to use;
      2>     set the resumeIdentity to the stored fullI-RNTI value;
  1>    else:
      2>     select RRCResumeRequest as the message to use;
      2>     set the resumeIdentity to the stored shortI-RNTI value;

TABLE 8-continued

```
1>      restore the RRC configuration, RoHC state, the stored QoS flow to
        DRB mapping rules and the K_gNB and K_RRCint keys from the stored UE
        Inactive AS context except for the following:
        - masterCellGroup;
        - mrdc-SecondaryCellGroup, if stored; and
        - pdcp-Config;
1>      set the resumeMAC-I to the 16 least significant bits of the MAC-I
        calculated:
        2>      over the ASN.1 encoded as per clause 8 (i.e., a multiple of 8
                bits) VarResumeMAC-Input,
        2>      with the K_RRCint key in the UE Inactive AS Context and the
                previously configured integrity protection algorithm; and
        2>      with all input bits for COUNT, BEARER and DIRECTION set to
                binary ones;
1>      derive the K_gNB key based on the current K_gNB key or the NH, using the
        stored nextHopChainingCount value, as specified in TS 33.501 [11];
1>      derive the K_RRCenc key, the K_RRCint key, the K_UPint key and the K_UPenc key;
1>      configure lower layers to apply integrity protection for all radio
        bearers except SRB0 using the configured algorithm and the K_RRCint key
        and K_UPint key derived in this subclause immediately, i.e., integrity
        protection shall be applied to all subsequent messages received and sent
        by the UE;
NOTE 1:         Only DRBs with previously configured UP integrity protection
               shall resume integrity protection.
1>      configure lower layers to apply ciphering for all radio bearers except
        SRB0 and to apply the configured ciphering algorithm, the K_RRCenc key
        and the K_UPenc key derived in this subclause, i.e. the ciphering
        configuration shall be applied to all subsequent messages received and
        sent by the UE;
1>      re-establish PDCP entities for SRB1;
1>      resume SRB1;
1>      submit the selected message RRCResumeRequest or
        RRCResumeRequest1 for transmission to lower layers.
```

In step 16-37, base station 2 (gNB/eNB in NW2) 16-04 may transfer the whole or part of the received busy indication information to core network 2 (AMF/MME in NW2) 16-05. In other words, base station 2 16-04 may create a new NG message using the busy indication information which is the RRC message received in step 16-35 and transfer it to core network 2 16-05 through the NG interface.

In step 16-40, base station 2 16-04, receiving the busy indication from the SIM2 UE 16-03 of the multi-SIM UE, may transmit an RRCRelease message including the suspendConfig to the SIM2 UE 16-03 of the multi-SIM UE. In an embodiment of the disclosure, it is proposed that a new message value may be contained in the RRCRelease message. The new timer may be referred to as TYYY. The value for the new timer may be referred to as tyyy. The operations of the SIM2 UE 16-03 of the multi-SIM UE and base station 2 16-04 depending on whether the RRCRelease message contains the new timer value may be as shown in Table 9.

TABLE 9

Operation of SIM2 UE 16-03 of the multi-SIM UE: when RRCRelease message includes new timer value,
    The UE may drive the new timer with the new time value.
        If the new timer is running, the UE may perform RRC connection resume procedure for responding to the RAN paging received in step 16-15 to base station 2 16-04.
        If the new timer expires, the UE may not perform the RRC connection resume procedure for responding to the RAN paging received in step 16-15 to base station 2 16-04.
        When the new timer is running, the UE may stop the running new timer when initiating the RRC connection resume procedure for a predetermined cause (e.g., RAN notification area update (RNAU) procedure) other than response to the RAN paging received in step 16-15. Or, when the new timer is running, the UE may stop the running new timer if the UE itself switches to RRC idle mode for a predetermined cause (e.g., when switching to camped on any cell state).

TABLE 9-continued

When RRCRelease message does not include new timer value,
        The UE may not perform RRC connection resume procedure for responding to the RAN paging received in step 16-15 to base station 2 16-04.
Operation of base station 2 16-04:
    When a new timer value is set in RRCRelease message,
        The base station may drive the new timer with the new timer value
        When the timer is running, it may buffer all information related to the RAN paging transmitted in step 16-15.
        When the timer expires, it may discard all information related to the RAN paging transmitted in step 16-15.
    When no new timer value is set in RRCRelease message,
        It may discard all information related to the RAN paging in step 16-15.

In step 16-40, the SIM2 UE 16-03 of the multi-SIM UE, receiving the RRCRelease message, may perform operation 3 as follows.

Operation 3 is as shown in Table 10 below.

TABLE 10 reset MAC and release the default MAC Cell Group configuration, if any;
re-establish RLC entities for SRB1;
stop the timer TXXX or timer T319, if running;
start the timer TYYY, if the tyyy is included;
in the stored UE Inactive AS context:
    replace the KgNB and KRRCint keys with the current KgNB and KRRCint keys;
    replace the C-RNTI(cell-RNTI) with the temporary C-RNTI in the cell the UE has received the RRCRelease message;
    replace the cellIdentity with the cellIdentity of the cell the UE has received the RRCRelease message;
    replace the physical cell identity with the physical cell identity of the cell the UE has received the RRCRelease message;
suspend SRB1

Here, KgNB is a key handled by the upper layer and may be used to derive AS keys (KRRCint, KRRCenc, KUPint and KUPenc).

In step 16-40, the SIM2 UE 16-03 of the multi-SIM UE, receiving the RRCRelease message, may additionally perform an operation for the above-described TYYY timer and may also perform the operation (TS 38.381 standard, section 5.3.8.3) of the conventional art as shown in Table 10 below.

The UE operation in TS 38.331 standard, section 5.3.8.3 is shown in Table 11.

TABLE 11

| |
|---|
| 1>   delay the following actions defined in this sub-clause 60 ms from the moment the RRCRelease message was received or optionally when lower layers indicate that the receipt of the RRCRelease message has been successfully acknowledged, whichever is earlier; |
| 1>   stop timer T380, if running; |
| 1>   stop timer T320, if running; |
| 1>   if timer T316 is running; |
| 2>       stop timer T316; |
| 2>       clear the information included in VarRLF-Report, if any; |
| 1>   stop timer T350, if running; |
| 1>   if the AS security is not activated: |
| 2>       ignore any field included in RRCRelease message except waitTime; |
| 2>       perform the actions upon going to RRC_IDLE as specified in 5.3.11 with the release cause 'other' upon which the procedure ends; |
| 1>   if the RRCRelease message includes redirectedCarrierInfo indicating redirection to eutra: |
| 2>       if cnType is included: |
| 3>       after the cell selection, indicate the available CN Type(s) and the received cnType to upper layers; |
| NOTE 1:       Handling the case if the E-UTRA cell selected after the redirection does not support the core network type specified by the cnType, is up to UE implementation. |
| 2>       if voiceFallbackIndication is included: |
| 3>       consider the RRC connection release was for EPS fallback for IMS voice (see TS 23.502 [43]); |
| 1>   if the RRCRelease message includes the cellReselectionPriorities: |
| 2>       store the cell reselection priority information provided by the cellReselectionPriorities; |
| 2>       if the t320 is included: |
| 3>       start timer T320, with the timer value set according to the value of t320; |
| 1>   else: |
| 2>       apply the cell reselection priority information broadcast in the system information; |
| 1>   if deprioritisationReq is included: |
| 2>       start or restart timer T325 with the timer value set to the deprioritisationTimer signalled; |
| 2>       store the deprioritisationReq until T325 expiry; |
| 1>   if the RRCRelease includes the measIdleConfig: |
| 2>       if T331 is running: |
| 3>   stop timer T331; |
| 3>       perform the actions as specified in 5.7.8.3; |
| 2>       if the measIdleConfig is set to setup: |
| 3>       store the received measIdleDuration in VarMeasIdleConfig; |
| 3>       start timer T331 with the value set to measIdleDuration; |
| 3>       if the measIdleConfig contains measIdleCarrierListNR: |
| 4>   store the received measIdleCarrierListNR in VarMeasIdleConfig; |
| 3>       if the measIdleConfig contains measIdleCarrierListEUTRA: |
| 4>       store the received measIdleCarrierListEUTRA in VarMeasIdleConfig; |
| 3>       if the measIdleConfig contains validityAreaList: |
| 4>       store the received validityAreaList in VarMeasIdleConfig; |
| 1>   if the RRCRelease includes suspendConfig: |
| 2>       apply the received suspendConfig; |
| 2>       remove all the entries within VarConditionalReconfig, if any; |
| 2>       for each measId, if the associated reportConfig has a reportType set to condTriggerConfig: |
| 3>       for the associated reportConfigId: |
| 4>   remove the entry with the matching reportConfigId from the reportConfigList within the VarMeasConfig; |
| 3>       if the associated measObjectId is only associated to a reportConfig with reportType set to condTriggerConfig: |
| 4>       remove the entry with the matching measObjectId from the measObjectList within the VarMeasConfig; |
| 3>       remove the entry with the matching measId from the measIdList within the VarMeasConfig; |

TABLE 11-continued

```
 2>          reset MAC and release the default MAC Cell Group
     configuration, if any;
 2>          re-establish RLC entities for SRB1;
 2>          if the RRCRelease message with suspendConfig was received in
     response to an RRCResumeRequest or an RRCResumeRequest1:
    3>       stop the timer T319 if running;
    3>       in the stored UE Inactive AS context:
       4>    replace the K_gNB and K_RRCint keys with the current K_gNB and
             K_RRCint keys;
       4>    replace the C-RNTI with the temporary C-RNTI in the cell the
             UE has received the RRCRelease message;
       4>    replace the cellIdentity with the cellIdentity of the cell the UE
             has received the RRCRelease message;
       4>    replace the physical cell identity with the physical cell identity
             of the cell the UE has received the RRCRelease message;
 2>          else:
    3>       store in the UE Inactive AS Context the current K_gNB and K_RRCint
             keys, the ROHC state, the stored QoS flow to DRB mapping rules,
             the C-RNTI used in the source PCell, the cellIdentity and the
             physical cell identity of the source PCell, the spCellConfigCommon
             within ReconfigurationWithSync of the NR PSCell (if configured) and
             all other parameters configured except for:
                parameters within ReconfigurationWithSync of the PCell;
                parameters within ReconfigurationWithSync of the NR PSCell, if
                  configured;
                parameters within MobilityControlInfoSCG of the E-UTRA PSCell,
                  if configured;
                servingCellConfigCommonSIB;
NOTE 2:      NR sidelink communication related configurations and logged
             measurement configuration are not stored as UE Inactive AS
             Context, when UE enters RRC_INACTIVE.
 2>          suspend all SRB(s) and DRB(s), except SRB0;
 2>          indicate PDCP suspend to lower layers of all DRBs;
 2>          if the t380 is included:
    3>       start timer T380, with the timer value set to t380;
 2>          if the RRCRelease message is including the waitTime:
    3>       start timer T302 with the value set to the waitTime;
    3>       inform upper layers that access barring is applicable for all
             access categories except categories '0' and '2';
 2>          if T390 is running:
    3>       stop timer T390 for all access categories;
    3>       perform the actions as specified in 5.3.14.4;
 2>          indicate the suspension of the RRC connection to upper layers;
 2>          enter RRC_INACTIVE and perform cell selection as specified in
     TS 38.304 [20];
1>  else
 2>          perform the actions upon going to RRC_IDLE as specified in
     5.3.11, with the release cause 'other'.
```

In step 16-45, the SIM2 UE 16-03 of the multi-SIM UE may be in the RRC inactive mode.

In an embodiment of the disclosure, base station 2 16-04 may provide separate random access channel (RACH) configuration information (RACH-ConfigCommon or RACH-ConfigDedicated), as system information or dedicated RRC message, for the SIM2 UE 16-03 of the multi-SIM UE to transmit the busy indication. In other words, the SIM2 UE 16-03 of the multi-SIM UE may send a preamble to transmit the busy indication to base station 2 16-04, and base station 2 16-04 should receive a random access response (RAR) from the SIM2 UE 16-03 of the multi-SIM UE. It may mean RACH configuration information for such purpose. Or, base station 2 16-04 may provide RA prioritization parameters (i.e., scalingFactorBI or powerRampingStepHighPriority) related to the priority of a separate random access procedure, as system information or dedicated RRC message, for the SIM2 UE 16-03 of the multi-SIM UE to transmit the busy indication. The separate RACH configuration information or separate RA prioritization parameters may apply to the foregoing or following embodiments in the same manner.

FIG. 17 is a flowchart illustrating an example in which one SIM UE among UEs supporting a plurality of subscriber identity modules (SIMs) (multi-SIM UEs) performs a busy indication procedure according to an embodiment of the disclosure.

In step 17-10, the SIM1 UE 17-01 of the multi-SIM UE may be in the in RRC_CONNECTED mode with base station 1 17-02. At this time, the SIM2 UE 17-01 of the multi-SIM UE may be in the RRC inactive mode (RRC_INACTIVE) with base station 2 17-04.

In step 17-15, the SIM2 UE 17-03 of the multi-SIM UE may receive a paging message (RAN paging) initiated (RAN-initiated) by base station 2 17-04. The paging message may include the paging cause value.

In step 17-20, the SIM1 UE 17-01 of the multi-SIM UE may be transmitting/receiving data of the ongoing service with base station 1 17-02.

In step 17-25, to continuously transmit/receive the data of the SIM1 UE 17-01 of the multi-SIM UE, the SIM2 UE 17-03 of the multi-SIM UE may determine not to respond to the RAN-initiated paging message of base station 2 17-04.

In step 17-30, the SIM2 UE 17-03 of the multi-SIM UE may initiate a procedure for transmitting a busy indication to base station 2 17-04. When initiating the busy indication transmission procedure, the SIM2 UE 17-03 of the multi-SIM UE may transmit the busy indication using a legacy RRC message (RRCResumeRequest or RRCResumeRequest1) or transmit the busy indication using a new RRC message. If the procedure for transmitting the busy indication using a new RRC message is initiated, the SIM2 UE 17-03 of the multi-SIM UE may perform following operation 1-1 in step 17-30.

Operation 1-1 is shown in Table 12 below.

TABLE 12

| |
|---|
| select access category '0'; |
| apply the default L1 parameter values as specified in corresponding physical layer specifications, except for the parameters for which values are provided in SIB1; |
| apply the default SRB1 configuration; |
| apply the CCCH configuration; |
| apply the timeAlignmentTimerCommon included in SIB1; |
| start timer TXXX; |
| initiate transmission of busy indication |

Timer TXXX may mean a new timer proposed in an embodiment of the disclosure. A cause value may not be included when initiating a procedure for transmitting a busy indication by a new RRC message. Of course, when performing operation 1-1, a cause value for transmitting a busy indication may be included. For example, since various causes may be introduced later, a cause value for transmitting the busy indication may be included to distinguish from other causes later.

If the procedure for transmitting the busy indication using the legacy RRC message (RRCResumeRequest or RRCResumeRequest1) is initiated, the SIM2 UE 17-03 of the multi-SIM UE may perform following operation 1-2 in step 17-30.

Operation 1-2 is shown in Table 13 below.

TABLE 13

| |
|---|
| select access category '0'; |
| set the resumeCause for busy indication (i.e. new resume cause) |
| apply the default L1 parameter values as specified in corresponding physical layer specifications, except for the parameters for which values are provided in SIB1; |
| apply the default SRB1 configuration; |
| apply the CCCH configuration; |
| apply the timeAlignmentTimerCommon included in SIB1; |
| start timer T319; |
| initiate transmission of busy indication |

The reason for proposing operation 1-1 or operation 1-2 in an embodiment of the disclosure is to perform only operations necessary when the SIM2 UE 17-03 of the multi-SIM UE initiates a busy indication transmission procedure. According to the conventional art, the operation performed when the UE in the RRC inactive mode initiates the RRC resume procedure is specified in TS 38.331 standard, section 5.3.13.2, as shown below, and it may be identified that operation 1-1 and operation 1-2 proposed in an embodiment of the disclosure are operations simplified as compared thereto. For reference, the other operations than including the cause value for transmitting the busy indication upon initiating the busy indication using the legacy RRC message (RRCResumeRequest or RRCResumeRequest1) may follow the conventional art.

The UE operation in TS 38.331 standard, section 5.3.13.2 is shown in Table 14.

TABLE 14

| |
|---|
| 1>  if the resumption of the RRC connection is triggered by response to NG-RAN paging: |
|    2>    select '0' as the Access Category; |
|    2>    perform the unified access control procedure as specified in 5.3.14 using the selected Access Category and one or more Access Identities provided by upper layers; |
|       3>  if the access attempt is barred, the procedure ends; |
| 1>   else if the resumption of the RRC connection is triggered by upper layers: |
|    2>    if the upper layers provide an Access Category and one or more Access Identities: |
|       3>  perform the unified access control procedure as specified in 5.3.14 using the Access Category and Access Identities provided by upper layers; |
|          4>  if the access attempt is barred, the procedure ends; |
|    2>    set the resumeCause in accordance with the information received from upper layers; |
| 1>   else if the resumption of the RRC connection is triggered due to an RNA update as specified in 5.3.13.8: |
|    2>    if an emergency service is ongoing: |
| NOTE: How the RRC layer in the UE is aware of an ongoing emergency service is up to UE implementation. |
|       3>  select '2' as the Access Category; |
|       3>  set the resumeCause to emergency; |
|    2>    else: |
|       3>  select '8' as the Access Category; |
|    2>    perform the unified access control procedure as specified in 5.3.14 using the selected Access Category and one or more Access Identities to be applied as specified in TS 24.501 [23]; |
|       3>  if the access attempt is barred: |
|          4>  set the variable pendingRNA-Update to true; |
|          4>  the procedure ends; |
| 1>   if the UE is in NE-DC or NR-DC: |
|    2>    if the UE does not support maintaining SCG configuration upon connection resumption: |
|       3>  release the MR-DC related configurations (i.e., as specified in 5.3.5.10) from the UE Inactive AS context, if stored; |

TABLE 14-continued

```
1>  if the UE does not support maintaining the MCG SCell configurations
    upon connection resumption:
    2>     release the MCG SCell(s) from the UE Inactive AS context, if
       stored;
1>  apply the default L1 parameter values as specified in corresponding
    physical layer specifications, except for the parameters for which values
    are provided in SIB1;
1>  apply the default SRB1 configuration as specified in 9.2.1;
1>  apply the default MAC Cell Group configuration as specified in 9.2.2;
1>  release delayBudgetReportingConfig from the UE Inactive AS context,
    if stored;
1>  stop timer T342, if running;
1>  release overheatingAssistanceConfig from the UE Inactive AS context,
    if stored;
1>  stop timer T345, if running;
1>  release idc-AssistanceConfig from the UE Inactive AS context, if
    stored;
1>  release drx-PreferenceConfig for all configured cell groups from the
    UE Inactive AS context, if stored;
1>  stop all instances of timer T346a, if running;
1>  release maxBW-PreferenceConfig for all configured cell groups from
    the UE Inactive AS context, if stored;
1>  stop all instances of timer T346b, if running;
1>  release maxCC-PreferenceConfig for all configured cell groups from
    the UE Inactive AS context, if stored;
1>  stop all instances of timer T346c, if running;
1>  release maxMIMO-LayerPreferenceConfig for all configured cell
    groups from the UE Inactive AS context, if stored;
1>  stop all instances of timer T346d, if running;
1>  release minSchedulingOffsetPreferenceConfig for all configured cell
    groups from the UE Inactive AS context, if stored;
1>  stop all instances of timer T346e, if running;
1>  release releasePreferenceConfig from the UE Inactive AS context, if
    stored;
1>  stop timer T346f, if running;
1>  apply the CCCH configuration as specified in 9.1.1.2;
1>  apply the timeAlignmentTimerCommon included in SIB1;
1>  start timer T319;
1>  set the variable pendingRNA-Update to false;
1>     initiate transmission of the RRCResumeRequest message or
RRCResumeRequest1
```

In step 17-35, when the SIM2 UE 17-03 of the multi-SIM UE performs operation 1-1 in step 17-30, the SIM2 UE 17-03 of the multi-SIM UE may transmit the busy indication to base station 2 17-04 using the new RRC message through operation 2-1 as follows.

Operation 2-1 is shown in Table 15 below.

TABLE 15

```
set the UE identity to the stored ShortI-RNTI value or FullI-RNTI
value. Or set the UE identity to the stored FullI-RNTI value if the field
useFullResumeID is signalled in SIB1; otherwise, set the UE identity to
the stored ShortI-RNTI value
set the Short MAC-I to the 17 least significant bits of the MAC-I
calculated:
    over the ASN.1 encoded as per clause 8 (i.e., a multiple of 8 bits)
    VarResumeMAC-Input;
    with the KRRCint key in the UE Inactive AS Context and the
    previously configured integrity protection algorithm; and
    with all input bits for COUNT, BEARER and DIRECTION set to
    binary ones;
derive the KRRCenc key, the KRRCint key, the KUPint key and the
KUPenc key
configure lower layers to apply integrity protection for all radio
bearers except SRB0 using the configured algorithm and the KRRCint
key and KUPint key derived in this subclause immediately, i.e.,
integrity protection shall be applied to all subsequent messages
received and sent by the UE;
re-establish PDCP entities for SRB1;
resume SRB1;
submit the new RRC message on CCCH;
```

It is proposed that the SIM2 UE 17-03 of the multi-SIM UE according to an embodiment of the disclosure continuously performs cell reselection-related measurement and cell reselection evaluation process when performing operation 2-1 in step 17-35. It is proposed that if at least one of the following conditions occurs when performing operation 2-1 in step 17-35, the SIM2 UE 17-03 of the multi-SIM UE switches to the RRC idle mode (RRC_IDLE).

When integrity check failure occurs while the new timer TXXX is running

When cell selection or cell reselection occurs while the new timer TXXX is running When the new timer TXXX expires Of course, the SIM2 UE 17-03 of the multi-SIM UE according to an embodiment of the disclosure may not perform cell reselection-related measurement and cell reselection evaluation process when performing operation 2-1 in step 17-35. This is why, when cell selection or cell reselection occurs, it may switch to the RRC idle mode and thus fail to send a busy indication.

In step 17-35, when the SIM2 UE 17-03 of the multi-SIM UE performs operation 1-2 in step 17-30, the SIM2 UE 17-03 of the multi-SIM UE may transmit the busy indication to base station 2 17-04 using the legacy RRC message (RRCResumeRequest or RRCResumeRequest1) through operation 2-2 as follows.

Operation 2-2 is shown in Table 16 below.

TABLE 16

---

If the field useFullResumeID is signaled in SIB1:
    select the RRCResumeRequest1 as the message to use
    set the resumeidentity to the stored FullI-RNTI value
else:
    select the RRCResumeRequest as the message to use
    set the resumeidentity to the stored ShortI-RNTI value
set the resumeMAC-I to the 17 least significant bits of the MAC-I
calculated:
    over the ASN.1 encoded as per clause 8 (i.e., a multiple of 8 bits)
    VarResumeMAC-Input;
    with the KRRCint key in the UE Inactive AS Context and the
    previously configured integrity protection algorithm; and
    with all input bits for COUNT, BEARER and DIRECTION set to
    binary ones;
derive the KRRCenc key, the KRRCint key, the KUPint key and the
KUPenc key
configure lower layers to apply integrity protection for all radio
bearers except SRB0 using the configured algorithm and the KRRCint
key and KUPint key derived in this subclause immediately, i.e.,
integrity protection shall be applied to all subsequent messages
received and sent by the UE;

---

TABLE 16-continued

--- re-establish PDCP entities for SRB1;
resume SRB1;
submit selected message RRCResumeRequest or RRCResumeRequest1
for transmission to lower layers

---

The reason for proposing operation 2-1 or operation 2-2 in an embodiment of the disclosure is why the SIM2 UE 17-03 of the multi-SIM UE performs only operations necessary to transmit the busy indication. According to the conventional art, the operation performed when the UE in the RRC inactive mode transmits the RRCResumeRequest or RRCResumeRequest1 is specified in TS 38.331 standard, section 5.3.13.3, as shown below, and it may be identified that operation 2-1 and operation 2-2 proposed in an embodiment of the disclosure are operations simplified as compared to the conventional operations. For reference, the operations performed when transmitting the busy indication upon initiating the procedure for transmitting the busy indication using the legacy RRC message (RRCResumeRequest or RRCResumeRequest1) may follow the conventional art.

The UE operation in TS 38.331 standard, section 5.3.13.3 is shown in Table 17.

TABLE 17

---

The UE shall set the contents of RRCResumeRequest or RRCResumeRequest1
message as follows:
    1>  if field useFullResumeID is signalled in SIB1:
      2>    select RRCResumeRequest1 as the message to use;
      2>    set the resumeIdentity to the stored fullI-RNTI value;
    1>  else:
      2>    select RRCResumeRequest as the message to use;
      2>    set the resumeIdentity to the stored shortI-RNTI value;
    1>  restore the RRC configuration, RoHC state, the stored QoS flow to
      DRB mapping rules and the $K_{gNB}$ and $K_{RRCint}$keys from the stored UE
      Inactive AS context except for the following:
      - masterCellGroup;
      - mrdc-SecondaryCellGroup, if stored; and
      - pdcp-Config;
    1>  set the resumeMAC-I to the 17 least significant bits of the MAC-I
      calculated:
      2>    over the ASN.1 encoded as per clause 8 (i.e., a multiple of 8
      bits) VarResumeMAC-Input;
      2>    with the $K_{RRCint}$ key in the UE Inactive AS Context and the
      previously configured integrity protection algorithm; and
      2>    with all input bits for COUNT, BEARER and DIRECTION set to
      binary ones;
    1>  derive the $K_{gNB}$ key based on the current $K_{gNB}$ key or the NH, using the
      stored nextHopChainingCount value, as specified in TS 33.501 [11];
    1>  derive the $K_{RRCenc}$ key, the $K_{RRCint}$ key, the $K_{UPint}$ key and the $K_{UPenc}$ key;
    1>  configure lower layers to apply integrity protection for all radio
      bearers except SRB0 using the configured algorithm and the $K_{RRCint}$ key
      and $K_{UPint}$ key derived in this subclause immediately, i.e., integrity
      protection shall be applied to all subsequent messages received and sent
      by the UE;
    NOTE 1:   Only DRBs with previously configured UP integrity protection
            shall resume integrity protection.
    1>  configure lower layers to apply ciphering for all radio bearers except
      SRB0 and to apply the configured ciphering algorithm, the $K_{RRCenc}$ key
      and the $K_{UPenc}$ key derived in this subclause, i.e. the ciphering
      configuration shall be applied to all subsequent messages received and
      sent by the UE;
    1>  re-establish PDCP entities for SRB1;
    1>  resume SRB1;
    1>  submit the selected message RRCResumeRequest or
      RRCResumeRequest1 for transmission to lower layers.
    NOTE 2: Only DRBs with previously configured UP ciphering shall
           resume ciphering.
If lower layers indicate an integrity check failure while T319 is running,
perform actions specified in 5.3.13.5.
The UE shall continue cell re-selection related measurements as well as cell
re-selection evaluation. If the conditions for cell re-selection are fulfilled, the
UE shall perform cell re-selection as specified in 5.3.13.6.

---

In step 17-37, base station 2 17-04 may transfer the whole or part of the received busy indication information to core network 2 17-05. In other words, base station 2 17-04 may create a new NG message using the busy indication information which is the RRC message received in step 17-35 and transfer it to core network 2 17-05 through the NG interface.

In step 17-40, base station 2 17-04, receiving the busy indication from the SIM2 UE 17-03 of the multi-SIM UE, may transmit an RRCReject message to the SIM2 UE 17-03 of the multi-SIM UE. In an embodiment of the disclosure, it is proposed that a new message value may be contained in the RRCReject message. The new timer may be referred to as TYYY. The operations of the SIM2 UE 17-03 of the multi-SIM UE and base station 2 17-04 depending on whether the RRCReject message contains the new timer value ma be as shown in Table 18.

TABLE 18

When RRCRelease message includes new timer value,
    The UE may drive the new timer with the new time value.
        If the new timer is running, the UE may perform RRC connection resume procedure for responding to the RAN paging received in step 17-15 to base station 2 17-04.
        If the new timer expires, the UE may not perform the RRC connection resume procedure for responding to the RAN paging received in step 17-15 to base station 2 17-04.
        When the new timer is running, the UE may stop the running new timer when initiating the RRC connection resume procedure for a predetermined cause (e.g., RAN notification area update (RNAU) procedure) other than response to the RAN paging received in step 17-15. Or, when the new timer is running, the UE may stop the running new timer if the UE itself switches to RRC idle mode for a predetermined cause (e.g., when switching to camped on any cell state).

TABLE 18-continued

When RRCRelease message does not include new timer value,
    The UE may not perform RRC connection resume procedure for responding to the RAN paging received in step 17-15 to base station 2 17-04.
Operation of base station 2 17-04:
    When a new timer value is set in RRCRelease message,
        The base station may drive the new timer with the new timer value
        When the timer is running, it may buffer all information related to the RAN paging transmitted in step 17-15.
        When the timer expires, it may discard all information related to the RAN paging transmitted in step 17-15.
    When no new timer value is set in RRCRelease message,
        It may discard all information related to the RAN paging in step 17-15.

In step 17-40, the SIM2 UE 17-03 of the multi-SIM UE, receiving the RRCReject message, may perform operation 3 as follows.

Operation 3 is shown in Table 19 below.

TABLE 19 reset MAC and release the default MAC Cell Group configuration, if any;
discard the current KgNB key, the KRRCenc key, the KRRCint key, the KUPint key and the KUPenc key derived in accordance with 5.3.13.3;
suspend SRB1;
stop the timer T319 or timer TXXX, if running;
start the timer TYYY, with the timer value set to tyyy, if included;

In step 17-40, the SIM2 UE 17-03 of the multi-SIM UE, receiving the RRCReject message, may additionally perform an operation for the above-described TYYY timer and may also perform the operation (TS 38.381 standard, section 5.3.15.2) of the conventional art as follows.

The UE operation in TS 38.331 standard, section 5.3.15.2 is shown in Table 20.

TABLE 20

1>   stop timer T300, if running;
1>   stop timer T319, if running;
1>   stop timer T302, if running;
1>   reset MAC and release the default MAC Cell Group configuration;
1>   if waitTime is configured in the RRCReject:
    2>     start timer T302, with the timer value set to the waitTime;
1>   if RRCReject is received in response to a request from upper layers:
    2>     inform the upper layer that access barring is applicable for all access categories except categories '0' and '2';
1>   if RRCReject is received in response to an RRCSetupRequest:
    2>     inform upper layers about the failure to setup the RRC connection, upon which the procedure ends;
1>   else if RRCReject is received in response to an RRCResumeRequest or an RRCResumeRequest1:
    2>     if resume is triggered by upper layers:
      3>   inform upper layers about the failure to resume the RRC connection;
    2>     if resume is triggered due to an RNA update:
      3>   set the variable pendingRNA-Update to true;
    2>     discard the current $K_{gNB}$ key, the $K_{RRCenc}$ key, the $K_{RRCint}$ key, the $K_{UPint}$ key and the $K_{UPenc}$ key derived in accordance with 5.3.13.3;
    2>     suspend SRB1, upon which the procedure ends;
The RRC_INACTIVE UE shall continue to monitor paging while the timer T302 is running.
    NOTE: If timer T331 is running, the UE continues to perform idle/inactive measurements according to 5.7.8.

In step 17-45, the SIM2 UE 17-03 of the multi-SIM UE may be in the RRC inactive mode.

FIG. 18 is a flowchart illustrating an example in which one STM UE among UEs supporting a plurality of subscriber identity modules (SIMs) (multi-SIM UEs) performs a busy indication procedure according to an embodiment of the disclosure.

In step 18-10, the SIM1 UE 18-01 of the multi-SIM UE may be in the in RRC_CONNECTED mode with base station 1 18-02. At this time, the SIM2 UE 18-01 of the multi-SIM UE may be in the RRC inactive mode (RRC_INACTIVE) with base station 2 18-04.

In step 18-15, the SIM2 UE 18-03 of the multi-SIM UE may receive a paging message (RAN paging) initiated (RAN-initiated) by base station 2 18-04. The paging message may include the paging cause value.

In step 18-20, the SIM1 UE 18-01 of the multi-SIM UE may be transmitting/receiving data of the ongoing service with base station 1 18-02.

In step 18-25, to continuously transmit/receive the data of the SIM1 UE 18-01 of the multi-SIM UE, the SIM2 UE 18-03 of the multi-SIM UE may determine not to respond to the RAN-initiated paging message of base station 2 18-04.

In step 18-30, the SIM2 UE 18-03 of the multi-SIM UE may initiate a procedure for transmitting a busy indication to base station 2 18-04. When initiating the busy indication transmission procedure, the SIM2 UE 18-03 of the multi-SIM UE may transmit the busy indication using a legacy RRC message (RRCResumeRequest or RRCResumeRequest1) or transmit the busy indication using a new RRC message. If the procedure for transmitting the busy indication using a new RRC message is initiated, the SIM2 UE 18-03 of the multi-SIM UE may perform following operation 1-1 in step 18-30.

Operation 1-1 is shown in Table 21 below.

TABLE 21

| select access category '0'; |
| --- |
| apply the default L1 parameter values as specified in corresponding physical layer specifications, except for the parameters for which values are provided in SIB1; |
| apply the CCCH configuration; |
| apply the timeAlignmentTimerCommon included in SIB1; |
| start timer TXXX; |
| initiate transmission of busy indication | timer TXXX may mean a new timer proposed in an embodiment of the disclosure. A cause value may not be included when initiating a procedure for transmitting a busy indication by a new RRC message. Of course, when performing operation 1-1, a cause value for transmitting a busy indication may be included. For example, since various causes may be introduced later, a cause value for transmitting the busy indication may be included to distinguish from other causes later.

In other words, the UE may include a value indicating not to respond to the paging message in the resume cause in the RRC request message and transmit it to base station 2. A new RRC message may not need a resume cause, but a legacy RRC resume request message may be configured to include a resume cause for the busy indication, as a new resume cause. As described above, upon determining that the UE is in a state of being able to respond to the paging message even after transmitting information indicating not to respond to the paging message to base station 2 using the RRC message, it is possible to include a resume cause indicating that it is possible to respond to the paging message in the RRC message or include the legacy resume cause and transmit it.

If the procedure for transmitting the busy indication using the legacy RRC message (RRCResumeRequest or RRCResumeRequest1) is initiated, the SIM2 UE 18-03 of the multi-SIM UE may perform following operation 1-2 in step 18-30.

Operation 1-2 is shown in Table 22 below.

TABLE 22

| select access category '0'; |
| --- |
| set the resumeCause for busy indication (i.e. new resume cause) |
| apply the default L1 parameter values as specified in corresponding physical layer specifications, except for the parameters for which values are provided in SIB1; |
| apply the CCCH configuration; |
| apply the timeAlignmentTimerCommon included in SIB1; |
| start timer T319; |
| initiate transmission of busy indication |

The reason for proposing operation 1-1 or operation 1-2 in an embodiment of the disclosure is to perform only operations necessary when the SIM2 UE 18-03 of the multi-SIM UE initiates a busy indication transmission procedure. According to the conventional art, the operation performed when the UE in the RRC inactive mode initiates the RRC resume procedure is specified in TS 38.331 standard, section 5.3.13.2, as shown below, and it may be identified that operation 1 proposed in an embodiment of the disclosure are operations simplified as compared thereto. For reference, the other operations than including the cause value for transmitting the busy indication upon initiating the busy indication using the legacy RRC message (RRCResumeRequest or RRCResumeRequest1) may follow the conventional art.

The UE operation in TS 38.331 standard, section 5.3.13.2 is shown in Table 23.

TABLE 23

| 1> if the resumption of the RRC connection is triggered by response to NG-RAN paging: |
| --- |
| 2> select '0' as the Access Category; |
| 2> perform the unified access control procedure as specified in 5.3.14 using the selected Access Category and one or more Access Identities provided by upper layers; |
| 3> if the access attempt is barred, the procedure ends; |
| 1> else if the resumption of the RRC connection is triggered by upper layers: |
| 2> if the upper layers provide an Access Category and one or more Access Identities: |
| 3> perform the unified access control procedure as specified in 5.3.14 using the Access Category and Access Identities provided by upper layers; |
| 4> if the access attempt is barred, the procedure ends; |

TABLE 23-continued

> 2>     set the resumeCause in accordance with the information
> received from upper layers;
> 1>   else if the resumption of the RRC connection is triggered due to an
> RNA update as specified in 5.3.13.8:
> 2>     if an emergency service is ongoing:
> NOTE: How the RRC layer in the UE is aware of an ongoing emergency
>       service is up to UE implementation.
> 3>   select '2' as the Access Category;
> 3>   set the resumeCause to emergency;
> 2>   else:
> 3>   select '8' as the Access Category;
> 2>     perform the unified access control procedure as specified in
> 5.3.14 using the selected Access Category and one or more Access
> Identities to be applied as specified in TS 24.501 [23];
> 3>   if the access attempt is barred:
> 4>   set the variable pendingRNA-Update to true;
> 4>   the procedure ends;
> 1>   if the UE is in NE-DC or NR-DC:
> 2>     if the UE does not support maintaining SCG configuration upon
> connection resumption:
> 3>   release the MR-DC related configurations (i.e., as specified in
> 5.3.5.10) from the UE Inactive AS context, if stored;
> 1>   if the UE does not support maintaining the MCG SCell configurations
> upon connection resumption:
> 2>     release the MCG SCell(s) from the UE Inactive AS context, if
> stored;
> 1>   apply the default L1 parameter values as specified in corresponding
> physical layer specifications, except for the parameters for which values
> are provided in SIB1;
> 1>   apply the default SRB1 configuration as specified in 9.2.1;
> 1>   apply the default MAC Cell Group configuration as specified in 9.2.2;
> 1>   release delayBudgetReportingConfig from the UE Inactive AS context,
> if stored;
> 1>   stop timer T342, if running;
> 1>   release overheatingAssistanceConfig from the UE Inactive AS context,
> if stored;
> 1>   stop timer T345, if running;
> 1>   release idc-AssistanceConfig from the UE Inactive AS context, if
> stored;
> 1>   release drx-PreferenceConfig for all configured cell groups from the
> UE Inactive AS context, if stored;
> 1>   stop all instances of timer T346a, if running;
> 1>   release maxBW-PreferenceConfig for all configured cell groups from
> the UE Inactive AS context, if stored;
> 1>   stop all instances of timer T346b, if running;
> 1>   release maxCC-PreferenceConfig for all configured cell groups from
> the UE Inactive AS context, if stored;
> 1>   stop all instances of timer T346c, if running;
> 1>   release maxMIMO-LayerPreferenceConfig for all configured cell
> groups from the UE Inactive AS context, if stored;
> 1>   stop all instances of timer T346d, if running;
> 1>   release minSchedulingOffsetPreferenceConfig for all configured cell
> groups from the UE Inactive AS context, if stored;
> 1>   stop all instances of timer T346e, if running;
> 1>   release releasePreferenceConfig from the UE Inactive AS context, if
> stored;
> 1>   stop timer T346f, if running;
> 1>   apply the CCCH configuration as specified in 9.1.1.2;
> 1>   apply the timeAlignmentTimerCommon included in SIB1;
> 1>   start timer T319;
> 1>   set the variable pendingRNA-Update to false;
> 1>   initiate transmission of the RRCResumeRequest message or
> RRCResumeRequest1

In step 18-35, when the SIM2 UE 18-03 of the multi-SIM UE performs operation 1-1 in step 18-30, the SIM2 UE 18-03 of the multi-SIM UE may transmit the busy indication to base station 2 18-04 using the new RRC message through operation 2-1 as follows.

Operation 2-1 is as shown in Table 24 below.

TABLE 24

| |
|---|
| set the UE identity to the stored ShortI-RNTI value or FullI-RNTI value. Or set the UE identity to the stored FullI-RNTI value if the field useFullResumeID is signalled in SIB1; otherwise, set the UE identity to the stored ShortI-RNTI value |
| set the Short MAC-I to the 18 least significant bits of the MAC-I calculated: |
|     over the ASN.1 encoded as per clause 8 (i.e., a multiple of 8 bits) VarResumeMAC-Input; |
|     with the KRRCint key in the UE Inactive AS Context and the previously configured integrity protection algorithm; and |
|     with all input bits for COUNT, BEARER and DIRECTION set to binary ones; |
| submit the new RRC message on CCCH; |

It is proposed that the SIM2 UE 18-03 of the multi-SIM UE according to an embodiment of the disclosure continuously performs cell reselection-related measurement and cell reselection evaluation process when performing operation 2-1 in step 18-35. It is proposed that if at least one of the following conditions occurs when performing operation 2-1 in step 18-35, the SIM2 UE 18-03 of the multi-SIM UE switches to the RRC idle mode (RRC_IDLE).

When integrity check failure occurs while the new timer TXXX is running

When cell selection or cell reselection occurs while the new timer TXXX is running When the new timer TXXX expires Of course, the SIM2 UE 18-03 of the disclosure may not perform cell reselection-related measurement and cell reselection evaluation process when performing operation 2-1 in step 18-35. This is why, when cell selection or cell reselection occurs, it may switch to the RRC idle mode and thus fail to send a busy indication.

In step 18-35, when the SIM2 UE 18-03 of the multi-SIM UE performs operation 1-2 in step 18-30, the SIM2 UE 18-03 of the multi-SIM UE may transmit the busy indication to base station 2 18-04 using the legacy RRC message (RRCResumeRequest or RRCResumeRequest1) through operation 2-2 as follows.

Operation 2-2 is shown in Table 25 below.

TABLE 25

| |
|---|
| If the field useFullResumeID is signaled in SIB1: |
|     select the RRCResumeRequest1 as the message to use |
|     set the resumeidentity to the stored FullI-RNTI value |
| else: |
|     select the RRCResumeRequest as the message to use |
|     set the resumeidentity to the stored ShortI-RNTI value |
| set the resumeMAC-I to the 18 least significant bits of the MAC-I calculated: |
|     over the ASN.1 encoded as per clause 8 (i.e., a multiple of 8 bits) VarResumeMAC-Input; |
|     with the KRRCint key in the UE Inactive AS Context and the previously configured integrity protection algorithm; and |
|     derive the KRRCenc key, the KRRCint key, the KUPint key and the KUPenc key; |
| submit selected message RRCResumeRequest or RRCResumeRequest1 for transmission to lower layers |

The reason for proposing operation 2-1 or operation 2-2 in an embodiment of the disclosure is why the SIM2 UE 18-03 of the multi-SIM UE performs only operations necessary to transmit the busy indication. According to the conventional art, the operation performed when the UE in the RRC inactive mode transmits the RRCResumeRequest or RRCResumeRequest1 is specified in TS 38.331 standard, section 5.3.13.3, as shown below, and it may be identified that operation 2-1 and operation 2-2 proposed in an embodiment of the disclosure are operations simplified as compared to the conventional operations. For reference, the operations performed when transmitting the busy indication upon initiating the procedure for transmitting the busy indication using the legacy RRC message (RRCResumeRequest or RRCResumeRequest1) may follow the conventional art.

The UE operation in TS 38.331 standard, section 5.3.13.3 is shown in Table 26.

TABLE 26

| |
|---|
| The UE shall set the contents of RRCResumeRequest or RRCResumeRequest1 message as follows: |
|   1>  if field useFullResumeID is signalled in SIB1: |
|     2>    select RRCResumeRequest1 as the message to use; |
|     2>    set the resumeIdentity to the stored fullI-RNTI value; |
|   1>  else: |
|     2>    select RRCResumeRequest as the message to use; |
|     2>    set the resumeIdentity to the stored shortI-RNTI value; |
|   1>  restore the RRC configuration, RoHC state, the stored QoS flow to DRB mapping rules and the $K_{gNB}$ and $K_{RRCint}$ keys from the stored UE Inactive AS context except for the following: |
|     - masterCellGroup; |
|     - mrdc-SecondaryCellGroup, if stored; and |
|     - pdcp-Config; |
|   1>  set the resumeMAC-I to the 18 least significant bits of the MAC-I calculated: |
|     2>    over the ASN.1 encoded as per clause 8 (i.e., a multiple of 8 bits) VarResumeMAC-Input; |
|     2>    with the $K_{RRCint}$ key in the UE Inactive AS Context and the previously configured integrity protection algorithm; and |
|     2>    with all input bits for COUNT, BEARER and DIRECTION set to binary ones; |
|   1>  derive the $K_{gNB}$ key based on the current $K_{gNB}$ key or the NH, using the stored nextHopChainingCount value, as specified in TS 33.501 [11]; |
|   1>  derive the $K_{RRCenc}$ key, the $K_{RRCint}$ key, the $K_{UPint}$ key and the $K_{UPenc}$ key; |

TABLE 26-continued

```
    1>  configure lower layers to apply integrity protection for all radio
        bearers except SRB0 using the configured algorithm and the K_{RRCint} key
        and K_{UPint} key derived in this subclause immediately, i.e., integrity
        protection shall be applied to all subsequent messages received and sent
        by the UE;
    NOTE 1: Only DRBs with previously configured UP integrity protection
            shall resume integrity protection.
    1>  configure lower layers to apply ciphering for all radio bearers except
        SRB0 and to apply the configured ciphering algorithm, the K_{RRCenc} key
        and the K_{UPenc} key derived in this subclause, i.e. the ciphering
        configuration shall be applied to all subsequent messages received and
        sent by the UE;
    1>  re-establish PDCP entities for SRB1;
    1>  resume SRB1;
    1>  submit the selected message RRCResumeRequest or
        RRCResumeRequest1 for transmission to lower layers.
    NOTE 2: Only DRBs with previously configured UP ciphering shall
            resume ciphering.
If lower layers indicate an integrity check failure while T319 is running,
perform actions specified in 5.3.13.5.
The UE shall continue cell re-selection related measurements as well as cell
re-selection evaluation. If the conditions for cell re-selection are fulfilled, the
UE shall perform cell re-selection as specified in 5.3.13.6.
```

In other words, when the UE in the RRC_inactive mode responds to the base station, the operation necessary to transmit the busy indication as compared with the operation for transmitting the RRCResumeRequest or RRCResumeRequest1 is performed, and it may thus be simplified.

In step 18-37, base station 2 18-04 may transfer the whole or part of the received busy indication information to core network 2 (AMF/MME in NW2) 18-05. As an example, base station 2 18-04 may create a new NG message using the busy indication information which is the RRC message received in step 18-35 and transfer it to core network 2 18-05 through the NG interface (e.g., interface between the NG-RAN node and the AMF).

In the case shown in FIG. 18, the busy indication is sent, but base station 2 may successfully perform a random access procedure in response to reception of the RRC resume request message.

In step 18-40, the SIM2 UE 18-03 of the multi-SIM UE may perform operation 3 as follows as soon as it successfully ends the random access procedure with base station 2 18-04 (e.g., when contention resolution is successfully performed).

Operation 3:

reset MAC and release the default MAC Cell Group configuration, if any;

stop the timer TXXX or timer T319, if running;

In step 18-45, the SIM2 UE 18-03 of the multi-SIM UE may be in the RRC inactive mode.

FIG. 19 is a flowchart illustrating an example in which one SIM UE among UEs supporting a plurality of subscriber identity modules (SIMs) (multi-SIM UEs) performs a busy indication procedure according to an embodiment of the disclosure.

In step 19-10, the SIM1 UE 19-01 of the multi-SIM UE may be in the in RRC_CONNECTED mode with base station 1 19-02. At this time, the SIM2 UE 19-01 of the multi-SIM UE may be in the RRC idle mode (RRC_IDLE) with base station 2 19-04.

In step 19-15, the SIM2 UE 19-03 of the multi-SIM UE may receive a CN-initiated paging message (CN paging) of the core network 19-05 from base station 2 19-04.

The paging message may include the paging cause value.

In step 19-20, the SIM1 UE 19-01 of the multi-SIM UE may be transmitting/receiving data of the ongoing service with base station 1 19-02.

In step 19-25, to continuously transmit/receive the data of the SIM1 UE 19-01 of the multi-SIM UE, the SIM2 UE 19-03 of the multi-SIM UE may determine not to respond to the CN-initiated paging message of core network 2 19-05.

In step 19-30, the SIM2 UE 19-03 of the multi-SIM UE may initiate an RRC connection setup procedure to transmit the busy indication to base station 2 19-04. In other words, the SIM2 UE 19-03 of the multi-SIM UE may transmit an RRC connection setup request message (RRCSetupRequest) to base station 2 19-04. The message may include a new cause value for setting up an RRC connection. As an example, the new cause value may mean a cause value indicating the busy indication.

In other words, the UE may include a value indicating not to respond to the paging message in the resume cause in the RRC request message and transmit it to base station 2. A new RRC message may not need a resume cause, but a legacy RRC resume request message may be configured to include a resume cause for the busy indication, as a new resume cause. As described above, upon determining that the UE is in a state of being able to respond to the paging message even after transmitting information indicating not to respond to the paging message to base station 2 using the RRC message, it is possible to include a resume cause indicating that it is possible to respond to the paging message in the RRC message or include the legacy resume cause and transmit it.

In step 19-35, base station 2 19-04 may transmit an RRC connection setup message (RRCSetup) to the SIM2 UE 19-03 of the multi-SIM UE.

In step 19-40, the SIM2 UE 19-03 of the multi-SIM UE may transmit an RRC connection setup complete message (RRCSetupComplete) to base station 2 19-04. In the message, the busy indication cause value or new information (e.g., time stamp) related to the busy indication may be contained in a UE-specific NAS message (dedicated non-access stratum message).

In other words, the UE may include a busy indication indicating not to respond to the paging message in the RRC complete message and transmit it to base station 2. Upon determining that the UE is in a state of being able to respond to the paging message even after transmitting the information indicating not to respond to the paging message to base station 2 using the RRC complete message as described above, the UE may include information indicating that it is possible to respond to the paging message in the RRC complete message and transmit it.

In step 19-45, base station 2 19-04 may forward the dedicated NAS message received in step 19-40 to core network 2 19-05.

In step 19-50, the base station 2 19-04 may transmit an RRC connection release message to the SIM2 UE 19-03 of the multi-SIM UE. Upon receiving the RRC connection release message, the SIM2 UE of the multi-SIM UE may operate according to the above-described embodiment.

FIG. 14 is a block diagram illustrating an inner structure of a terminal according to an embodiment of the disclosure.

Referring to the figure, the UE includes a radio frequency (RF) processing unit 14-10, a baseband processing unit 14-20, a storage unit 14-30, and a controller 14-40.

The RF processing unit 14-10 performs functions for transmitting/receiving signals through a radio channel, such as signal band conversion or amplification. In other words, the RF processing unit 14-10 up-converts the baseband signal provided from the baseband processing unit 14-20 into an RF band signal, transmits it through the antenna, and down-converts the RF band signal received through the antenna into a baseband signal. For example, the RF processing unit 14-10 may include, e.g., a transmission filter, a reception filter, an amplifier, a mixer, an oscillator, a digital-to-analog converter (DAC), and an analog-to-digital converter (ADC). In the figure, only one antenna is shown, but the UE may include a plurality of antennas. Further, the RF processing unit 14-10 may include a plurality of RF chains. Further, the RF processing unit 14-10 may perform beamforming. For beamforming, the RF processing unit 14-10 may adjust the phase and magnitude of each of the signals transmitted/received through the plurality of antennas or antenna elements. Further, the RF processing unit may perform MIMO and receive several layers upon performing the MIMO operation.

The baseband processing unit 14-20 performs the function of conversion between a baseband signal and bit stream according to the system physical layer specifications. For example, upon data transmission, the baseband processing unit 14-20 encodes and modulates a transmission bit stream, thereby generating complex symbols. Further, upon data reception, the baseband processing unit 14-20 restores the reception bit stream by demodulating and decoding the baseband signal provided from the RF processing unit 14-10. For example, in the case of following the orthogonal frequency division multiplexing (OFDM) scheme, upon data transmission, the baseband processing unit 14-20 may generate complex symbols by encoding and modulating the transmission bit stream, map the complex symbols to a subcarrier, and then configures OFDM symbols through inverse fast Fourier transform (IFFT) operation and cyclic prefix (CP) insertion. Further, upon data reception, the baseband processing unit 14-20 divides the baseband signal provided from the RF processing unit 14-10 into OFDM symbol units, restores the signals mapped to the subcarriers through fast Fourier transform (FFT), and then restores reception bit stream through demodulation and decoding.

The baseband processing unit 14-20 and the RF processing unit 14-10 transmit and receive signals as described above. Accordingly, the baseband processing unit 14-20 and the RF processing unit 14-10 may be referred to as a transmitter, a receiver, a transceiver, or a communication unit. Further, at least one of the baseband processing unit 14-20 and the RF processing unit 14-10 may include a plurality of communication modules for supporting a plurality of different radio access technologies. Further, at least one of the baseband processing unit 14-20 and the RF processing unit 14-10 may include different communication modules for processing signals in different frequency bands. For example, the different radio access technologies may include, e.g., wireless LAN (e.g., IEEE 802.11) or cellular network (e.g., LTE). Further, the different frequency bands may include a super-high frequency (SHF) (e.g., 2.NRHz or NRHz) band or millimeter wave (mmWave) (e.g., 60 GHz) band.

The storage unit 14-30 stores a basic program for operating the UE, application programs, configuration information, or other data. In particular, the storage unit 14-30 may store information related to the second access node performing wireless communication using the second radio access technology. Further, the storage unit 14-30 provides the stored data at the request of the controller 14-40.

The controller 14-40 controls the overall operation of the UE. For example, the controller 14-40 transmits/receives signals through the baseband processing unit 14-20 and the RF processing unit 14-10. Further, the controller 14-40 records and reads data in/from the storage unit 14-30. To that end, the controller 14-40 may include at least one processor. For example, the controller 14-40 may include a communication processor (CP) that performs control for communication and an application processor (AP) that controls an upper layer, such as an application program.

FIG. 15 is a block diagram illustrating a configuration of an NR base station according to an embodiment of the disclosure.

As shown in the figure, the base station may include an RF processing unit 15-10, a baseband processing unit 15-20, a backhaul communication unit 15-30, a storage unit 15-40, and a controller 15-50.

The RF processing unit 15-10 performs functions for transmitting/receiving signals through a radio channel, such as signal band conversion or amplification. In other words, the RF processing unit 15-10 up-converts the baseband signal provided from the baseband processing unit 15-20 into an RF band signal, transmits it through the antenna, and down-converts the RF band signal received through the antenna into a baseband signal. For example, the RF processing unit 15-10 may include a transmission filter, a reception filter, an amplifier, a mixer, an oscillator, a DAC, and an ADC. In the figure, only one antenna is shown, but the first access node may include a plurality of antennas. Further, the RF processing unit 15-10 may include a plurality of RF chains. Further, the RF processing unit 15-10 may perform beamforming. For beamforming, the RF processing unit 15-10 may adjust the phase and magnitude of each of the signals transmitted/received through the plurality of antennas or antenna elements. The RF processing unit may perform downlink MIMO operation by transmitting one or more layers.

The baseband processing unit 15-20 performs the function of conversion between a baseband signal and bit stream according to the physical layer specifications of the first radio access technology. For example, upon data transmission, the baseband processing unit 15-20 encodes and modulates a transmission bit stream, thereby generating complex symbols. Further, upon data reception, the baseband processing unit 15-20 restores the reception bit stream by demodulating and decoding the baseband signal provided from the RF processing unit 15-10. For example, in the case of following the OFDM scheme, upon data transmission, the baseband processing unit 15-20 may generate complex symbols by encoding and modulating the transmission bit stream, map the complex symbols to a subcarrier, and then configures OFDM symbols through IFFT operation and CP insertion. Further, upon data reception, the baseband processing unit 15-20 divides the baseband signal provided from the RF processing unit 15-10 into OFDM symbol units, restores the signals mapped to the subcarriers through the FFT, and then restores the reception bit stream through demodulation and decoding. The baseband processing unit 15-20 and the RF processing unit 15-10 transmit and receive signals as described above. Accordingly, the baseband processing unit 15-20 and the RF processing unit 15-10 may be referred to as a transmitter, a receiver, a transceiver, a communication unit, or a wireless communication unit.

The backhaul communication unit 15-30 provides an interface for performing communication with other nodes in the network. In other words, the backhaul communication unit 15-30 converts the bit stream transmitted from the main base station to another node, e.g., auxiliary base station or core network, into a physical signal, and converts the physical signal received from the other node into a bit stream.

The storage unit 15-40 stores a basic program for operating the main base station, application programs, configuration information, or other data. In particular, the storage unit 15-40 may store, e.g., information about the bearer allocated to the connected UE and the result of measurement reported from the connected UE. Further, the storage unit 15-40 may store information that serves as a reference for determining whether to provide multiple connections to the UE or stop. Further, the storage unit 15-40 provides the stored data at the request of the controller 15-50.

The controller 15-50 controls the overall operation of the main base station. For example, the controller 15-50 transmits/receives signals through the baseband processing unit 15-20 and the RF processing unit 15-10 or through the backhaul communication unit 15-30. Further, the controller 15-50 records and reads data in/from the storage unit 15-30. To that end, the controller 15-50 may include at least one processor.

Accordingly, according to various embodiments of the disclosure, the SIM2 UE of the multi-SIM UE may transfer the paging cause to the upper layer and compare the service priority mapped to the paging cause with the service priority that is in progress in the SIM1 UE, and the SIM2 UE may initiate an RRC connection resume procedure. Or, it may initiate an RRC connection resume procedure to indicate reception of the paging message itself. The SIM1 UE of the multi-SIM UE may request a gap for multi-SIM operation per frequency band or per cell from the base station to perform operation on another SIM.

Thus, according to various embodiments of the disclosure, the SIM2 UE of the multi-SIM UE may determine not to respond to the paging message received from the base station to perform operation on the other SIM and initiate a procedure for transmitting a busy indication to the base station. The SIM2 UE may transfer the busy indication to the upper layer and include a cause value for transmitting the busy indication when initiating the procedure for transmitting the busy indication to distinguish from other causes later, and the SIM2 UE may become the RRC INACTIVE state.

The invention claimed is:

1. A method for communication by a user equipment (UE) supporting a plurality of subscriber identity modules (SIMs), the method comprising:

receiving, from a first base station related to a first SIM of the UE, a radio resource control (RRC) message including information on a prohibit timer;

transmitting, to the first base station, a first UE assistance information message including information associated with gap preference;

starting the prohibit timer using the information on the prohibit timer in response to transmitting the first UE assistance information including the information associated with gap preference; and based on the prohibit timer running, determining not to transmit a second UE assistance information message including the information associated with gap preference.

2. The method of claim 1, wherein the information associated with gap preference includes a gap offset and a gap length related to the gap preference.

3. The method of claim 1, further comprising:

receiving, from a second base station related to a second SIM, a message for paging when the UE is in an RRC inactive state with the second base station;

determining not to respond to the paging; and transmitting, to the second base station, a message including information indicating not to respond to the paging.

4. The method of claim 1, further comprising:

receiving, from the first base station, an RRC reconfiguration message including information for setup or release of a gap configuration related to multi-SIM operation of the UE.

5. The method of claim 4, further comprising:

in case that the information for setup or release of the gap configuration related to multi-SIM operation of the UE is set to setup, releasing previously set up multi-SIM operation related gap configuration; and setting up the gap configuration related to multi-SIM operation of the UE based on the RRC reconfiguration message including a gap offset value.

6. The method of claim 5, wherein the gap configuration related to multi-SIM operation of the UE satisfies following conditions:

system frame number (SFN) mod $T$=FLOOR(Offset/ 10);

subframe=Offset mod 10; and with T=GapRepetition/10, and wherein the SFN indicates a system frame number of an initial gap, the subframe indicates a subframe number of the initial gap, the GapRepetition indicates a repetition period for multi-SIM operation related gap.

7. The method of claim 4, further comprising:

in case that the information for setup or release of the gap configuration related to multi-SIM operation of the UE is set to release, releasing the gap configuration related to multi-SIM operation of the UE.

8. A user equipment (UE) supporting a plurality of subscriber identity modules (SIMs), the UE comprising:

a transceiver; and at least one processor coupled to the transceiver, wherein the at least one processor is configured to:

receive, from a first base station related to a first SIM of the UE, a radio resource control (RRC) message including information on a prohibit timer;

transmit, to the first base station, a first UE assistance information message including information about associated with gap preference;

start a timer for a gap request using the information on the prohibit timer for the gap request in response to transmitting the first UE assistance information including the information associated with gap preference; and based on the timer for the gap request running, determining not to transmit a second UE assistance information message including the information associated with gap preference.

9. The UE of claim 8, wherein the information associated with gap preference includes a gap offset and a gap length related to the gap preference.

10. The UE of claim 8, wherein the at least one processor is further configured to:

receive, from a second base station related to a second SIM, a message for paging when the UE is in an RRC inactive state with the second base station;

determine not to respond to the paging; and transmit, to the second base station, a message including information indicating not to respond to the paging.

11. The UE of claim 8, wherein the at least one processor is further configured to:

receive, from the first base station, an RRC reconfiguration message including information for setup or release of a gap configuration related to multi-SIM operation of the UE.

12. The UE of claim 11, wherein the at least one processor is further configured to:

in case that the information for setup or release of the gap configuration related to multi-SIM operation of the UE is set to setup, release previously set up multi-SIM operation related gap configuration; and set up the gap configuration related to multi-SIM operation of the UE based on the RRC reconfiguration message including a gap offset value.

13. The UE of claim 12, wherein the gap configuration related to multi-SIM operation of the UE satisfies following conditions:

$$\text{system frame number (SFN) mod } T = \text{FLOOR (Offset/10);}$$

$$\text{subframe} = \text{Offset mod 10; and}$$

with T=GapRepetition/10, and wherein the SFN indicates a system frame number of an initial gap, the subframe indicates a subframe number of the initial gap, the GapRepetition indicates a repetition period for multi-SIM operation related gap.

14. The UE of claim 11, wherein the at least one processor is further configured to:

in case that the information for setup or release of the gap configuration related to multi-SIM operation of the UE is set to release, release the gap configuration related to multi-SIM operation of the UE.

* * * * *